US012693503B2

(12) United States Patent
Choi

(10) Patent No.: US 12,693,503 B2
(45) Date of Patent: Jul. 28, 2026

(54) OPTICAL SYSTEM AND CAMERA MODULE COMPRISING SAME

(71) Applicant: LG INNOTEK CO., LTD., Seoul (KR)

(72) Inventor: Young Hwan Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 267 days.

(21) Appl. No.: 18/705,861

(22) PCT Filed: Oct. 27, 2022

(86) PCT No.: PCT/KR2022/016610
§ 371 (c)(1),
(2) Date: Apr. 29, 2024

(87) PCT Pub. No.: WO2023/075466
PCT Pub. Date: May 4, 2023

(65) Prior Publication Data
US 2026/0126623 A1     May 7, 2026

(30) Foreign Application Priority Data
Oct. 29, 2021     (KR) ........................ 10-2021-0147314

(51) Int. Cl.
G02B 13/00          (2006.01)
(52) U.S. Cl.
CPC ................................ G02B 13/0045 (2013.01)
(58) Field of Classification Search
CPC .............................. G02B 13/0045; G02B 9/64
See application file for complete search history.

(56) References Cited

U.S. PATENT DOCUMENTS

2014/0240851 A1     8/2014   Kawamura
2016/0363743 A1    12/2016   Yoo
(Continued)

FOREIGN PATENT DOCUMENTS

JP     2007-192973 A     8/2007
JP        5616535 B2    10/2014
(Continued)

OTHER PUBLICATIONS

International Search Report dated Feb. 6, 2023 in International Application No. PCT/KR2022/016610.

*Primary Examiner* — Joseph P Martinez
(74) *Attorney, Agent, or Firm* — SALIWANCHIK, LLOYD & EISENSCHENK

(57)          ABSTRACT
The optical system disclosed in the embodiment includes first to ninth lenses aligned from the object side toward the sensor side, the first lens has a positive refractive power on the optical axis, and the ninth lens has negative refractive power on the optical axis, an object-side surface of the first lens has a convex shape on the optical axis, a sensor-side surface of the ninth lens has a concave shape on the optical axis, and a number of lenses having at least one critical point on object-side surfaces and a sensor-side surfaces among the first to ninth lenses is 40% or more of a total number of lenses, and the following equations are satisfied, Equations: $-1.5 < f12/f39 < 1.7$ and $0.6 < TTL/ImgH < 3.2$ (f12 is a composite focal length of the first and second lenses, f39 is a composite focal length of the third to ninth lenses, and TTL (Total track length) is a distance from an apex of the object-side surface of the first lens to an upper surface of the image sensor on the optical axis, and ImgH is ½ of the maximum diagonal length of the image sensor).

20 Claims, 16 Drawing Sheets

(56)        References Cited

U.S. PATENT DOCUMENTS

2020/0209593 A1      7/2020  Hirano
2020/0209594 A1      7/2020  Hirano
2020/0249437 A1 *    8/2020  Hirano ............... G02B 13/0045
2020/0393652 A1     12/2020  Kuo

FOREIGN PATENT DOCUMENTS

JP            6727795  B2     7/2020
JP         2020-126183  A     8/2020
KR    10-2016-0144847  A    12/2016

* cited by examiner

FIG. 3

| Y(mm) | d12 | d23 | d34 | d45 | d56 | d67 | d78 | d89 |
|---|---|---|---|---|---|---|---|---|
| 0 | 0.015 | 0.394 | 0.154 | 0.041 | 0.036 | 0.092 | 0.015 | 0.734 |
| 0.1 | 0.018 | 0.392 | 0.153 | 0.041 | 0.036 | 0.091 | 0.020 | 0.735 |
| 0.2 | 0.025 | 0.387 | 0.149 | 0.041 | 0.036 | 0.086 | 0.035 | 0.736 |
| 0.3 | 0.038 | 0.379 | 0.143 | 0.041 | 0.036 | 0.080 | 0.061 | 0.736 |
| 0.4 | 0.054 | 0.367 | 0.136 | 0.040 | 0.037 | 0.071 | 0.097 | 0.734 |
| 0.5 | 0.073 | 0.353 | 0.127 | 0.040 | 0.037 | 0.061 | 0.144 | 0.727 |
| 0.6 | 0.094 | 0.336 | 0.118 | 0.040 | 0.038 | 0.050 | 0.200 | 0.714 |
| 0.7 | 0.117 | 0.316 | 0.108 | 0.039 | 0.040 | 0.040 | 0.265 | 0.691 |
| 0.8 | 0.139 | 0.294 | 0.098 | 0.038 | 0.042 | 0.032 | 0.338 | 0.660 |
| 0.9 | 0.161 | 0.269 | 0.090 | 0.038 | 0.044 | 0.025 | 0.416 | 0.619 |
| 1 | 0.180 | 0.241 | 0.083 | 0.037 | 0.046 | 0.022 | 0.497 | 0.570 |
| 1.1 | 0.196 | 0.207 | 0.081 | 0.036 | 0.047 | 0.023 | 0.579 | 0.513 |
| 1.2 | 0.208 | 0.163 | 0.086 | 0.035 | 0.047 | 0.031 | 0.658 | 0.451 |
| 1.3 | 0.215 | 0.104 | 0.101 | 0.034 | 0.045 | 0.049 | 0.728 | 0.385 |
| 1.4 | 0.218 | | 0.127 | 0.033 | 0.039 | 0.080 | 0.784 | 0.317 |
| 1.5 | | | 0.170 | 0.032 | 0.031 | 0.126 | 0.819 | 0.250 |
| 1.6 | | | | 0.030 | 0.018 | 0.188 | 0.826 | 0.187 |
| 1.7 | | | | | | 0.247 | 0.797 | 0.130 |
| 1.8 | | | | | | | 0.731 | 0.083 |
| 1.9 | | | | | | | 0.630 | 0.048 |
| 2 | | | | | | | | 0.028 |
| 2.1 | | | | | | | | 0.026 |
| 2.2 | | | | | | | | 0.043 |
| 2.3 | | | | | | | | 0.085 |
| 2.4 | | | | | | | | 0.157 |
| 2.5 | | | | | | | | 0.263 |
| 2.6 | | | | | | | | |

FIG. 4

|  | L1 | | L2 | | L3 | | L4 | | L5 | |
|---|---|---|---|---|---|---|---|---|---|---|
|  | S1 | S2 | S1 | S2 | S1 | S2 | S1 | S2 | S1 | S2 |
| R | 3.083551 | -29.8951 | 2.035601 | 1.481187 | 3.033726 | 2.621084 | 7.898553 | 12.54498 | 13.98361 | -12.2695 |
| K | 2.021279 | -34.9601 | -11.7155 | -4.28476 | -0.44406 | -2.83 | 17.597 | 0 | 0 | 50.154 |
| A | 0.003192 | 0.024883 | 0.032164 | -0.0341 | -0.1136 | -0.14492 | -0.06576 | 0 | 0 | 0.073222 |
| B | -8.90E-03 | -0.01539 | -0.06588 | 0.039366 | 0.049893 | 0.0718 | -0.00418 | 0 | 0 | -0.1843 |
| C | 4.75E-03 | 2.95E-03 | 3.01E-02 | -6.83E-02 | -0.01287 | -4.66E-02 | -0.009954 | 0.00E+00 | 0.00E+00 | 0.202885 |
| D | -1.44E-03 | 4.14E-03 | 2.17E-04 | 5.29E-02 | -0.01991 | 1.74E-02 | 2.46E-02 | 0.00E+00 | 0.00E+00 | -0.10765 |
| E | 1.43E-04 | -2.61E-03 | -4.95E-03 | -2.10E-02 | 1.20E-02 | -8.69E-04 | -1.03E-02 | 0.00E+00 | 0.00E+00 | 2.80E-02 |
| F | 2.72E-06 | 4.59E-04 | 1.27E-03 | 3.32E-03 | -2.31E-03 | -5.46E-04 | 1.28E-03 | 0.00E+00 | 0.00E+00 | -2.93E-03 |
| G | 0.00E+00 | 0.00E+00 | 0.00E+00 | 0.00E+00 | 0.00E+00 | 8.68E-07 | 9.47E-06 | 0.00E+00 | 0.00E+00 | 0.00E+00 |
| H | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |

|  | L6 | | L7 | | L8 | | L9 | |
|---|---|---|---|---|---|---|---|---|
|  | S1 | S2 | S1 | S2 | S1 | S2 | S1 | S2 |
| R | -12.4575 | -4.77915 | -2.01704 | -2.63586 | 1.56379 | 2.383475 | 1.846679 | 1.161947 |
| K | 52.032 | 0.53332 | -3.0083 | 0.33293 | -4.0311 | -1.0296 | -4.6924 | -3.3977 |
| A | 0.09016 | -0.19563 | -1.61E-01 | -0.07027 | 0.067284 | 0.11337 | -0.2277 | -0.16317 |
| B | -0.19023 | 0.18283 | 0.24602 | 0.097102 | -0.08139 | -0.1299 | 0.10965 | 0.090748 |
| C | 2.01E-01 | -0.11077 | -0.21299 | -6.24E-02 | 0.034291 | 0.057212 | -0.03977 | -3.95E-02 |
| D | -1.08E-01 | 0.048098 | 1.21E-01 | 2.41E-01 | -1.17E-02 | -1.52E-02 | 1.09E-02 | 1.23E-02 |
| E | 2.85E-02 | -1.41E-02 | -4.07E-02 | -3.97E-02 | 3.12E-03 | 2.50E-03 | -1.90E-03 | -2.65E-03 |
| F | -2.92E-03 | 2.23E-03 | 7.33E-03 | 8.23E-03 | -4.86E-04 | -2.44E-04 | 1.89E-04 | 3.82E-04 |
| G | -2.30E-05 | -1.17E-04 | -5.53E-04 | 2.67E-04 | 6.34E-06 | 1.26E-05 | -8.96E-06 | -3.48E-05 |
| H | 0.00E+00 | 0.00E+00 | 0.00E+00 | 0.00E+00 | 8.29E-06 | -3.33E-07 | 6.17E-08 | 1.79E-06 |
| J | 0.00E+00 | 0.00E+00 | 0.00E+00 | 0.00E+00 | -7.13E-07 | 9.33E-09 | 6.34E-09 | -3.95E-08 |

100A $\begin{cases} \text{G1(111,112)} \\ \text{G2(113,114,115,116,117,118,119)} \end{cases}$

FIG. 10

| Y(mm) | d12 | d23 | d34 | d45 | d56 | d67 | d78 | d89 |
|---|---|---|---|---|---|---|---|---|
| 0 | 0.015 | 0.390 | 0.153 | 0.100 | 0.036 | 0.092 | 0.015 | 0.758 |
| 0.1 | 0.018 | 0.388 | 0.152 | 0.100 | 0.036 | 0.090 | 0.020 | 0.758 |
| 0.2 | 0.026 | 0.383 | 0.149 | 0.099 | 0.037 | 0.086 | 0.035 | 0.759 |
| 0.3 | 0.039 | 0.374 | 0.144 | 0.099 | 0.038 | 0.078 | 0.061 | 0.758 |
| 0.4 | 0.056 | 0.362 | 0.137 | 0.098 | 0.040 | 0.069 | 0.097 | 0.755 |
| 0.5 | 0.076 | 0.347 | 0.130 | 0.096 | 0.042 | 0.058 | 0.143 | 0.746 |
| 0.6 | 0.099 | 0.329 | 0.122 | 0.095 | 0.044 | 0.045 | 0.200 | 0.730 |
| 0.7 | 0.122 | 0.309 | 0.115 | 0.093 | 0.047 | 0.034 | 0.265 | 0.706 |
| 0.8 | 0.146 | 0.287 | 0.108 | 0.091 | 0.051 | 0.023 | 0.338 | 0.672 |
| 0.9 | 0.169 | 0.262 | 0.103 | 0.089 | 0.055 | 0.014 | 0.416 | 0.629 |
| 1 | 0.189 | 0.236 | 0.099 | 0.086 | 0.059 | 0.008 | 0.498 | 0.577 |
| 1.1 | 0.205 | 0.206 | 0.100 | 0.083 | 0.062 | 0.007 | 0.581 | 0.517 |
| 1.2 | 0.215 | 0.174 | 0.105 | 0.080 | 0.064 | 0.012 | 0.660 | 0.451 |
| 1.3 | 0.218 | 0.134 | 0.116 | 0.076 | 0.062 | 0.027 | 0.732 | 0.381 |
| 1.4 | 0.212 | | 0.135 | 0.072 | 0.056 | 0.057 | 0.790 | 0.309 |
| 1.5 | 0.202 | | | 0.068 | 0.046 | 0.103 | 0.828 | 0.238 |
| 1.6 | | | | 0.063 | 0.033 | 0.167 | 0.837 | 0.170 |
| 1.7 | | | | | | 0.235 | 0.811 | 0.108 |
| 1.8 | | | | | | | 0.746 | 0.055 |
| 1.9 | | | | | | | | 0.016 |
| 2 | | | | | | | | 0.001 |
| 2.1 | | | | | | | | 0.001 |
| 2.2 | | | | | | | | 0.009 |
| 2.3 | | | | | | | | 0.055 |
| 2.4 | | | | | | | | 0.136 |
| 2.5 | | | | | | | | 0.258 |
| 2.6 | | | | | | | | |

FIG. 11

|  | L1 | | L2 | | L3 | | L4 | | L5 | |
|---|---|---|---|---|---|---|---|---|---|---|
|  | S1 | S2 | S1 | S2 | S1 | S2 | S1 | S2 | S1 | S2 |
| R | 3.386631 | -36.2946 | 1.927718 | 1.478967 | 3.112671 | 2.708847 | 7.225979 | 14.93606 | 25.95799 | -12.3682 |
| K | 1.670664 | 99 | -8.81639 | -3.4937 | -0.44409 | -2.83 | 17.59673 |  |  | 50.15126 |
| A | 0.006869 | 0.018384 | 0.018884 | -0.05469 | -0.11643 | -0.1533 | -0.06647 |  |  | 0.06048 |
| B | -7.73E-03 | -0.01005 | -0.05922 | 0.043249 | 0.050462 | 0.066593 | -0.00794 |  |  | -0.18746 |
| C | 5.17E-03 | 1.45E-03 | 2.77E-02 | -6.57E-02 | -0.01545 | -4.15E-02 | -0.00922 |  |  | 0.20503 |
| D | -1.61E-03 | 3.81E-03 | -3.64E-04 | 5.05E-02 | -0.01287 | 1.87E-02 | 2.51E-02 |  |  | -0.10775 |
| E | 1.76E-04 | -2.25E-03 | -4.50E-03 | -2.05E-02 | 1.01E-02 | -8.87E-04 | -1.02E-02 |  |  | 2.80E-02 |
| F | 3.27E-05 | 3.85E-04 | 1.17E-03 | 3.32E-03 | -2.31E-03 | -8.12E-04 | 1.26E-03 |  |  | -2.92E-03 |
| G |  |  |  |  | -2.62E-05 | 8.68E-07 |  |  |  |  |
| H |  |  |  |  |  |  |  |  |  |  |
| J |  |  |  |  |  |  |  |  |  |  |

|  | L6 | | L7 | | L8 | | L9 | |
|---|---|---|---|---|---|---|---|---|
|  | S1 | S2 | S1 | S2 | S1 | S2 | S1 | S2 |
| R | -25.7891 | -5.62483 | -2.0341 | -2.6476 | 1.568263 | 2.418224 | 2.037937 | 1.222588 |
| K | 52.03317 | 0.534531 | -3.00836 | 0.332876 | -4.0303 | -1.02961 | -4.6897 | -3.3979 |
| A | 0.062608 | -0.19688 | -1.62E-01 | -0.0699 | 0.069389 | 0.116572 | -0.22928 | -0.16276 |
| B | -0.18671 | 0.182306 | 0.245899 | 0.097396 | -0.08071 | -0.13 | 0.109708 | 0.090829 |
| C | 2.00E-01 | -0.11093 | -0.21298 | -6.24E-02 | 0.034355 | 0.057138 | -0.03975 | -3.95E-02 |
| D | -1.08E-01 | 0.048081 | 1.21E-01 | 2.41E-02 | -1.17E-02 | -1.52E-02 | 1.09E-02 | 1.23E-02 |
| E | 2.86E-02 | -1.41E-02 | -4.07E-02 | -3.97E-03 | 3.12E-03 | 2.50E-03 | -1.90E-03 | -2.65E-03 |
| F | -2.95E-03 | 2.23E-03 | 7.33E-03 | 8.30E-05 | -4.85E-04 | -2.44E-04 | 1.89E-04 | 3.82E-04 |
| G | -1.56E-05 | -1.17E-04 | -5.52E-04 | 2.70E-05 | 6.39E-06 | 1.26E-05 | -8.96E-06 | -3.48E-05 |
| H |  |  |  |  | 8.28E-06 | -3.33E-07 | 6.16E-08 | 1.79E-06 |
| J |  |  |  |  | -7.22E-07 | 9.18E-08 | 6.33E-09 | -3.95E-08 |

OPTICAL SYSTEM AND CAMERA MODULE COMPRISING SAME

CROSS-REFERENCE TO RELATED APPLICATIONS

This application is the U.S. national stage application of International Patent Application No. PCT/KR2022/016610, filed Oct. 27, 2022, which claims the benefit under 35 U.S.C. § 119 of Korean Application No. 10-2021-0147314, filed Oct. 29, 2021, the disclosures of each of which are incorporated herein by reference in their entirety.

TECHNICAL FIELD

An embodiment relates to an optical system for improved optical performance and a camera module including the same.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or inhibit image stabilization due to an unstable fixing device or a camera movement caused by a user's movement. The most important element for this camera module to obtain an image is an imaging lens that forms an image. Recently, interest in high efficiency such as high image quality and high resolution is increasing, and research on an optical system including plurality of lenses is being conducted in order to realize this. For example, research using a plurality of imaging lenses having positive (+) and/or negative (−) refractive power to implement a high-efficiency optical system is being conducted.

However, when a plurality of lenses is included, there is a problem in that it is difficult to derive excellent optical properties and aberration properties. In addition, when a plurality of lenses is included, the overall length, height, etc. may increase due to the thickness, interval, size, etc. of the plurality of lenses, thereby increasing the overall size of the module including the plurality of lenses. In addition, the size of the image sensor is increasing to realize high resolution and high quality. However, when the size of the image sensor is increased, a total track length (TTL) of the optical system including the plurality of lenses also increases, and thus there is a problem in that the thickness of the camera and the mobile terminal including the optical system also increases. Therefore, a new optical system capable of solving the above problems is required.

DISCLOSURE

Technical Problem

An embodiment provides an optical system with improved optical properties. An embodiment provides an optical system having excellent optical performance on the center and periphery portions of the angle of field of view. An embodiment provides an optical system capable of having a slim structure.

Technical Solution

An optical system according to an embodiment of the invention includes first to ninth lenses disposed along an optical axis from an object side toward a sensor side, wherein the first lens has a positive (+) refractive power on the optical axis, and the ninth lens has a negative (−) refractive power on the optical axis, an object-side surface of the first lens has a convex shape on the optical axis, and a sensor-side surface of the ninth lens has a concave shape on the optical axis, a number of lenses having at least one critical point on object-side surfaces and a sensor-side surfaces among the first to ninth lenses is 40% or more of a total number of lenses, and the following equations are satisfied, $$\text{Equations:} -1.5 < f12/f39 < 1.7$$

$$0.6 < TTL/\text{ImgH} < 3.2$$

(f12 is a composite focal length of the first and second lenses, f39 is a composite focal length of the third to ninth lenses, and TTL (Total track length) is a distance from an apex of the object-side surface of the first lens to an upper surface of the image sensor on the optical axis, and ImgH is ½ of the maximum diagonal length of the image sensor).

According to an embodiment of the invention, the object-side surface of the first lens has a convex shape, the sensor-side surface of the ninth lens has a concave shape, and each of object-side surfaces and sensor-side surfaces of the sixth to ninth lenses may have at least one critical point.

According to an embodiment of the invention, the sensor-side surface of the first lens and an object-side surface of the fourth lens have at least one critical point, and the object-side surface and the sensor-side surface of the third lens may have at least one critical point.

According to an embodiment of the invention, a relationship between a distance (BFL) on the optical axis from the image sensor to the sensor side of the last lens and ImgH may satisfy the following equation: $0.01 < BFL/\text{ImgH} < 0.5$.

According to an embodiment of the invention, a relationship between effective diameters of the first lens and the ninth lens and the total number of lenses may satisfy the following equation: $1 < \Sigma CA/\text{lens number} < 10$ ($\Sigma CA$ is a sum of the effective diameters of the object-side surfaces and the sensor-side surfaces of the first to ninth lenses, and the lens number is the total number of lenses).

According to an embodiment of the invention, a relationship between a total focal length and a focal length of each lens may satisfy the following equation: $1.5 < \Sigma|F/fi| < 20$ (F is the total focal length, and fi is the sum of the focal lengths of each of the first to ninth lenses).

According to an embodiment of the invention, a distance between the lenses on the optical axis of the first to ninth lenses and a center thickness of each lens may satisfy the equation: $0.8 < Air\_CT\_Max/L\_CT\_Min < 6.0$ ($Air\_CT\_Max$ is the maximum value among the distances between adjacent two lenses on the optical axis, and $L\_CT\_Min$ is the minimum value among the thicknesses of each lens on the optical axis).

According to an embodiment of the invention, a relationship between the maximum effective diameter and the minimum effective diameter among the first to ninth lenses may satisfy the equation: $1 < CA\_Max/CA\_Min < 4$ ($CA\_Max$ is the maximum value among the effective diameters of the object-side surfaces and the image-side surfaces of the first to ninth lenses, and $CA\_Min$ is the minimum value among the effective diameters of the object-side surfaces and the sensor-side surfaces of the first to ninth lenses).

According to an embodiment of the invention, a sensor-side surface of the second lens has a concave shape on the optical axis, and an object-side surface of the third lens has a convex shape on the optical axis and faces the sensor-side surface of the second lens, the sensor-side surface of the ninth lens may have the maximum effective diameter, and the object-side surface of the third lens may have the minimum effective diameter.

According to an embodiment of the invention, the center thickness of the first lens and the third lens may satisfy the following equation: $1 < L1\_CT/L3\_CT < 5$ ($L1\_CT$ is the thickness on the optical axis of the first lens, and $L3\_CT$ is the thickness on the optical axis of the third lens).

According to an embodiment of the invention, an aperture stop disposed on the outer periphery between the second lens and the third lens is included, and a relationship between the effective radii of the first to ninth lenses and the effective radius of the aperture stop may be satisfied the following equation: $1.5 < \Sigma Semi\_CA/ST\_Semi\_CA < 50$ ($\Sigma Semi\_CA$ means the sum of all effective radii, $ST\_Semi\_CA$ means the effective radius of the aperture stop). The relationship between the effective radii of the first to ninth lenses and the total number of lenses may satisfy the following equation: $1 < \Sigma CA/lens \ number < 10$ ($\Sigma CA$ is the sum of the effective radii of the object-side surfaces and the sensor-side surfaces of the first to ninth lenses, and the lens number is 9).

An optical system according to an embodiment of the invention includes a first lens group having a plurality of lenses on an object side; and a second lens group having a plurality of lenses on a sensor side of the first lens group, wherein the first lens group has positive (+) refractive power on an optical axis, the second lens group has positive (+) refractive power on the optical axis, and a number of lenses in the second lens group is three times or more than a number of lenses of the first lens group, the object-side surface closest to the first lens group in the second lens group has the smallest effective diameter, and the sensor-side surface closest to the image sensor among the lens surfaces of the second lens group has the largest effective diameter, the sensor-side surface closest to the image sensor among the lens surfaces of the second lens group has a minimum distance between a center of the sensor-side surface and the image sensor, and the distance gradually increases toward an end of an effective region of the sensor-side surface, and the following equations may be satisfied:

$$Equations: 0.6 < TTL/ImgH < 3.2$$

$$Equation: 0.7 < F/EPD < 2.6$$

(Total track length (TTL) is a distance on the optical axis from an apex of the object-side surface of the first lens group to an upper surface of the image sensor, ImgH is ½ of the maximum diagonal length of the sensor, and F is a total focal length of the first and second lens groups, and EPD is an entrance pupil diameter of the optical system).

According to an embodiment of the invention, a focal length of each of the first and second lens groups may be greater in the first lens group than in the second lens group.

According to an embodiment of the invention, the first lens group includes a first lens and a second lens aligned with the optical axis from the object side toward the image sensor, and the second lens group includes a third to nineth lenses from the first lens group toward the image sensor, wherein an average effective diameter of the third lens is the smallest among that of the first to ninth lenses, and the average effective diameter of the ninth lens is the largest that of the first to ninth lenses.

According to an embodiment of the invention, the sensor-side surface of the ninth lens has a critical point, and the following equation may be satisfied: $0.5 < L9S2\_max\_sag$ to Sensor $< 2$ ($L9S2\_max\_sag$ to Sensor is a distance on the optical axis from the maximum Sag of the sensor-side surface of the ninth lens toward the image sensor). According to an embodiment of the invention, the number of lenses having critical points on both the object-side surface and the sensor-side surface in the second lens group may be 50% or more among the lenses of the second lens group. The thickness of the first lens and a distance between the first and second lenses on the optical axis may satisfy the following equation: $20 < L1\_CT/d12$ ($L1\_CT$ is the thickness of the first lens on the optical axis, and d12 is a distance between the first and second lenses on the optical axis).

According to an embodiment of the invention, a distance between the eighth lens and the ninth lens may satisfy the following equation: $0 < d89\_CT/d89\_ET < 3$ ($d89\_CT$ is the distance between the eighth lens and the ninth lens on the optical axis, and $d89\_ET$ is a distance between the end of the effective region of the sensor-side surface of the eighth lens and the end of the effective region of the object-side of the ninth lens in a direction of the optical axis). A focal length $f\_G1$ of the first lens group and a focal length $f\_G2$ of the second lens group may satisfy the following equation: $-1.5 < f\_G1/f\_G2 < 1.7$.

A camera module according to an embodiment of the invention includes an image sensor; and a filter between the image sensor and the last lens of the optical system, wherein the optical system includes the optical system, and the following equation may be satisfied: $0.7 \leq F/EPD < 2.6$ (F is the total focal length of the optical system, EPD is an entrance pupil diameter of the optical system.

Advantageous Effects

The optical system and the camera module according to the embodiment may have improved optical properties. In detail, the optical system may have improved aberration characteristics, resolution, etc. as a plurality of lenses are formed with a set surface shape, refractive power, thickness, and interval. The optical system and the camera module according to the embodiment may have improved distortion and aberration control characteristics, and may have good optical performance even in the center and periphery of the field of view (FOV). The optical system according to the embodiment may have improved optical characteristics and a small total track length (TTL), so that the optical system and a camera module including the same may be provided in a slim and compact structure.

DESCRIPTION OF DRAWINGS

FIG. 3 is data on distances between two adjacent lenses in the optical system of FIG. 1.

FIG. 4 is data on the aspheric coefficient of each lens surface in the optical system of FIG. 1.

FIG. 10 is data on distances between two adjacent lenses in the optical system of FIG. 8.

FIG. 11 is data on the aspheric coefficient of each lens surface in the optical system of FIG. 8.

FIG. 16 is a diagram illustrating that a camera module according to an embodiment is applied to a mobile terminal.

BEST MODE

Figure 1:
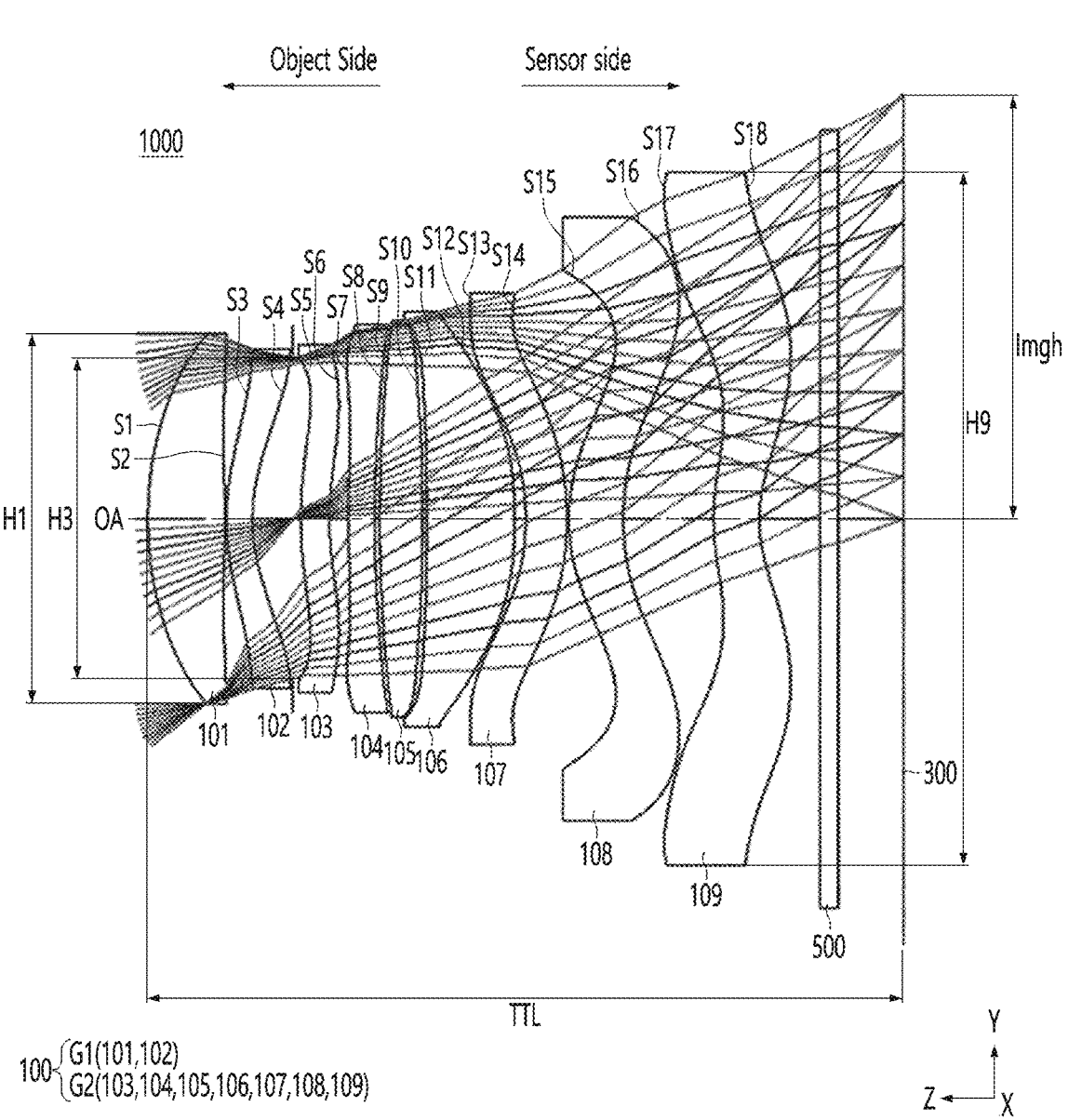
FIG. 1 is a block diagram of an optical system according to a first embodiment.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

The terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected ", "coupled" or "joined" to another component, the description may include not only being directly connected, coupled or joined to the other component but also being "connected ", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element. Several embodiments described below may be combined with each other, unless it is specifically stated that they cannot be combined with each other. In addition, the description of other embodiments may be applied to parts omitted from the description of any one of several embodiments unless otherwise specified.

In the description of the invention, "object-side surface" may mean the surface of the lens that faces the object side with respect to the optical axis OA, and "sensor-side surface" may mean the surface of the lens that faces the imaging surface (image sensor) with respect to the optical axis. The expression that one surface of the lens is convex may mean a convex shape on the optical axis or paraxial region, and the expression that one surface of the lens is the concave may mean a concave shape on the optical axis or paraxial region. The radius of curvature, the center thickness, the distance between lenses, and TTL described in the table for lens data may mean values on the optical axis. The vertical direction may mean a direction perpendicular to the optical axis, and the end of the lens or the lens surface may mean the end of the effective region of the lens through which the incident light passes. The effective diameter of the lens surface may have a measurement error of up to +0.4 mm depending on the measurement method. The paraxial region means a very narrow region near the optical axis, and is a region in which the distance from which the light beam falls from the optical axis OA is almost zero. Hereinafter, the concave or convex shape of the lens surface will be described as an optical axis, and may also include a paraxial region.

In the present specification, the first lens means a lens closest to the object (or subject), and the n-th lens means a lens closest to the sensor-side surface (or image sensor). In the present specification, the units of the radius of curvature, thickness, TTL, ImgH, and focal length of the lens are all in mm. In addition, in the description of the shape of the lens, the convex shape of one surface means that the optical axis portion of the corresponding surface is convex, and the concave shape means that the optical axis portion of the corresponding surface is concave. Therefore, even if it is described that one surface of the lens has a convex shape, the edge portion of the lens may be concave. Similarly, even if one surface of the lens is described as having a concave shape, the edge portion of the lens may be convex.

Figure 8:
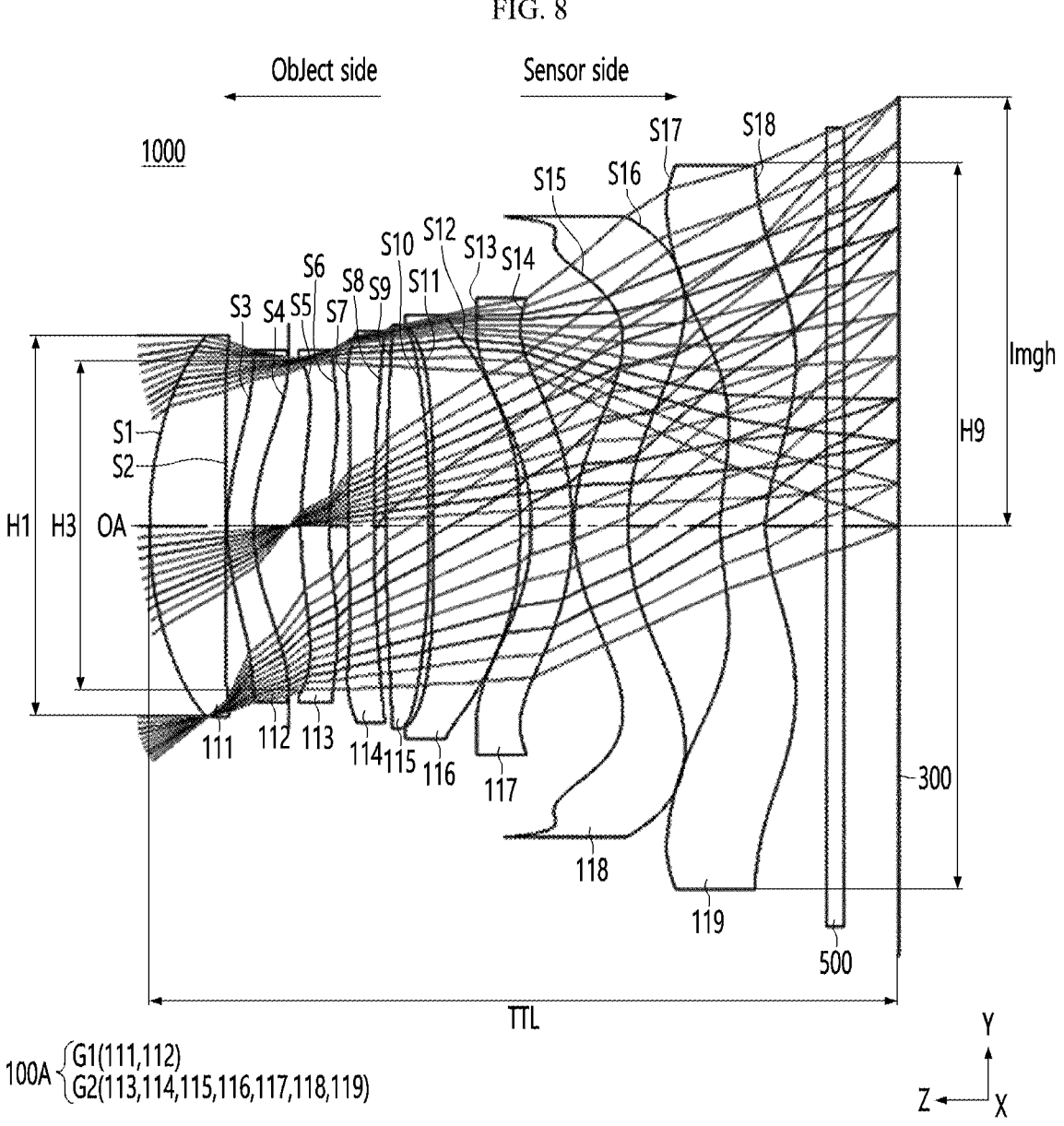
FIG. 8 is a block diagram of an optical system according to a second embodiment.

As shown in FIGS. 1 and 8, the optical system 1000 according to the first and second embodiments of the invention may include a plurality of lens groups. In detail, each of the plurality of lens groups includes at least one lens. For example, the optical system 1000 may include a first lens group G1 and a second lens group G2 sequentially arranged along the optical axis OA from the object side toward the image sensor 300.

The first lens group G1 may include at least one lens. The first lens group G1 may include three or less lenses. For example, the first lens group G1 may include two lenses. The second lens group G2 may include at least two or more lenses. The second lens group G2 may include, for example, twice as many lenses as the number of lenses of the first lens group G1. The second lens group G2 may include 7 or less lenses. The number of lenses of the second lens group G2 may have a difference of 5 or more and 7 or less than the number of lenses of the first lens group G1. For example, the second lens group G2 may include seven lenses.

In the optical system 1000, a sensor-side surface with a critical point among the sensor-side surfaces of the lenses may be greater than a sensor-side surface without a critical point. Also, in the optical system 1000, the object-side surface having the critical point among object-side surfaces of the lenses may be greater than an object-side surface having no critical point. In the optical system 1000, lenses having at least one critical point on the object-side surfaces and the sensor-side surfaces of the lenses may be greater than lenses without the critical point. The optical system 1000 according to an embodiment of the invention may be provided in a structure in which the sensor-side surface of the n-th lens has a critical point. Here, n may be 8 to 10, preferably 9. Accordingly, it is possible to provide an optical system having a high resolution and a camera module having the same. The total number of lenses of the first and second lens groups G1 and G2 is 8 or more. The number of lenses in which both the object-side and sensor-side of each lens have the critical points is greater than the number of lenses in which either the object-side surface or sensor-side surface has the critical point, and may be greater than the number of lenses in which both the object-side surface and sensor-side surface do not have critical points. When the number of lenses in which both the object-side surface and the sensor-side surface of each of the lenses have critical points is Lx, the number of lenses having a critical point on either the object-side surface or sensor-side surface is Ly, and the number of lenses without critical points on both the object-side surface and the sensor-side surface is Lz, the relational expression may be satisfied: $Lx>Lz>Ly$. The Lx may be 40% or more of the number of lenses, Lz may be 30% or more of the number of lenses, and Ly may be 25% or less of the number of lenses.

The critical point in each lens surface may be a point at which the sign of the slope value in the direction perpendicular to the optical axis OA and the optical axis OA changes from positive (+) to negative (−) or negative (−) to positive (+), and may mean a point at which the slope value is 0. Also, the critical point may be a point where the slope value decreases as the value increases or a point where the slope value increases as the value decreases.

The first lens group G1 may have positive (+) refractive power. The second lens group G2 may have positive (+) refractive power. The first lens group G1 and the second lens group G2 may have different focal lengths. The first lens group G1 and the second lens group G2 have positive refractive power, and the focal length of the second lens group G2 may be smaller than the focal length of the first lens group G1. For example, the focal length of the first lens group G1 may be 1.1 times or more, for example, 1.1 times to 2 times the focal length of the second lens group G2.

In the optical system 1000, the number of lenses having positive (+) refractive power among lenses may be greater than the number of lenses having negative (−) refractive power. Accordingly, the optical system 1000 according to the embodiment may have improved aberration control characteristics such as chromatic aberration and distortion aberration by controlling the refractive power and focal length of each lens group, and may have good optical performance on the center and peripheral portions of the field of view (FOV).

On the optical axis, the first lens group G1 and the second lens group G2 may have a set distance. The distance between the first lens group G1 and the second lens group G2 on the optical axis is a distance on the optical axis, and a distance on the optical axis between the sensor-side surface of the lens closest to the sensor side among the lenses in the first lens group G1 and the object-side surface of the lens closest to the object side among the lenses in the second lens group G2. The distance between the first lens group G1 and the second lens group G2 on the optical axis is greater than the center thickness of the last lens of the first lens group G1 and the first lens of the second lens group G2, and may be 40% or more than the distance of the first lens group G1 on the optical axis, for example, in the range of 40% to 55%. The distance between the first lens group G1 and the second lens group G2 on the optical axis may be smaller than a center thickness of the thickest lens among the lenses of the first lens group G1. Here, the distance on the optical axis of the first lens group G1 is the distance between the object-side surface of the lens closest to the object-side surface of the first lens group G1 and the sensor-side surface of the lens closest to the sensor-side surface on the optical axis.

The distance between the first lens group G1 and the second lens group G2 on optical axis may be 15% or less of the distance on the optical axis of the second lens group G2, for example, 3% to 15%. The distance on the optical axis of the second lens group G2 is a distance on the optical axis between the object-side surface of the lens closest to the object side of the second lens group G2 and the sensor-side surface of the lens closest to the sensor side. Accordingly, the optical system 1000 may have good optical performance not only on the center of FOV but also at the periphery, and may improve chromatic aberration and distortion aberration.

The optical system 1000 may include the first lens group G1 and the second lens group G2 sequentially arranged from the object side toward the image sensor 300. The optical system 1000 may include 10 or less lenses. The first lens group G1 may refract the light incident through the object side to collect light, and the second lens group G2 may refract light emitted through the first lens group G1 to diffuse to the periphery of the image sensor 300.

In the first lens group G1, the number of lenses having positive (+) refractive power and the number of lenses having negative (−) refractive power may be the same. In the second lens group G2, the number of lenses having positive (+) refractive power may be greater than the number of lenses having negative (−) refractive power. The number of lenses of the second lens group G2 may be three times or more than the number of lenses of the first lens group G1, for example, in a range of 3 to 4 times.

The distance between the sensor-side surface of the first lens group G1 and the object-side surface of the second lens group G2 facing each other may gradually decrease from the optical axis OA toward the edge. An aperture stop may be disposed on an outer circumference between the sensor-side surface of the first lens group G1 and the second lens group G2. Among the distances between the lenses of the first and second lens groups G1 and G2, the distance between the first and second lens groups G1 and G2 on the optical axis OA may have the second largest distance in the optical system 1000, and the largest distance in the optical system 1000 may be the distance between the last two lenses of the second lens group G2.

The sum of the object-side convex surface and the sensor-side concave surface on the optical axis OA or paraxial region of each lens of the first lens group G1 may be 60% or more among the lens surfaces of the first lens group G1. The sum of the object-side concave surface and the sensor-side convex surface on the optical axis OA or paraxial region of each lens of the second lens group G2 may be 55% or more among the lens surfaces of the second lens group G2. The sum of the convex sensor-side surface and the concave object-side surface among the lens surfaces of the first and second lens groups G1 and G2 on the optical axis OA or paraxial region may be 60% or more of the entire lens surfaces, for example, in the range from 60% to 75%.

At least one of the object-side surfaces and the sensor-side surfaces of all lenses in the first lens group G1 may have a critical point. The lens surfaces of a plurality of lenses adjacent to the image sensor 300 among the lenses of the second lens group G1 may have at least one critical point.

Each of the plurality of lenses 100 and 100A may include an effective region and an ineffective region. The effective region may be a region through which light incident on each of the lenses 100 and 100A passes. That is, the effective region may be an effective region in which incident light is refracted to realize optical properties. The ineffective region may be disposed around the effective region. The ineffective region is a region to which effective light is not incident from the plurality of lenses 100 and 100A, and may be a region outside the end of the effective region. That is, the ineffective region may be a region independent of the optical characteristic. Also, an end of the ineffective region may be a region fixed to a barrel (not shown) for accommodating the lens.

The optical system 1000 may include an image sensor 300. The image sensor 300 may detect light and convert it into an electrical signal. The image sensor 300 may detect light that has passed through the plurality of lenses 100 and 100A sequentially. The image sensor 300 may include a device capable of detecting incident light, such as a charge coupled device (CCD) or a complementary metal oxide semiconductor (CMOS).

The optical system 1000 may include a filter 500. The filter 500 may be disposed between the second lens group G2 and the image sensor 300. The filter 500 may be disposed between the lens closest to the sensor side among the plurality of lenses 100 and 100A and the image sensor 300. For example, when the optical systems 100 and 100A are nine lenses, the filter 500 may be disposed between the n-th lens 109 and the image sensor 300. The filter 500 may include at least one of an infrared filter and an optical filter of a cover glass. The filter 500 may pass light of a set wavelength band and filter light of a different wavelength band. When the filter 500 includes an infrared filter, radiant heat emitted from external light may be blocked from being transmitted to the image sensor 300. In addition, the filter 500 may transmit visible light and reflect infrared light.

The optical system 1000 according to the embodiment may include an aperture stop (not shown). The aperture stop may control the amount of light incident on the optical system 1000. The aperture stop may be disposed at a set position, for example, disposed on a circumference between the first lens group G1 and the second lens group G2. The aperture stop may be disposed on a periphery between the sensor-side surface of the first lens group G1 and the object-side surface of the second lens group G2. As another example, the aperture stop may be disposed around the object-side surface or the sensor-side surface of the lens closest to the object side. Alternatively, the aperture stop may be disposed between two adjacent lenses among the lenses in the first lens group G1. As another example, the aperture stop may be located between two lenses closest to the object side.

Alternatively, at least one lens selected from among the plurality of lenses 100 and 100A may serve as an aperture stop. In detail, the object-side surface or the sensor-side surface of one lens selected from among the lenses of the first lens group G1 may serve as an aperture stop for controlling the amount of light. Hereinafter, an optical system according to an embodiment will be described in detail.

First Embodiment

Figure 2:
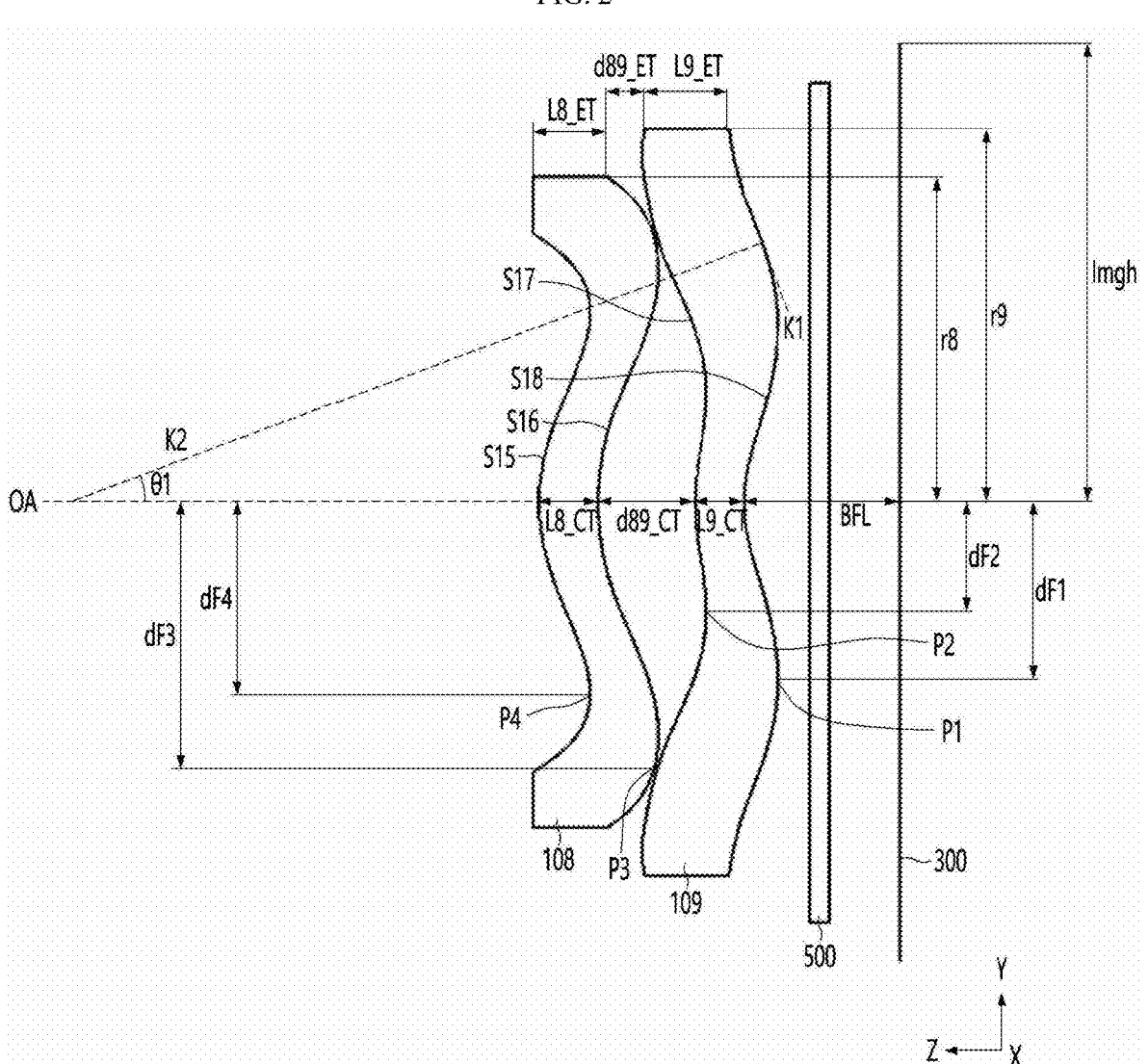
FIG. 2 is a diagram illustrating a relationship between an image sensor, an nth lens, and an n-1th lens in the optical system of FIG. 1.
Figure 5:
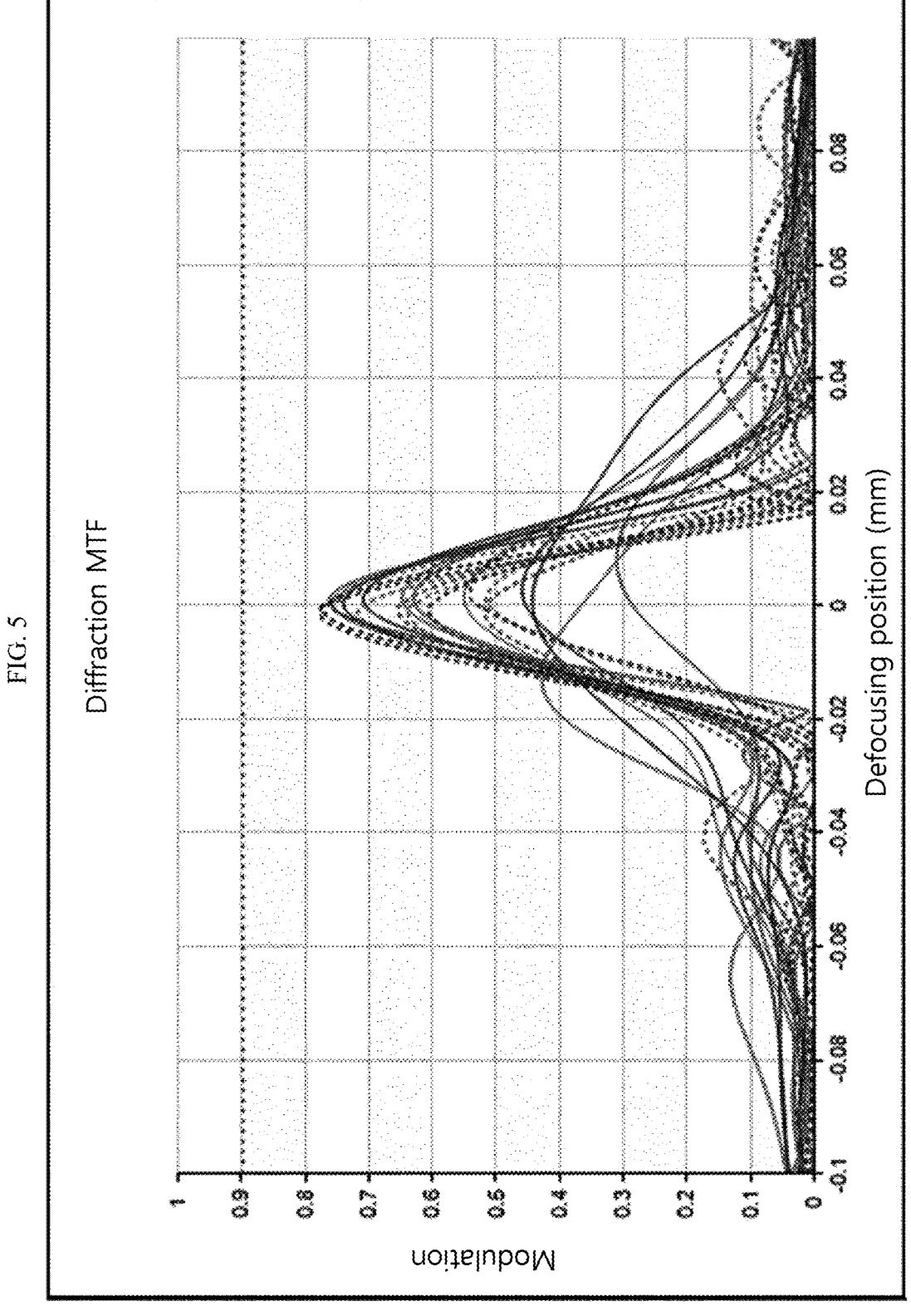
FIG. 5 is a graph of the diffraction MTF of the optical system of FIG. 1.
Figure 6:
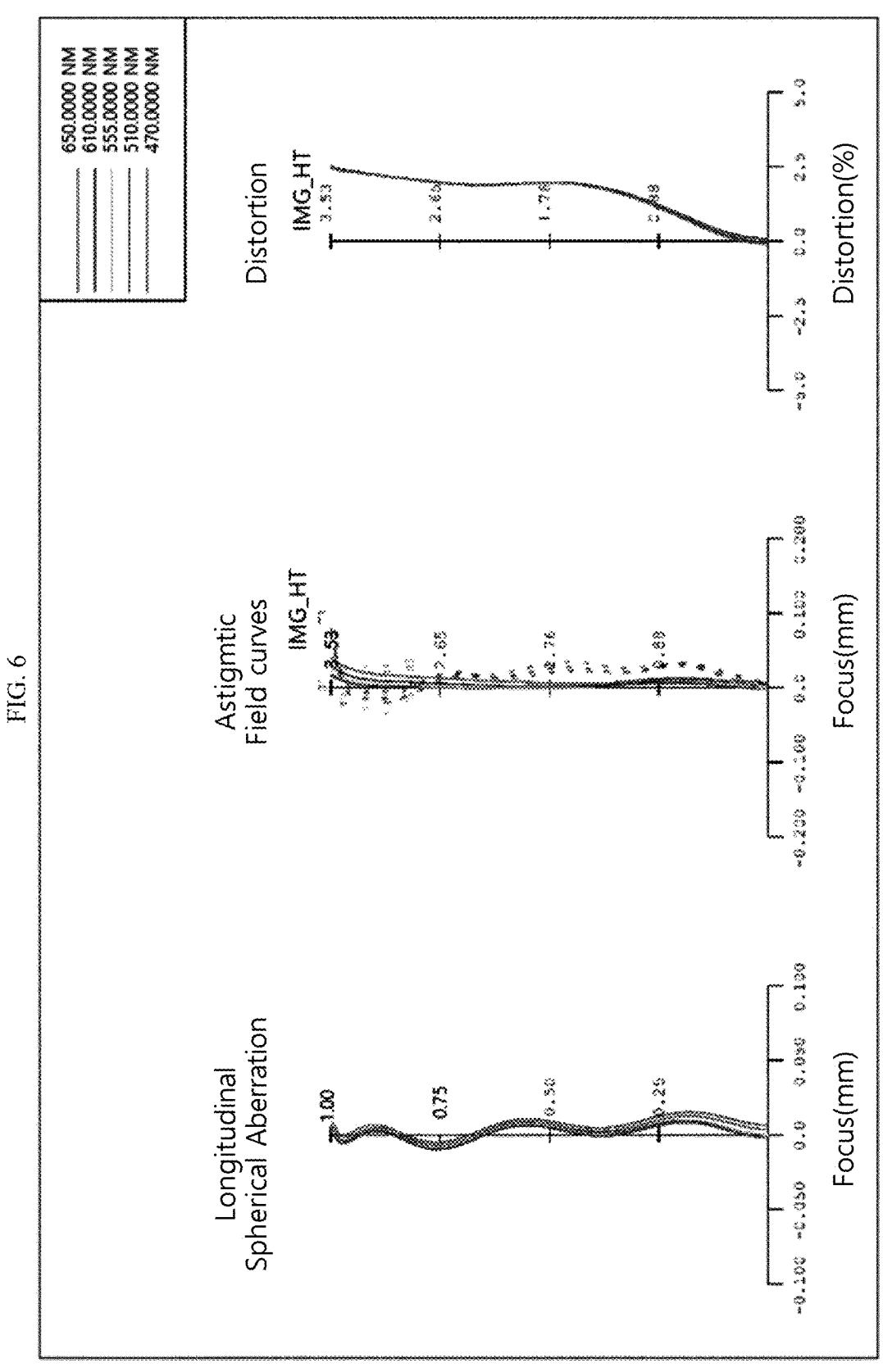
FIG. 6 is a graph showing aberration characteristics of the optical system of FIG. 1.
Figure 7A:
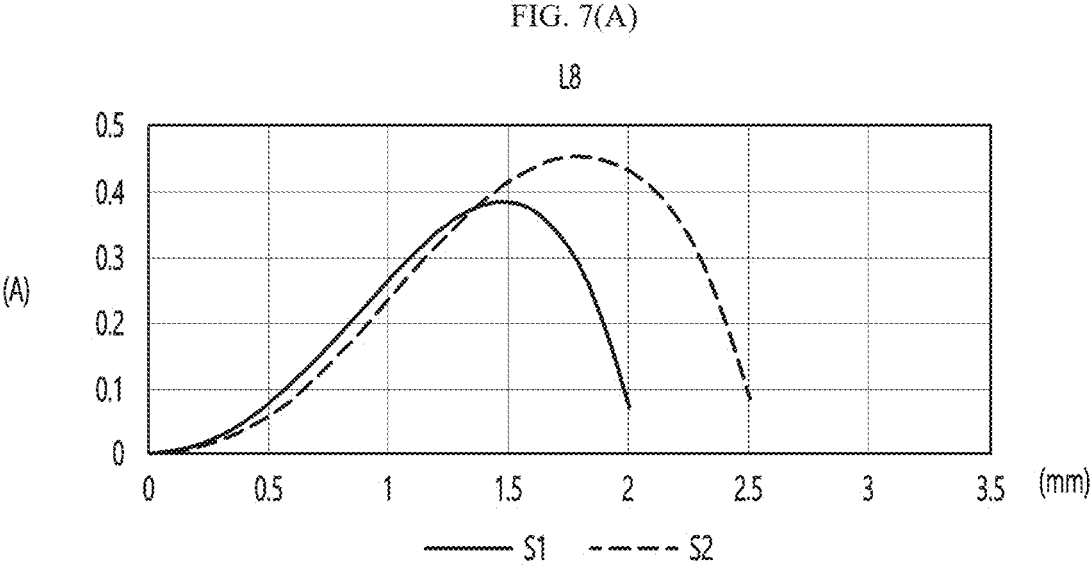
FIGS. 7(A) and 7(B) are graphs showing the height on the optical axis direction according to the distance in the first direction Y with respect to the object-side surface and the sensor-side surface in the n-th lens and the n−1th of the optical system of FIG. 2.
Figure 7B:
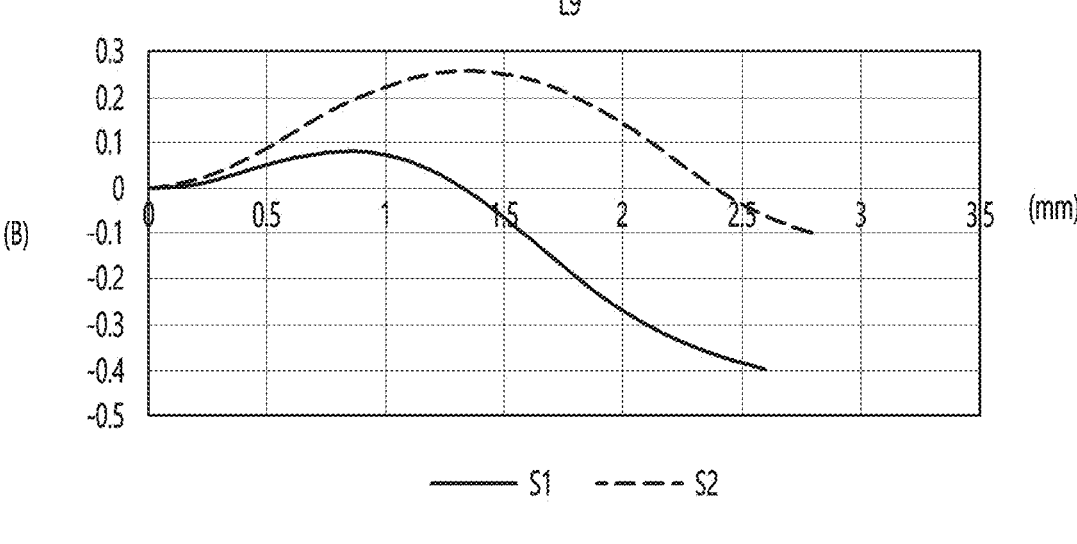

FIG. 1 is a configuration diagram of an optical system according to a first embodiment, FIG. 2 is a diagram illustrating the relationship between an image sensor, an n-th lens, and an n−1 lens in the optical system of FIG. 1, and FIG. 3 is data on the distances between two adjacent lens in the optical system of FIG. 1, FIG. 4 is data on the aspherical coefficient of each lens surface in the optical system of FIG. 1, FIG. 5 is a graph for the diffraction MTF (Diffraction MTF) of the optical system of FIG. 1, FIG. 6 is a graph showing the aberration characteristics of the optical system of FIG. 1, and FIGS. 7(A) and 7(B) are graphs showing the height on the optical axis direction according to the distance in the first direction Y with respect to the object-side surface and the sensor-side surface in the n-th lens and the n−1th lens of the optical system of FIG. 2.

Referring to FIGS. 1 and 2, the optical system 1000 according to the first embodiment includes a plurality of lenses 100, and the plurality of lenses 100 may include a first lens 101 to a ninth lens 109. The first to ninth lenses 101-109 may be sequentially disposed along the optical axis OA of the optical system 1000. The light corresponding to the information of the object may pass through the first lens 101 to the ninth lens 109 to be incident on the image sensor 300.

The first lens 101 may have positive (+) or negative (−) refractive power on the optical axis OA. The first lens 101 may have positive (+) refractive power. The first lens 101 may include a plastic or glass material. For example, the first lens 101 may be made of a plastic material. The first lens 101 may include a first surface S1 defined as an object-side surface and a second surface S2 defined as a sensor-side surface. On the optical axis OA, the first surface S1 may have a convex shape, and the second surface S2 may have a convex shape. That is, the first lens 101 may have a shape in which both sides are convex on the optical axis OA. Alternatively, on the optical axis OA, the first surface S1 may have a convex shape, and the second surface S2 may have a concave shape. That is, the first lens 101 may have a meniscus shape convex from the optical axis OA toward the object. At least one of the first surface S1 and the second surface S2 may be an aspherical surface. For example, both the first surface S1 and the second surface S2 may be aspherical. Aspheric coefficients of the first and second surfaces S1 and S2 are provided as shown in FIG. 4, L1 is the first lens 101, and S1/S2 indicate the first/second surface of L1.

The second lens 102 may have positive (+) or negative (−) refractive power on the optical axis OA. The second lens 102 may have negative (−) refractive power. The second lens 102 may include a plastic or glass material. For example, the second lens 102 may be made of a plastic material. The second lens 102 may include a third surface S3 defined as an object-side surface and a fourth surface S4 defined as a sensor-side surface. On the optical axis OA, the third surface S3 may have a convex shape, and the fourth surface S4 may have a concave shape. That is, the second lens 102 may have a meniscus shape convex from the optical axis OA toward the object. Alternatively, on the optical axis OA, the third surface S3 may have a convex shape, and the fourth surface S4 may have a convex shape. That is, the second lens 102 may have a shape in which both sides are convex on the optical axis OA. At least one of the third surface S3 and the fourth surface S4 may be an aspherical surface. For example, both the third surface S3 and the fourth surface S4 may be aspherical. Aspheric coefficients of the third and fourth surfaces S3 and S4 are provided as shown in FIG. 4, L2 is the second lens 102, and S1/S2 of L2 represents the first/second surface of L2.

In the thickness of the first and second lenses 101 and 102 on the optical axis OA, that is, the center thickness of the lens, the second lens 102 may be thinner and the first lens 101 may be thicker. Accordingly, the optical system 1000 may control incident light, and may have improved aberration characteristics and resolution.

In the average size of the effective diameter (e.g., clear aperture (CA)) of the lens among the first and second lenses 101 and 102, the second lens 102 may be smaller than that of the first lens 101. Specifically, among the first and second lenses 101 and 102, the size of the effective diameter H1 (see FIG. 1) of the first surface S1 may be the largest, and the effective diameter of the fourth surface S4 of the second lens 102 may be the same as or larger than the effective diameter of the fifth surface S5. The average size of the effective diameter is an average value of the effective diameter of the object side surface and the effective diameter of the sensor side surface of each lens. Accordingly, the optical system 1000 may have improved chromatic aberration control characteristics, and may improve vignetting characteristics of the optical system 1000 by controlling incident light.

The refractive index of the second lens 102 may be greater than that of the first lens 101. The refractive index of the second lens 102 may be greater than 1.6, and the refractive index of the first lens 101 may be less than 1.6. The second lens 102 may have an Abbe number smaller than the Abbe number of the first lens 101. For example, the Abbe number of the second lens 102 may be smaller than the Abbe number of the first lens 101 with a difference of 20 or more. In detail, the Abbe number of the first lens 101 may be 20 or more greater than the Abbe number of the second lens 102, for example, 40 or more. Accordingly, the optical system 1000 may have improved chromatic aberration control characteristics.

The third lens 103 may have positive (+) or negative (−) refractive power on the optical axis OA. The third lens 103 may have negative (−) refractive power. The third lens 103 may include a plastic or glass material. For example, the third lens 103 may be made of a plastic material. The third lens 103 may include a fifth surface S5 defined as an object-side surface and a sixth surface S6 defined as a sensor-side surface. On the optical axis OA, the fifth surface S5 may have a convex shape, and the sixth surface S6 may have a concave shape. That is, the third lens 103 may have a meniscus shape convex from the optical axis OA toward the object. Alternatively, on the optical axis OA, the fifth surface S5 may have a concave shape, and the sixth surface S6 may have a concave shape. That is, the third lens 103 may have a shape in which both surfaces are concave from the optical axis OA to the optical axis OA. As another example, all of the fifth and sixth surfaces S5 and S6 may have a convex shape. At least one of the fifth surface S5 and the sixth surface S6 may be an aspherical surface. For example, both the fifth surface S5 and the sixth surface S6 may be aspherical. Aspheric coefficients of the fifth and sixth surfaces S5 and S6 are provided as shown in FIG. 4, L3 is the third lens 103, and S1/S2 of L3 indicate the first/second surface of L3. The effective diameter of at least one or both of the fifth and sixth surfaces S6 and S7 may be the smallest among the effective diameters of the first to eighteenth surfaces S1-S18. For example, the effective diameter H3 of the fifth surface S5 may be the same as or smaller than the effective diameter of the fourth surface S4.

The refractive index of the third lens 103 may be greater than that of the first lens 101, and may be the same as that of the second lens 102. The refractive index of the third lens 103 may be greater than 1.6. The third lens 103 may have an Abbe number smaller than the Abbe number of the first lens 101. For example, the Abbe number of the third lens 103 may be smaller than the Abbe number of the first lens 101 by 20 or more, and may be the same as the Abbe number of the second lens 102. In detail, the Abbe number of the first lens 101 may be 20 or more greater than the Abbe number of the second and third lenses 102 and 103, for example, 40 or more. Accordingly, the optical system 1000 may have improved chromatic aberration control characteristics. A distance between the second lens 102 and the third lens 103 on the optical axis OA may be smaller than a thickness of the first lens 101 on the optical axis, and may be greater than a thickness of the second lens 102 on the optical axis, and may be larger than the thicknesses of the second and third lenses 102 and 103 on the optical axis.

The fourth lens 104 may have positive (+) or negative (−) refractive power on the optical axis OA. The fourth lens 104 may have positive (+) refractive power. The fourth lens 104 may include a plastic or glass material. For example, the fourth lens 104 may be made of a plastic material. The fourth lens 104 may include a seventh surface S7 defined as an object-side surface and an eighth surface S8 defined as a sensor-side surface. On the optical axis OA, the seventh surface S7 may have a convex shape, and the eighth surface S8 may have a concave shape. That is, the fourth lens 104 may have a meniscus shape convex from the optical axis OA toward the object. Alternatively, the seventh surface S7 may have a convex shape on the optical axis OA, and the eighth surface S8 may have a convex shape on the optical axis OA. That is, the fourth lens 104 may have a convex shape on both sides of the optical axis OA. Alternatively, the seventh surface S7 may have a concave shape on the optical axis OA, and the eighth surface S8 may have a convex shape on the optical axis OA. That is, the fourth lens 104 may have a meniscus shape convex from the optical axis OA toward the sensor. Alternatively, the seventh surface S7 may have a concave shape on the optical axis OA, and the eighth surface S8 may have a concave shape on the optical axis OA. That is, the fourth lens 104 may have a concave shape on both sides of the optical axis OA. At least one of the seventh surface S7 and the eighth surface S8 may be an aspherical surface. For example, both the seventh surface S7 and the eighth surface S8 may be aspherical. Aspheric coefficients of the seventh and eighth surfaces S7 and S8 are provided as shown in FIG. 4, L4 is the fourth lens 104, and S1/S2 of L4 indicate the first/second surface of L4. The refractive index of the fourth lens 104 may be smaller than that of the third lens 103. The fourth lens 104 may have a larger Abbe number than that of the second and third lenses 102 and 103. For example, the Abbe number of the fourth lens 104 may be about 5 or more greater than the Abbe numbers of the third lens 103. The Abbe numbers of the second, third, and fourth lenses 112, 113, and 114 may be less than 40. Accordingly, the optical system 1000 may have improved chromatic aberration control characteristics.

The fifth lens 105 may have positive (+) or negative (−) refractive power on the optical axis OA. The fifth lens 105 may have positive (+) refractive power. The fifth lens 105 may include a plastic or glass material. For example, the fifth lens 105 may be made of a plastic material. The fifth lens 105 may include a ninth surface S9 defined as an object-side surface and a tenth surface S10 defined as a sensor-side surface. On the optical axis OA, the ninth surface S9 may have a convex shape, and the tenth surface S10 may have a convex shape. That is, the fifth lens 105 may have a shape in which both surfaces are convex on the optical axis OA. Alternatively, the ninth surface S9 may have a convex shape on the optical axis OA, and the tenth surface S10 may have a concave shape on the optical axis OA, and the fifth lens 105 may have a convex meniscus shape toward the object. Alternatively, the ninth surface S9 may have a concave shape on the optical axis OA, and the tenth surface S10 may have a convex shape on the optical axis OA. That is, the fifth lens 105 may have a meniscus shape convex from the optical axis OA toward the sensor. Alternatively, the ninth surface S9 may have a concave shape on the optical axis OA, and the tenth surface S10 may have a concave shape on the optical axis OA. That is, the fifth lens 105 may have a concave shape on both sides of the optical axis OA. At least one of the ninth surface S9 and the tenth surface S10 may be an aspherical surface. For example, both the ninth surface S9 and the tenth surface S10 may be aspherical. Aspheric coefficients of the ninth and tenth surfaces S9 and S10 are provided as shown in FIG. 4, L5 is the fifth lens 105, and S1/S2 of L5 indicate the first/second surface of L5.

The sixth lens 106 may have positive (+) or negative (−) refractive power on the optical axis OA. The sixth lens 106 may have positive (+) refractive power. The sixth lens 106 may include a plastic or glass material. For example, the sixth lens 106 may be made of a plastic material. The sixth lens 106 may include an eleventh surface S11 defined as an object-side surface and a twelfth surface S12 defined as a sensor-side surface. The eleventh surface S11 may have a concave shape on the optical axis OA, and the twelfth surface S12 may have a convex shape on the optical axis OA. That is, the sixth lens 106 may have a meniscus shape convex from the optical axis OA toward the sensor. Alternatively, the eleventh surface S11 may have a convex shape on the optical axis OA, and the twelfth surface S12 may have a convex shape on the optical axis OA. That is, the sixth lens 106 may have a shape in which both sides are convex on the optical axis OA. At least one of the eleventh surface S11 and the twelfth surface S12 may be an aspherical surface. For example, both the eleventh surface S11 and the twelfth surface S12 may be aspherical. Aspheric coefficients of the eleventh and twelfth surfaces S11 and S12 are provided as shown in FIG. 4, L6 is the sixth lens 106, and S1/S2 of L6 indicate the first/second surface of L6.

The seventh lens 107 may have positive (+) or negative (−) refractive power on the optical axis OA. The seventh lens 107 may have negative (−) refractive power. The seventh lens 107 may include a plastic or glass material. For example, the seventh lens 107 may be made of a plastic material. The seventh lens 107 may include a thirteenth surface S13 defined as an object-side surface and a fourteenth surface S14 defined as a sensor-side surface. The thirteenth surface S13 may have a concave shape on the optical axis OA, and the fourteenth surface S14 may have a convex shape on the optical axis OA. That is, the seventh lens 107 may have a meniscus shape convex from the optical axis OA toward the sensor. Alternatively, the thirteenth surface S13 may have a convex shape on the optical axis OA, and the fourteenth surface S14 may have a convex shape on the optical axis OA, that is, the seventh lens 107 may have a shape in which both sides are convex on the optical axis OA. Alternatively, the seventh lens 107 may have a meniscus shape convex toward the object or a concave shape on both sides. At least one of the thirteenth surface S13 and the fourteenth surface S14 may be an aspherical surface. For example, both the thirteenth surface S13 and the fourteenth surface S14 may be aspherical. Aspheric coefficients of the thirteenth and fourteenth surfaces S13 and S14 are provided as shown in FIG. 4, L7 is the seventh lens 107, and S1/S2 of L7 indicate the first/second surface of L7.

The eighth lens 108 may have positive (+) or negative (−) refractive power on the optical axis OA. The eighth lens 108 may have positive (+) refractive power. The eighth lens 108 may include a plastic or glass material. For example, the eighth lens 108 may be made of a plastic material. The eighth lens 108 may include a fifteenth surface S15 defined as an object-side surface and a sixteenth surface S16 defined as a sensor-side surface. The fifteenth surface S15 may have a convex shape on the optical axis OA, and the sixteenth surface S16 may have a concave shape on the optical axis OA. That is, the eighth lens 108 may have a meniscus shape convex from the optical axis OA toward the object. Alternatively, the fifteenth surface S15 may have a convex shape on the optical axis OA, and the sixteenth surface S16 may have a convex shape on the optical axis OA. That is, the eighth lens 108 may have a shape in which both sides are convex. The eighth lens 108 may have a meniscus shape convex toward the sensor or a concave shape on both sides. At least one of the fifteenth surface S15 and the sixteenth surface S16 may be an aspherical surface. For example, both the fifteenth surface S15 and the sixteenth surface S16 may be aspherical. Aspheric coefficients of the fifteenth and sixteenth surfaces S16 and S16 are provided as shown in FIG. 4, L8 is the eighth lens 108, and S1/S2 of L8 indicate the first/second surface of L8.

The ninth lens 109 may have positive (+) or negative (−) refractive power on the optical axis OA. The ninth lens 109 may have negative (−) refractive power. The ninth lens 109 may include a plastic or glass material. For example, the ninth lens 109 may be made of a plastic material. The ninth lens 109 may include a seventeenth surface S17 defined as an object-side surface and an eighteenth surface S18 defined as a sensor-side surface. The seventeenth surface S17 may have a convex shape on the optical axis OA, and the eighteenth surface S18 may have a concave shape on the optical axis OA. That is, the ninth lens 109 may have a meniscus shape convex from the optical axis OA toward the object. Alternatively, the seventeenth surface S17 may have a concave shape on the optical axis OA, and the eighteenth surface S18 may have a concave shape on the optical axis OA. That is, the ninth lens 109 may have a concave shape on both sides of the optical axis OA. At least one of the seventeenth surface S17 and the eighteenth surface S18 may be an aspherical surface. For example, both the seventeenth surface S17 and the eighteenth surface S18 may be aspherical. Aspheric coefficients of the seventeenth and eighteenth surfaces S17 and S18 are provided as shown in FIG. 4, L9 is the ninth lens 109, and S1/S2 of L9 indicate the first surface/second surface of L9.

The second lens group G2 may include the third to ninth lenses 103, 104, 105, 106, 107, 108 and 109. The thicknesses of the third to ninth lenses 103, 104, 105, 106, 107, 108, and 109 on the optical axis OA, that is, the center thickness, may be the thinnest of at least one of the third and fourth lenses 103 and 104, and for example, the fourth lens 104 may have the thinnest thickness. The center thickness of the sixth lens 106 in the second lens group G2 may be the thickest, and may be at least twice the center thickness of the fourth lens 104. In the second lens group G2, lenses of 70% or more may have a lens center thickness of 0.4 mm or less, and lenses of 30% or less may have a lens center thickness greater than 0.4 mm. For example, the center thicknesses of the third, fourth, fifth, seventh, and ninth lenses 103, 104, 105, 107 and 109 may be 0.4 mm or less, and the center thicknesses of the sixth and eighth lenses 106 and 108 may be greater than 0.4 mm. Accordingly, the optical system 1000 may control incident light, and may have improved aberration characteristics and resolution.

A lens having the thickest center thickness in the first lens group G1 may have a thinner thickness than a lens having the thickest center thickness in the second lens group G2. The maximum center thickness among the first to ninth lenses 101 to 109 may be smaller than the maximum center distance, for example, 0.8 times or more or 0.8 times to 0.99 times the maximum center distance. For example, the center thickness of the sixth lens 106 is the largest among the lenses, the center distance d89 between the eighth lens 108 and the ninth lens 109 is the maximum among the center distances between the lenses, the center thickness of the ninth lens 109 may be 0.7 times or less of the center distance between the eighth and ninth lenses 108 and 109, for example, in the range of 0.4 times to 0.7 times. In the average size of the effective diameters (e.g., clear aperture) of the third to ninth lenses 103,104, 105,106, 107, 108, 109, the third lens 103 may have the smallest effective diameter and the ninth lens 109 may have the largest effective diameter. Preferably, the object-side fifth surface S5 of the third lens 103 may have the smallest effective diameter among the lens surfaces of the plurality of lenses 100, and the size of the effective diameter H9 of the eighteenth surface S18 may be the largest. The size of the effective diameter H9 of the eighteenth surface S18 of the plurality of lenses 100 may be 1.8 times or more, for example, 1.8 times to 2.3 times the effective diameter of the fifth surface S5. Among the plurality of lenses 100, the ninth lens 109 has the largest average effective diameter, the second lens 102 has the smallest average effective diameter, and the average effective diameter of the ninth lens 109 may be 1.8 times or more, for example, 1.8 times to 2.3 times of the average effective diameter of the second lens 102. The effective diameter of the ninth lens 109 is the largest, so that the incident light may be effectively refracted toward the image sensor 300. Accordingly, the optical system 1000 may have improved chromatic aberration control characteristics, and the vignetting characteristics of the optical system 1000 may be improved by controlling incident light.

The refractive index of the seventh lens 107 may be greater than the refractive index of the eighth and ninth lenses 108 and 109. The refractive index of the eighth and ninth lenses 108 and 109 may be less than 1.6, and the refractive index of the seventh lens 107 may be greater than or equal to 1.6. The seventh lens 107 may have an Abbe number smaller than the Abbe numbers of the eighth and ninth lenses 108 and 109. For example, the Abbe number of the seventh lens 107 may be small with a difference of 15 or more from the Abbe numbers of the eighth and ninth lenses 108 and 109. In detail, the Abbe numbers of the eighth and ninth lenses 108 and 109 may be greater than the Abbe number of the seventh lens 107 by 20 or more. In the second lens group G2, the number of lenses having a refractive index exceeding 1.6 may be smaller than the number of lenses having a refractive index of less than 1.6. In the second lens group G2, the number of lenses having an Abbe number greater than 50 may be smaller than the number of lenses less than 50. Accordingly, the optical system 1000 may have improved chromatic aberration control characteristics.

A critical point of the plurality of lenses 100 will be described as follows.

The first lens 101 may include at least one critical point. In detail, the first surface S1 may be provided without a critical point, and the second surface S2 may have at least one critical point. The critical point of the second surface S2 may be located at a position of 45% or more of the effective radius of the second surface S2, for example, in a range of 47% to 65%. That is, the critical point of the second surface S2 may be located at a position of 45% or more of the effective radius of the second surface S2 from the optical axis OA, which is the distance from the optical axis OA to the end of the effective region, for example, in the range of 47% to 65%. Here, the third and fourth surfaces S3 and S4 of the second lens 102 may be provided without a critical point.

At least one or both of the fifth and sixth surfaces S5 and S6 of the third lens 103 may have a critical point. For example, all of the fifth and sixth surfaces S5 and S6 may have critical points. The critical point of the fifth surface S5 may be located at a position of 70% or more of the effective radius of the fifth surface S5 from the optical axis OA, which is a distance from the optical axis OA to the end of the effective region, for example, in the range of 70% to 90% or 75% to 85%. The critical point of the sixth surface S6 may be located at a position of 60% or more of the effective radius of the sixth surface S6 from the optical axis OA, for example, in the range of 60% to 76% or in the range of 65% to 76%. Accordingly, the fifth and sixth surfaces S5 and S6 may diffuse the light incident through the fourth surface S4.

At least one of the seventh and eighth surfaces S7 and S8 of the fourth lens 104 may have a critical point. The seventh surface S7 may have at least one critical point, and for example, may be located at a position of 45% or more of the effective radius of the seventh surface S7 from the optical axis OA, for example, in a range of 45% to 60%. Since the critical point of the seventh surface S7 is located at a position of 60% or less, it may be located closer to the optical axis OA than the critical points of the third and fourth surfaces S3 and S4 from the optical axis OA. In addition, the seventh surface S7 may further include another critical point around the end of the effective region, and the critical point around the end may be disposed at a position of 80% or more of the effective radius and may be removed. The eighth surface S8 may be provided without a critical point. Here, the ninth and tenth surfaces S9 and S10 of the fifth lens 105 may be provided without a critical point. The eleventh and twelfth surfaces S11 and S12 of the sixth lens 106 may be provided without a critical point.

At least one of the thirteenth and fourteenth surfaces S13 and S14 of the seventh lens 107 may have a critical point. For example, all of the thirteenth and fourteenth surfaces S13 and S14 may have critical points. The critical point of the thirteenth surface S13 may be located at a position of 90% or more of an effective radius of the thirteenth surface S13 from the optical axis OA, for example, in a range of 90% to 99%. The critical point of the fourteenth surface S14 may be located at a position of 90% or more of an effective radius of the fourteenth surface S14 from the optical axis OA, for example, in a range of 90% to 99%. Accordingly, the thirteenth and fourteenth surfaces S13 and S14 may diffuse the light incident through the sixth lens 106.

As shown in FIG. 2, at least one or both of the fifteenth and sixteenth surfaces S15 and S16 of the eighth lens 108 may have a critical point. For example, all of the fifteenth and sixteenth surfaces S15 and S16 may have critical points P4 and P3. The critical point P4 of the fifteenth surface S15 may be located at a distance dP4 of 65% or more of the effective radius of the fifteenth surface S15 from the optical axis OA, for example, in the range of 65% to 80% or 70% to 80%. The critical point P3 of the sixteenth surface S16 may be located at a distance dP3 of 65% or more of the effective radius r8 of the sixteenth surface S16 from the optical axis OA, for example, in the range of 65% to 80% or 65% to 75%. Accordingly, the fifteenth and sixteenth surfaces S15 and S16 may diffuse the light incident through the seventh lens 107. The positions of the critical points P4 and P3 of the fifteenth and sixteenth S15 and S16 may be disposed further outside than the positions of the critical points of the thirteenth and fourteenth surfaces S13 and S14 of the seventh lens 107 with respect to the optical axis OA.

At least one or both of the seventeenth and eighteenth surfaces S17 and S18 of the ninth lens 109 may have a critical point. For example, all of the seventeenth and eighteenth surfaces S17 and S18 may have critical points P2 and P1. The critical point P2 of the seventeenth surface S17 may be located at a distance dP2 of 45% or less of the effective radius of the seventeenth surface S17 from the optical axis OA, for example, in the range of 30% to 45%. The critical point P1 of the eighteenth surface S18 may be located at a distance dP1 of 55% or less of the effective radius r9 of the eighteenth surface S18 from the optical axis OA, for example, in the range of 45% to 55%. Accordingly, the seventeenth and eighteenth surfaces S17 and S18 may diffuse the light refracted through the eighth lens 108 to the periphery portion of the image sensor 300. The positions of the critical points P2 and P1 of the seventeenth and eighteenth S17 and S18 may be disposed further inside than the positions of the critical points P4 and P3 of the fifteenth and sixteenth surfaces S15 and S16 of the eighth lens 108 with respect to the optical axis OA. Here, the critical point may mean a point at which a slope of the normal K2 and the optical axis OA is 0 on the sensor-side eighteenth surface S18. In addition, the critical point may mean a point where the slope between an imaginary line extending in a direction perpendicular to the optical axis OA and the tangent line K1 on the eighteenth surface S18 is 0 degrees.

FIG. 7(A) is a graph showing the height on a direction of the optical axis along the distance in the first direction Y from the optical axis OA with respect to the object-side fifteenth surface S15 and the sensor-side sixteenth surface S16 in the eighth lens 108 of FIG. 2, L8 is the eighth lens, L8S1 is the fifteenth surface, L8S2 is the sixteenth surface, L9 is the ninth lens, L9S1 is the seventeenth surface, and L9S2 is the eighteenth surface.

As shown in FIG. 7(A), it may be seen that the fifteenth surface L8S1 and the sixteenth surface L8S2 of the eighth lens 108 are located on the sensor side based on a straight line orthogonal to the center 0 of each lens surface, and it may be seen that the critical point of L8S1 is closer to the optical axis than the critical point of L8S2. It may be seen that the critical point of L8S1 is located at 1.5 mm+0.1 mm, and the critical point of L8S2 is located at 1.7 mm+0.1 mm. As shown in FIG. 7(B), when the seventeenth surface L9S1 of the ninth lens 109 is viewed on the basis of a straight line orthogonal to the center 0, a region adjacent to the center 0 is located to the sensor-side region, a region adjacent to the end of the effective region is located to the object-side region, and the critical point of L9S1 may be located in the range of 0.9 mm+0.1 mm of the sensor-side region. In addition, when the eighteenth surface L9S2 of the ninth lens 109 is viewed on the basis of a straight line orthogonal to the center 0, a region adjacent to the center 0 is located to the sensor-side region, a region adjacent to the end of the effective region is located to the object-side region, and the critical point of L9S2 is located more outside than the critical point of L9S1 and may be located at 1.3 mm+0.1 mm of the sensor-side region. In addition, the sensor-side region of L9S2 exists in the range of 80% to 90% based on a straight line perpendicular to the center 0. Here, the sensor-side region is a region up to 0.3 mm above the straight line perpendicular to the center 0, and the object-side region is a region up to −0.5 mm below the straight line orthogonal to the center 0.

The positions of the critical points P1, P2, P3, and P4 of the eighth and ninth lenses 108 and 109 are preferably arranged at positions satisfying the above-described ranges in consideration of the optical characteristics of the optical system 1000. In detail, the position of the critical point preferably satisfies the above-described range for controlling optical characteristics such as chromatic aberration, distortion characteristics, aberration characteristics, and resolution of the optical system 1000. Accordingly, the path of the light emitted to the image sensor 300 through the lens may be effectively controlled. Accordingly, the optical system 1000 according to the embodiment may have improved optical characteristics not only in the central portion of FOV but also in the peripheral portion.

Figure 9:
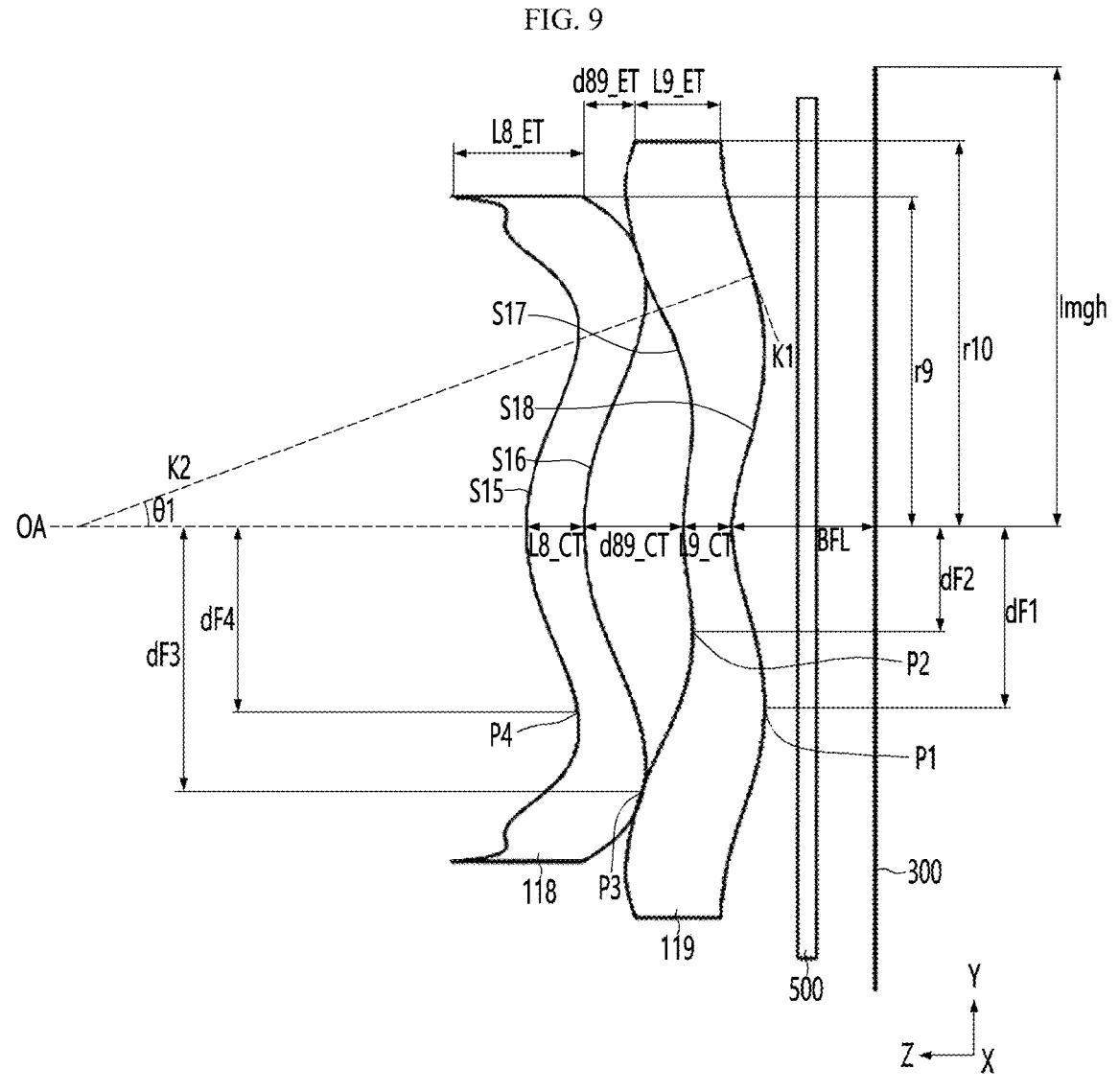
FIG. 9 is an explanatory diagram illustrating a relationship between an image sensor, an n-th lens, and an n-1th lens in the optical system of FIG. 8.

As shown in FIGS. 2 and 9, the normal line K2 passing through any point on the sensor-side eighteenth surface S18 of the ninth lens 109 and 119 which is the last lens, may have a predetermined angle θ1 with the optical axis OA. The angle θ1 may be greater than 5 degrees and less than 45 degrees. L9_CT is the center thickness or optical axis thickness of the ninth lenses 109 and 119, and L9_ET is the end or edge thickness of the effective region of the ninth lenses 109 and 119. L8 CT is the center thickness or optical axis thickness of the eighth lenses 108 and 118, and L8_ET is the end or edge thickness of the effective region of the eighth lenses 108 and 118. The edge thickness L8_ET of the eighth lenses 108 and 118 is the distance on the optical axis direction from the end of the effective region of the fifteenth surface S15 to the effective region of the sixteenth surface S16. The edge thickness L9_ET of the ninth lenses 109 and 119 is the distance on the optical axis direction from the end of the effective region of the seventeenth surface S17 to the effective region of the eighteenth surface S18. d89_CT is a distance on the optical axis (i.e., center distance) from the center of the sensor-side surface of the eighth lenses 108 and 118 to the center of the object-side surface of the ninth lens 109 and 119. That is, d89 CT is a distance between the sixteenth surface S16 and the seventeenth surface S17 on the optical axis OA. d89_ET is a distance (i.e., an edge interval) on the optical axis direction from the edges of the eighth lenses 108 and 118 to the edges of the ninth lenses 109 and 119. That is, d89_ET is a distance on the optical axis direction between a straight line extending outward from the end of the effective region of the sixteenth surface S16 and the end of the effective region of the seventeenth surface S17. Here, the distance between the ends of the effective region between adjacent lens surfaces is the optical axis distance between the straight line extending from the end having the short effective radius and the end of the effective region facing the same. Back focal length (BFL) is a distance on the optical axis from the image sensor 300 to the last lens.

In this way, the center thicknesses and the edge thicknesses of the first to ninth lenses 101 to 109, and the center distances and the edge distances between the two adjacent lenses may be set. For example, as shown in FIGS. 3 and 10, a distance between adjacent lenses may be provided, for example, in a region spaced at a predetermined distance (e.g., 0.1 mm) along the first direction Y with respect to the optical axis OA, and may be represented as a first distance d12 between the first lens 101 and 111 and the second lens 102 and 112, a second distance d23 between the second lens 102 and 112 and the third lens 103 and 113, a third distance d34 between the third lens 103 and 113 and the fourth lens 104 and 114, a fourth distance d45 between the fourth lens 104 and 114 and the fifth lens 105 and 115, a fifth distance d56 between the fifth lens 105 and 115 and the sixth lens 106 and 116, a sixth distance d67 between the sixth lens 106 and 116 and seventh lens 107 and 117, a seventh distance between the seventh lenses 107 and 117 and the eighth lenses 108 and 118, and an eighth distance d89 between the eighth lenses 108 and 118 and the ninth lenses 109 and 119. In the description of FIGS. 3 and 10, the first direction Y may include a circumferential direction around the optical axis OA or two directions orthogonal to each other, and the distance between two adjacent lenses at the end of the first direction Y may be a reference for an end of the effective region with a smaller effective radius, and the end of the effective radius may include an error of +0.2 mm at the end.

Referring to FIGS. 3 and 1, the first distance d12 may be a distance on the optical axis direction Z between the first lens 101 and the second lens 102 along the first direction Y. In the first distance d12, when an optical axis OA is a starting point and an end point of an effective region of the third surface S3 of the second lens 102 is the endpoint, the first distance d12 may gradually increase from the optical axis OA toward the first direction Y. The first distance d12 may be the minimum on the optical axis OA and the maximum on the end of the effective region. The maximum value in the first distance d12 may be 12 times or more, for example, 12 times to 17 times the minimum value. Accordingly, the optical system 1000 may effectively control the incident light, and the light incident through the first and second lenses 101 and 102 may proceed to another lens by the first distance d12 and may be maintained good optical performance.

The second distance d23 may be a distance on the optical axis direction Z between the second lens 102 and the third lens 103. In the second distance d23, when an optical axis OA is a starting point and an end of an effective region of the fifth surface S5 of the third lens 103 is end point, the second distance d23 may gradually decrease in the first direction Y from the optical axis OA toward the end point. The second distance d23 may be a maximum at the optical axis OA or the start point, and a minimum at an end point. The maximum value of the second distance d23 may be three or more times the minimum value. In detail, the maximum value of the second distance d23 may satisfy three to five times the minimum value. Accordingly, the optical system 1000 may have improved optical characteristics, and the aberration characteristics of the optical system 1000 may be improved by the second distance d23. The maximum value of the second distance d23 is greater than the maximum value of the first distance d12, and the minimum value of the second distance d23 may be a value between the minimum value and the maximum value of the first distance d12.

The first lens group G1 and the second lens group G2 may be spaced apart from each other by the third distance d34. The third distance d34 may be a distance on the optical axis direction Z between the third lens 103 and the fourth lens 104. In the third distance d34, when the optical axis OA is a starting point and the end of the effective region of the sixth surface S6 of the third lens 103 is the endpoint in the first direction Y, the third distance d34 decreases and increases from the optical axis OA toward the first direction Y. For example, the third distance d34 gradually decreases from the optical axis OA toward the position of the critical point of the sixth surface S6 of the third lens 103 in the first direction Y, and may increase again after the position of the critical point. That is, the third interval may have a maximum value at the end of the effective region and a minimum value near the position of the critical point (e.g., 1.1 mm). The maximum value may be in the range of 1.5 times or more, for example, 1.5 times to 3 times the minimum value. The maximum value of the third distance d34 may be smaller than the maximum value of the second distance d23, and the minimum value of the third distance d34 may be smaller than the minimum value of the second distance d23. Accordingly, by the third distance d34, the optical system 1000 may have improved chromatic aberration characteristics and may control vignetting characteristics.

The fourth distance d45 may be a distance on the optical axis direction Z between the fourth lens 104 and the fifth lens 105. When the optical axis OA is the starting point and the end of the effective region of the eighth surface S8 of the fourth lens 104 is the end point, the fourth distance d45 may be changed in a form that gradually decreases in the first direction Y toward the end point from the starting point, may have the maximum value less than or equal to 0.05 mm and greater than the minimum value of the first distance d12, and may have the minimum value smaller than the minimum value of the first distance d12.

The fifth distance d56 may be a distance on the optical axis direction Z between the fifth lens 105 and the sixth lens 106. When the optical axis OA is the starting point and the end of the effective region of the tenth surface S10 of the fifth lens 105 is the endpoint, the fifth distance d56 may increase and decrease from the optical axis OA toward the first direction Y, which is perpendicular to the optical axis OA. The fifth distance d56 may have a maximum value of 65% or more of the distance from the optical axis OA to the end point, for example, in a range of 65% to 72%. The minimum value of the fifth distance d56 is located at the optical axis, and the maximum value is greater than the maximum value of the fourth distance d45 and may be less than or equal to 0.05 mm. The minimum value of the fifth distance d56 may be smaller than the minimum value of the third distance d34, and the maximum value of the fifth distance d56 may be smaller than the maximum value of the third distance d34. Accordingly, the optical system 1000 may have improved optical properties, and may have good optical performance on the center and peripheral portions of FOV and may adjust an improved chromatic aberration and distortion aberration by the fourth and fourth distances d45 and d56.

The sixth distance d67 may be a distance on the optical axis direction between the sixth lens 106 and the seventh lens 107. In the sixth distance d67, when the optical axis OA is the starting point and the end of the effective region of the twelfth surface S12 of the sixth lens 106 is the end point, the minimum value of the sixth distance d67 is located in the range of 52% or more of the effective radius from the optical axis OA, for example, in the range of 52% to 62%, the maximum value is located at the end, and the sixth distance d67 may gradually increase from the minimum value to the maximum value. The maximum value of the sixth distance d67 may be in the range of 7 times or more, for example, 7 times to 15 times the minimum value. The maximum value of the sixth distance d67 may be 1.2 times or more, for example, 1.2 times to 2 times the maximum value of the third distance d34, and the minimum value may be greater than the minimum value of the third distance d34.

The seventh distance d78 may be a distance on the optical axis direction between the seventh lens 107 and the eighth lens 108. In the seventh distance d78, when the optical axis OA is the starting point and the effective region end of the fourteenth surface S14 of the seventh lens 107 is the end point, the maximum value of the seventh distance d78 is located in a region adjacent to the end of the effective region, for example, 80% or more or 80% to 90% of the effective radius from the optical axis, and the minimum value may be located on the optical axis. The seventh distance d78 may gradually increase from a minimum value to a maximum value. The maximum value of the seventh distance d78 may be 50 times or more, for example, 50 to 60 times the minimum value, and the minimum value may be smaller than the minimum value of the sixth distance d67. Accordingly, the optical system 1000 may have improved optical characteristics on the center and periphery portions of FOV. In addition, the optical system 1000 may have improved aberration control characteristics as the seventh lens 107 and the eighth lens 108 are spaced apart by a seventh distance d78 set according to a position, and may appropriately controlled the effective diameter of the ninth lens 109.

The eighth distance d89 may be a distance on the optical axis direction between the eighth lens 108 and the ninth lens 109. In the eighth distance d89, when the optical axis OA is the starting point and the effective region end of the sixteenth surface S16 of the eighth lens 108 is the endpoint, the maximum value of the eighth distance d89 is located on the optical axis, and the minimum value is located around the end of the effective region, for example, 80% or more, for example, 80% to 90% of the effective radius from the optical axis, and may gradually increase from a position of the minimum value toward a position of the maximum value. The maximum value of the eighth distance d89 may be 25 times or more of the minimum value, for example, in the range of 25 times to 35 times. By the eighth distance d89, distortion characteristics and aberration characteristics may be improved on the center and peripheral portions of the field of view FOV.

The maximum center thickness of the lenses 101 to 109 may be in the range of 2 times or more, for example, 2 to 4 times the minimum center thickness. The sixth lens 106 having the maximum center thickness may be more than twice that of the second lens 102 or the fourth lens 104, for example, in the range of 2 times to 4 times. Any one of the center thicknesses of the second lens 102 or the fourth lens 104 may be the minimum thickness, for example, the second lens 102.

The number of lenses having a center thickness of less than 0.5 mm among the plurality of lenses 100 may be greater than the number of lenses of 0.5 mm or more. The number of lenses of less than 0.5 mm among the plurality of lenses 100 may be 70% or more of the total number of lenses. Accordingly, the optical system 1000 may be provided in a structure having a slim thickness. Among the plurality of lens surfaces S1-S18, the number of surfaces having an effective radius of less than 1.50 mm may be smaller than the number of surfaces of 1.50 mm or more, for example, 30% or less or 15% to 30% of the total lens surfaces.

When the radius of curvature is described as an absolute value, the radius of curvature of the second surface S2 of the first lens 101 among the plurality of lenses 100 may be the largest among the lens surfaces, and may be in the range of 7 times or more, for example, 7 times to 20 times the radius of curvature of the first surface S1 or the sixth surface S6. When the focal length is described as an absolute value, the focal length of the third lens 103 among the plurality of lenses 100 may be the largest among the lenses, and 5 times or more of the focal length of the first lens 101, for example, in the range of 5 times to 10 times.

Table 1 is an example of lens data of the optical system of FIG. 1.

TABLE 1

| Lens | Surface | Radius (mm) of curvature | Thickness (mm)/ Distance (mm) | Refractive index | Abbe number | Effective diameter (mm) |
|---|---|---|---|---|---|---|
| Lens 1 | S1 | 3.084 | 0.625 | 1.529 | 45.400 | 3.080 |
| | S2 | −29.895 | 0.015 | | | 2.987 |
| Lens 2 | S3 | 2.036 | 0.212 | 1.701 | 15.800 | 2.827 |
| | (Stop) S4 | 1.481 | 0.394 | | | 2.694 |
| Lens 3 | S5 | 3.034 | 0.235 | 1.701 | 15.800 | 2.680 |
| | S6 | 2.621 | 0.154 | | | 2.690 |
| Lens 4 | S7 | 7.899 | 0.214 | 1.614 | 26.000 | 2.900 |
| | S8 | 12.545 | 0.041 | | | 3.120 |
| Lens 5 | S9 | 13.984 | 0.351 | 1.511 | 56.800 | 3.234 |
| | S10 | −12.270 | 0.036 | | | 3.262 |
| Lens 6 | S11 | −12.457 | 0.712 | 1.493 | 61.200 | 3.308 |
| | S12 | −4.779 | 0.092 | | | 3.306 |
| Lens 7 | S13 | −2.017 | 0.335 | 1.614 | 26.000 | 3.458 |
| | S14 | −2.636 | 0.015 | | | 3.595 |
| Lens 8 | S15 | 1.564 | 0.446 | 1.516 | 48.000 | 3.766 |
| | S16 | 2.383 | 0.734 | | | 4.164 |
| Lens 9 | S17 | 1.847 | 0.372 | 1.516 | 48.000 | 5.029 |
| | S18 | 1.162 | 0.500 | | | 5.316 |
| Filter | | Infinity | 0.145 | | | 5.774 |
| | | Infinity | 0.530 | | | 6.393 |
| Image sensor | | Infinity | | | | 6.483 |

Table 1 shows the radius of curvature, the thickness of the lens, the distance between the lenses on the optical axis OA of the first to ninth lenses 101-109 of FIG. 1, the refractive index at d-line, Abbe number, and the effective diameter (e.g., clear aperture (CA)).

As shown in FIG. 4, in the first embodiment, at least one lens surface of the plurality of lenses 100 may include an aspherical surface having a 30th order aspheric coefficient. For example, the first to ninth lenses 101, 102, 103, 104, 105, 106, 107, 108, and 109 may include a lens surface having a 30th order aspheric coefficient. As described above, since the aspherical surface having the 30th order aspheric coefficient (a value other than "0") may significantly change the aspherical shape of the peripheral portion, the optical performance of the peripheral portion of FOV may be well corrected.

FIG. 5 is a graph of the diffraction MTF characteristic of the optical system 1000 according to the first embodiment, and FIG. 6 is a graph of the aberration characteristic. In the aberration graph of FIG. 6, longitudinal spherical aberration, astigmatic field curves, and distortion aberration are measured from left to right. In FIG. 6, the X-axis may represent a focal length (mm) and distortion (%), and the Y-axis may mean the height of an image. In addition, the graph for spherical aberration is a graph for light in a wavelength band of about 470 nm, about 510 nm, about 555 nm, about 610 nm, and about 660 nm, and the graph for astigmatism and distortion aberration is a graph for light in a wavelength band of about 555 nm.

In the aberration diagram of FIG. 6, it may be interpreted that the aberration correction function is better as each curve approaches the Y axis, and referring to FIG. 6, it may be seen that the measured values of the optical system 1000 according to the embodiment are adjacent to the Y-axis. That is, the optical system 1000 according to the embodiment may have improved resolution and good optical performance not only in the center portion of FOV but also in the periphery portion.

Second Embodiment

Figure 12:
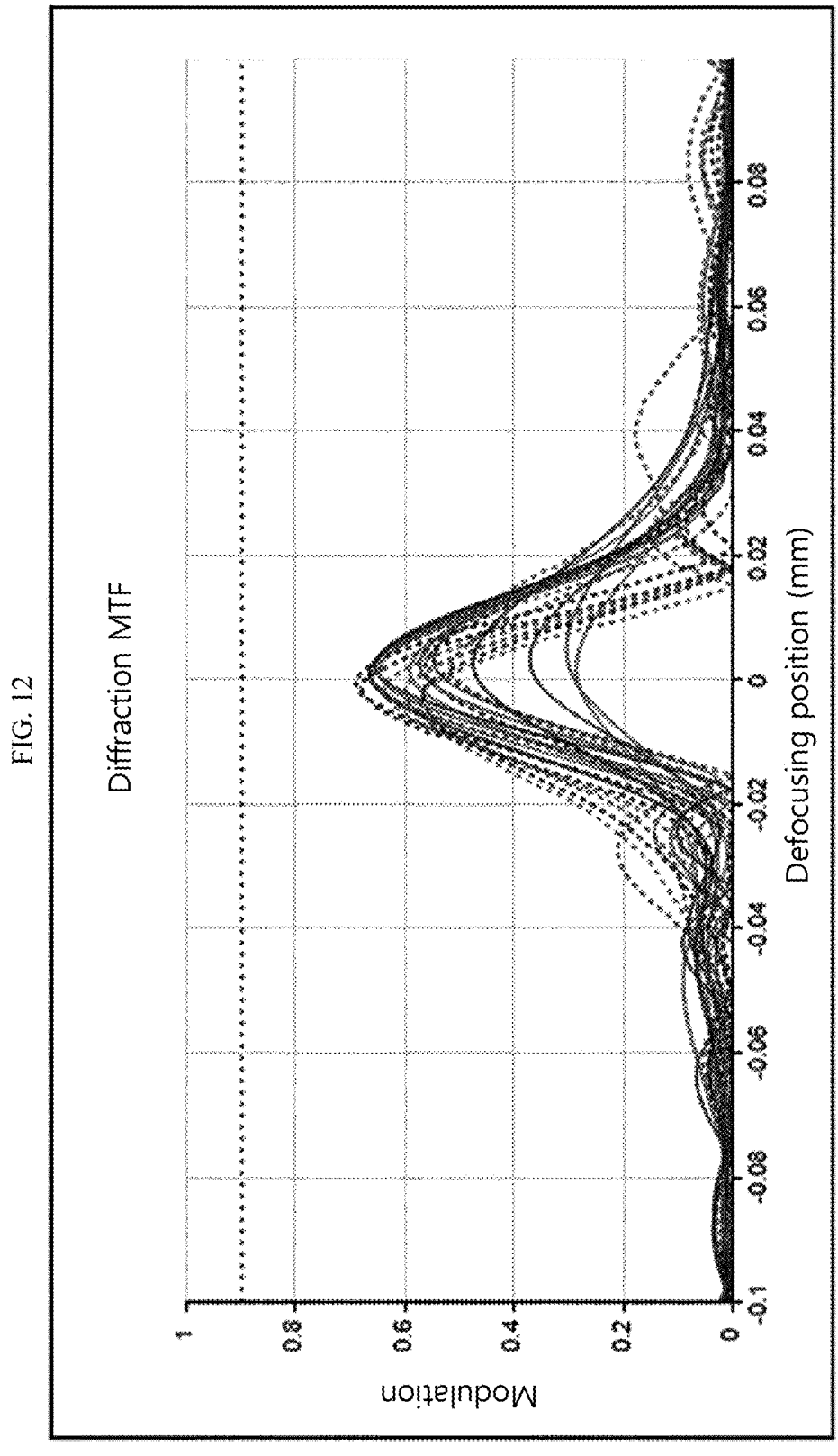
FIG. 12 is a graph of the diffraction MTF of the optical system of FIG. 8.
Figure 13:
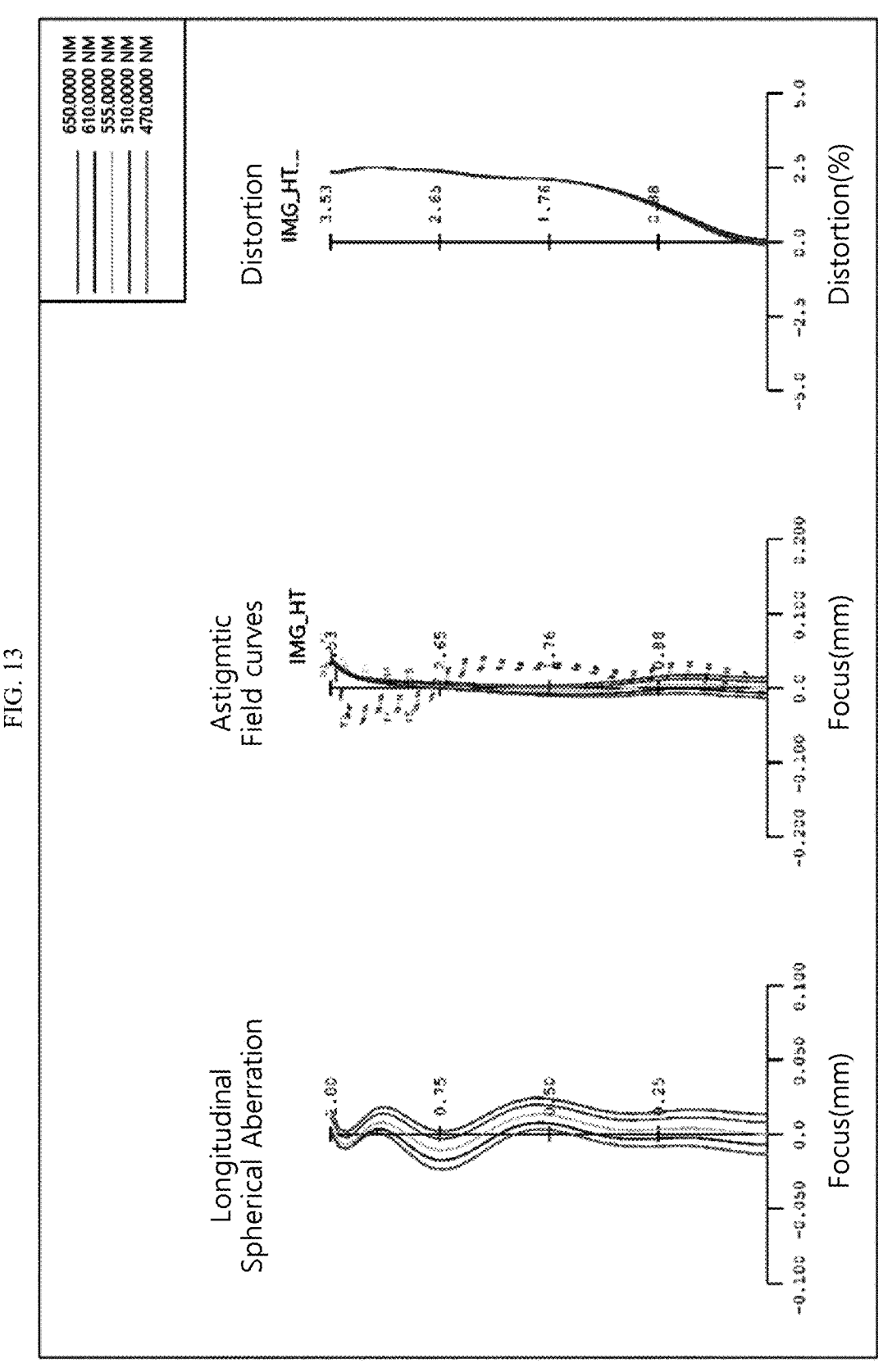
FIG. 13 is a graph showing aberration characteristics of the optical system of FIG. 8.
Figure 14A:
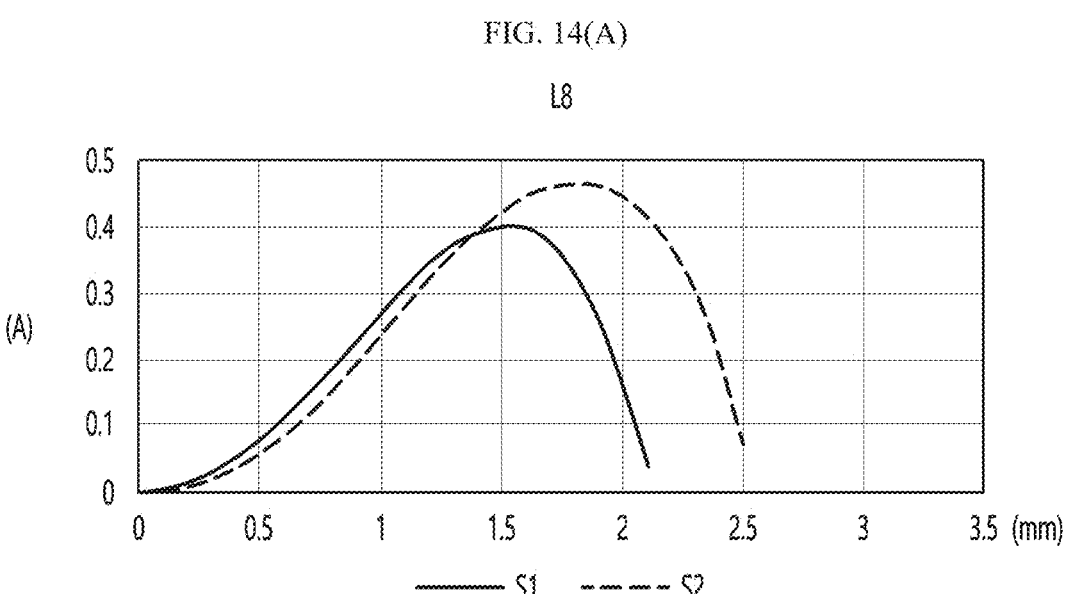
FIGS. 14(A) and 14(B) are graphs showing the height on the optical axis direction according to the distance in the first direction Y with respect to the object-side surface and the sensor-side surface in the n-th lens and the n−1th lens of the optical system of FIG. 9.
Figure 14B:
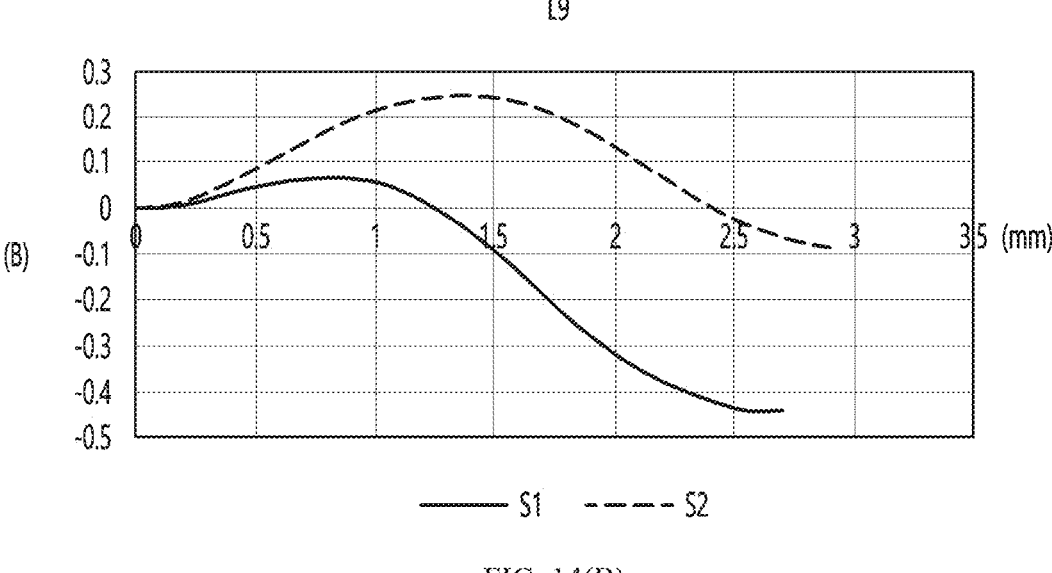

FIG. 8 is a block diagram of the optical system according to the second embodiment, FIG. 9 is a diagram illustrating the relationship between the image sensor, the n-th lens, and the n−1 lens in the optical system of FIG. 8, and FIG. 10 is data on the distances between two adjacent lenses in the optical system of FIG. 8, FIG. 11 is data on the aspherical coefficient of each lens surface in the optical system of FIG. 8, FIG. 12 is a graph for the diffraction MTF of the optical system of FIG. 8, FIG. 13 is a graph showing aberration characteristics of the optical system of FIG. 8, and FIGS. 14(A) and 14(B) are graphs showing the height on the optical axis direction according to the distance in the first direction Y with respect to the object-side surface and the sensor-side surface in the n-th lens and the n−1th lens of the optical system of FIG. 9. In the description of the second embodiment, the same configuration or material as that of the first embodiment will be omitted, and the description of the first embodiment may be selectively included.

Referring to FIGS. 8 and 9, the optical system 1000 according to the second embodiment includes a plurality of lenses 100A, and the plurality of lenses 100A include a first lens 111 and a second lens 112, a third lens 113, a fourth lens 114, a fifth lens 115, a sixth lens 116, an eighth lens 118, and a ninth lens 119. The first to ninth lenses 111-119 may be sequentially disposed along the optical axis OA of the optical system 1000.

The first lens 111 may have positive (+) or negative (−) refractive power on the optical axis OA. The first lens 111 may have positive (+) refractive power. On the optical axis OA, the first surface S1 of the first lens 111 may have a convex shape, and the second surface S2 may have a convex shape. That is, the first lens 111 may have a shape in which both sides are convex on the optical axis OA. Alternatively, on the optical axis OA, the first surface S1 may have a convex shape, and the second surface S2 may have a concave shape. That is, the first lens 111 may have a meniscus shape convex from the optical axis OA toward the object. At least one or both of the first surface S1 and the second surface S2 may be aspherical. Aspheric coefficients of the first and second surfaces S1 and S2 are provided as shown in FIG. 11, L1 is the first lens 111, and S1/S2 indicate the first/second surface of L1.

The second lens 112 may have positive (+) or negative (−) refractive power on the optical axis OA. The second lens 112 may have negative (−) refractive power. On the optical axis OA, the third surface S3 of the second lens 112 may have a convex shape, and the fourth surface S4 may have a concave shape. That is, the second lens 112 may have a meniscus shape convex toward the object from the optical axis OA. Alternatively, on the optical axis OA, the third surface S3 may have a convex shape, and the fourth surface S4 may have a convex shape. That is, the second lens 112 may have a shape in which both sides are convex on the optical axis OA. At least one or both of the third surface S3 and the fourth surface S4 may be aspherical. Aspheric coefficients of the third and fourth surfaces S3 and S4 are provided as shown in FIG. 11, L2 is the second lens 112, and S1/S2 of L2 represents the first/second surface of L2.

The first lens group G1 may include the first and second lenses 111 and 112. In the thickness of the first and second lenses 111 and 112 on the optical axis OA, that is, the center thickness of the lens, the second lens 112 may be thinner than that of the first lens 111. Accordingly, the optical system 1000 may control incident light, and may have improved aberration characteristics and resolution. An average size of an effective diameter (e.g., clear aperture (CA)) of the lens among the first and second lenses 111 and 112, the second lens 112 may be smaller than that of the first lens 111. In detail, the size of the effective diameter H1 (see FIG. 8) of the first surface S1 among the first and second lenses 111 and 112 may be the largest, and the effective diameter of the fourth surface S4 of the second lens 112 may be the same as or greater than the effective diameter of the fifth surface S5. Accordingly, the optical system 1000 may have improved chromatic aberration control characteristics, and the vignetting characteristics of the optical system 1000 may be improved by controlling incident light.

The refractive index of the second lens 112 may be greater than that of the first lens 111. The refractive index of the second lens 112 may be greater than 1.6, and the refractive index of the first lens 111 may be less than 1.6. The second lens 112 may have an Abbe number smaller than the Abbe number of the first lens 111. For example, the Abbe number of the second lens 112 may be smaller than the Abbe number of the first lens 111 with a difference of 20 or more. In detail, the Abbe number of the first lens 111 may be 20 or more greater than the Abbe number of the second lens 112, for example, 40 or more. Accordingly, the optical system 1000 may have improved chromatic aberration control characteristics.

The third lens 113 may have positive (+) or negative (−) refractive power on the optical axis OA. The third lens 113 may have negative (−) refractive power. On the optical axis OA of the third lens 113, the fifth surface S5 may have a convex shape, and the sixth surface S6 may have a concave shape. That is, the third lens 113 may have a meniscus shape convex from the optical axis OA toward the object. Alternatively, on the optical axis OA, the fifth surface S5 may have a concave shape, and the sixth surface S6 may have a concave shape. That is, the third lens 113 may have a shape in which both surfaces are concave on the optical axis OA. As another example, all of the fifth and sixth surfaces S5 and S6 may have a convex shape. At least one or both of the fifth surface S5 and the sixth surface S6 may be aspherical. Aspheric coefficients of the fifth and sixth surfaces S5 and S6 are provided as shown in FIG. 11, L3 is the third lens 113, and S1/S2 of L3 indicate the first surface/second surface of L3. The effective diameter size of at least one or both of the fourth and fifth surfaces S4 and S5 may be the smallest among the effective diameter sizes of the first to eighteenth surfaces S1-S18. For example, the size of the effective diameter H3 of the fifth surface S5 may be equal to or smaller than the size of the effective diameter of the fourth surface S4.

The refractive index of the third lens 113 may be greater than that of the first lens 111, and may be the same as the refractive index of the second lens 112. The refractive index of the third lens 113 may be greater than 1.6. The third lens 113 may have an Abbe number smaller than the Abbe number of the first lens 111. For example, the Abbe number of the third lens 113 may be smaller than the Abbe number of the first lens 111 by 20 or more, and may be the same as the Abbe number of the second lens 112. In detail, the Abbe number of the first lens 111 may be 20 or more greater than the Abbe number of the second and third lenses 112 and 113, for example, 40 or more. Accordingly, the optical system 1000 may have improved chromatic aberration control characteristics. A distance between the second lens 112 and the third lens 113 on the optical axis OA may be smaller than the thickness on the optical axis of the first lens 111, and may be greater than the thicknesses of the second, third lenses 112 and 113 on the optical axis, and may be greater than the thickness on the optical axis of the third lens 113.

The fourth lens 114 may have positive (+) or negative (−) refractive power on the optical axis OA. The fourth lens 114 may have positive (+) refractive power. On the optical axis OA of the fourth lens 114, the seventh surface S7 may have a convex shape, and the eighth surface S8 may have a concave shape. That is, the fourth lens 114 may have a meniscus shape convex from the optical axis OA toward the object. Alternatively, the seventh surface S7 may have a convex shape on the optical axis OA, and the eighth surface S8 may have a convex shape on the optical axis OA. That is, the fourth lens 114 may have a convex shape on both sides of the optical axis OA. Alternatively, the seventh surface S7 may have a concave shape on the optical axis OA, and the eighth surface S8 may have a convex shape on the optical axis OA. That is, the fourth lens 114 may have a meniscus shape convex from the optical axis OA toward the sensor. Alternatively, the seventh surface S7 may have a concave shape on the optical axis OA, and the eighth surface S8 may have a concave shape on the optical axis OA. That is, the fourth lens 114 may have a concave shape on both sides of the optical axis OA. At least one or both of the seventh surface S7 and the eighth surface S8 may be aspherical. Aspheric coefficients of the seventh and eighth surfaces S7 and S8 are provided as shown in FIG. 11, L4 is the fourth lens 114, and S1/S2 of L4 indicate the first/second surface of L4. The refractive index of the fourth lens 114 may be smaller than that of the third lens 113. The fourth lens 114 may have a larger Abbe number than that of the second and third lenses 112 and 113. For example, the Abbe number of the fourth lens 114 may be about 5 or more greater than the Abbe number of the third lens 113. The Abbe numbers of the second, third, and fourth lenses 112, 113, and 114 may be less than 40. Accordingly, the optical system 1000 may have improved chromatic aberration control characteristics.

The fifth lens 115 may have positive (+) or negative (−) refractive power on the optical axis OA. The fifth lens 115 may have positive (+) refractive power. On the optical axis OA of the fifth lens 115, the ninth surface S9 may have a convex shape, and the tenth surface S10 may have a convex shape. That is, the fifth lens 115 may have a shape in which both sides are convex on the optical axis OA. Alternatively, the ninth surface S9 may have a convex shape on the optical axis OA, and the tenth surface S10 may have a concave shape on the optical axis OA, and the fifth lens 115 may have a meniscus shape convex toward the object. Alternatively, the ninth surface S9 may have a concave shape on the optical axis OA, and the tenth surface S10 may have a convex shape on the optical axis OA. That is, the fifth lens 115 may have a meniscus shape convex from the optical axis OA toward the sensor. Alternatively, the ninth surface S9 may have a concave shape on the optical axis OA, and the tenth surface S10 may have a concave shape on the optical axis OA. That is, the fifth lens 115 may have a concave shape on both sides of the optical axis OA. At least one or both of the ninth surface S9 and the tenth surface S10 may be aspherical. Aspheric coefficients of the ninth and tenth surfaces S9 and S10 are provided as shown in FIG. 11, L5 is the fifth lens 115, and S1/S2 of L5 indicate the first/second surface of L5.

The sixth lens 116 may have positive (+) or negative (−) refractive power on the optical axis OA. The sixth lens 116 may have positive (+) refractive power. On the optical axis OA of the sixth lens 116, the eleventh surface S11 may have a concave shape, and the twelfth surface S12 may have a convex shape. That is, the sixth lens 116 may have a meniscus shape convex from the optical axis OA toward the sensor. Alternatively, the eleventh surface S11 may have a convex shape on the optical axis OA, and the twelfth surface S12 may have a convex shape on the optical axis OA. That is, the sixth lens 116 may have a shape in which both surfaces are convex on the optical axis OA. At least one or both of the eleventh surface S11 and the twelfth surface S12 may be aspherical. Aspheric coefficients of the eleventh and twelfth surfaces S11 and S12 are provided as shown in FIG. 11, L6 is the sixth lens 116, and S1/S2 of L6 indicate the first surface/second surface of L6.

The seventh lens 117 may have positive (+) or negative (−) refractive power on the optical axis OA. The seventh lens 117 may have negative (−) refractive power. On the optical axis of the seventh lens 117, the thirteenth surface S13 may have a concave shape, and the fourteenth surface S14 may have a convex shape on the optical axis OA. That is, the seventh lens 117 may have a meniscus shape convex from the optical axis OA toward the sensor. Alternatively, the thirteenth surface S13 may have a convex shape on the optical axis OA, and the fourteenth surface S14 may have a convex shape on the optical axis OA, that is, the seventh lens 117 may have a shape in which both sides are convex on the optical axis OA. Alternatively, the seventh lens 117 may have a meniscus shape convex toward the object side or a concave shape on both sides. At least one or both of the thirteenth surface S13 and the fourteenth surface S14 may be aspherical. Aspheric coefficients of the thirteenth and fourteenth surfaces S13 and S14 are provided as shown in FIG. 11, L7 is the seventh lens 117, and S1/S2 of L7 indicate the first surface/second surface of L7.

The eighth lens 118 may have positive (+) or negative (−) refractive power on the optical axis OA. The eighth lens 118 may have positive (+) refractive power. On the optical axis of the eighth lens 118, a fifteenth surface S15 may have a convex shape, and a sixteenth surface S16 may have a concave shape on the optical axis OA. That is, the eighth lens 118 may have a meniscus shape convex from the optical axis OA toward the object. Alternatively, the fifteenth surface S15 may have a convex shape on the optical axis OA, and the sixteenth surface S16 may have a convex shape on the optical axis OA. That is, the eighth lens 118 may have a shape in which both sides are convex. The eighth lens 118 may have a meniscus shape convex toward the sensor or a concave shape on both sides. At least one or both of the fifteenth surface S15 and the sixteenth surface S16 may be aspherical. Aspheric coefficients of the fifteenth and sixteenth surfaces S16 and S16 are provided as shown in FIG. 11, L8 is the eighth lens 118, and S1/S2 of L8 indicate the first/second surface of L8.

The ninth lens 119 may have positive (+) or negative (−) refractive power on the optical axis OA. The ninth lens 119 may have negative (−) refractive power. On the optical axis of the ninth lens 119, the seventeenth surface S17 may have a convex shape, and the eighteenth surface S18 may have a concave shape on the optical axis OA. That is, the ninth lens 119 may have a meniscus shape convex from the optical axis OA toward the object. Alternatively, the seventeenth surface S17 may have a concave shape on the optical axis OA, and the eighteenth surface S18 may have a concave shape on the optical axis OA. That is, the ninth lens 119 may have a concave shape on both sides of the optical axis OA. At least one or both of the seventeenth surface S17 and the eighteenth surface S18 may be aspherical. Aspheric coefficients of the seventeenth and eighteenth surfaces S17 and S18 are provided as shown in FIG. 11, L9 is the ninth lens 119, and S1/S2 of L9 indicate the first/second surface of L9.

The second lens group G2 may include the third to ninth lenses 113, 114, 115, 116, 117, 118 and 119. The thicknesses of the third to ninth lenses 113, 114, 115, 116, 117, 118, and 119 on the optical axis OA, that is, the center thickness, may have the thinnest thickness on the optical axis OA, and for example, the fourth lens 114 may be the thinnest thickness. The center thickness of the sixth lens 116 in the second lens group G2 may be the thickest, and may be twice the center thickness of the fourth lens 114. In the second lens group G2, lenses of 70% or more may have a lens center thickness of 0.4 mm or less, and lenses of 30% or less may be more than 0.4 mm. For example, the third, fourth, fifth, seventh, and ninth lenses 113, 114, 115, 117 and 119 may have a center thickness of 0.4 mm or less, and the sixth and eighth lenses 116 and 118 may have a center thickness greater than 0.4 mm. Accordingly, the optical system 1000 may control incident light, and may have improved aberration characteristics and resolution.

A lens having the thickest center thickness in the first lens group G1 may be thinner than a lens having the thickest center thickness in the second lens group G2. The maximum center thickness among the first to ninth lenses 111 to 119 may be smaller than the maximum center distance, for example, 0.8 times or more or 0.8 times to 0.99 times the maximum center distance. For example, the center thickness of the sixth lens 116 is the largest among the lenses, the center distance d89 between the eighth lens 118 and the ninth lens 119 is the maximum among the center distances between the lenses, and the center thickness of the ninth lens 119 may be 0.7 times or less, for example, 0.4 times to 0.7 times the center distance between the eighth and ninth lenses 118 and 119.

In the average size of the effective diameters (e.g., clear aperture) of the third to ninth lenses 113, 114, 115, 116, 117, 118 and 119, the third lens 113 may have the smallest effective diameter (clear aperture, CA) of the lenses, and the ninth lens 119 may have the largest effective diameter. Preferably, the object-side fifth surface S5 of the third lens 113 may have the smallest effective diameter among the lens surfaces of the plurality of lenses 100A, and the size of the effective diameter H9 of the eighteenth surface S18 may be the largest. The effective diameter H9 of the eighteenth surface S18 of the plurality of lenses 100A may be 1.8 times or more, for example, 1.8 times to 2.3 times the effective diameter of the fifth surface S5. Among the plurality of lenses 100A, the ninth lens 119 has the largest average effective diameter, the second lens 112 has the smallest average effective diameter, and the average effective diameter of the ninth lens 119 may be 1.8 times or more, for example, 1.8 times to 2.3 times of the average effective diameter of the second lens 112. The effective diameter of the ninth lens 119 is the largest, so that the incident light may be effectively refracted toward the image sensor 300. Accordingly, the optical system 1000 may have improved chromatic aberration control characteristics, and the vignetting characteristics of the optical system 1000 may be improved by controlling incident light.

The refractive index of the seventh lens 117 may be greater than the refractive index of the eighth and ninth lenses 118 and 119. The refractive index of the eighth and ninth lenses 118 and 119 may be less than 1.6, and the refractive index of the seventh lens 117 may be greater than or equal to 1.6. The seventh lens 117 may have an Abbe number smaller than the Abbe number of the eighth and ninth lenses 118 and 119. For example, the Abbe number of the seventh lens 117 may be small with a difference of 15 or more from the Abbe numbers of the eighth and ninth lenses 118 and 119. In detail, the Abbe numbers of the eighth and ninth lenses 118 and 119 may be 20 or more greater than the Abbe numbers of the seventh lenses 117. In the second lens group G2, the number of lenses having a refractive index exceeding 1.6 may be smaller than the number of lenses having a refractive index of less than 1.6. In the second lens group G2, the number of lenses having an Abbe number greater than 50 may be smaller than the number of lenses less than 50. Accordingly, the optical system 1000 may have improved chromatic aberration control characteristics.

A critical point of the plurality of lenses 100A will be described as follows.

The first lens 111 may include at least one critical point. In detail, the first surface S1 may be provided without a critical point, and the second surface S2 may have at least one critical point. The critical point of the second surface S2 may be located at a position of 45% or more of the effective radius of the second surface S2, for example, in a range of 47% to 60%. The critical point of the second surface S2 may be located at a position of 45% or more of the effective radius of the second surface S2 from the optical axis OA, which is the distance from the optical axis OA to the end of the effective region, for example, in the range of 47% to 60%. Here, the third and fourth surfaces S3 and S4 of the second lens 112 may be provided without a critical point.

At least one or both of the fifth and sixth surfaces S5 and S6 of the third lens 113 may have a critical point. For example, all of the fifth and sixth surfaces S5 and S6 may have critical points. The critical point of the fifth surface S5 may be located at a position of 70% or more of the effective radius of the fifth surface S5 from the optical axis OA, which is a distance from the optical axis OA to the end of the effective region, for example, in the range of 70% to 90% or 80% to 90%. The critical point of the sixth surface S6 may be located at a position of 60% or more of the effective radius of the sixth surface S6 from the optical axis OA, for example, in the range of 60% to 76% or in the range of 60% to 70%. Accordingly, the fifth and sixth surfaces S5 and S6 may diffuse the light incident through the fourth surface S4.

At least one of the seventh and eighth surfaces S7 and S8 of the fourth lens 114 may have a critical point. The seventh surface S7 may have at least one critical point, and for example, may be located at a position of 45% or more of the effective radius of the seventh surface S7 from the optical axis OA, for example, in a range of 45% to 60%. Since the critical point of the seventh surface S7 is located at a position of 60% or less, it may be located closer to the optical axis OA than the critical points of the third and fourth surfaces S3 and S4 from the optical axis OA. In addition, the seventh surface S7 may further include another critical point around the end of the effective region, and the critical point around the end may be disposed at a position of 80% or more of the effective radius and may be removed. The eighth surface S8 may be provided without a critical point. Here, the ninth and tenth surfaces S9 and S10 of the fifth lens 115 may be provided without a critical point. The eleventh and twelfth surfaces S11 and S12 of the sixth lens 116 may be provided without a critical point.

At least one of the thirteenth and fourteenth surfaces S13 and S14 of the seventh lens 117 may have a critical point. For example, all of the thirteenth and fourteenth surfaces S13 and S14 may have critical points. The critical point of the thirteenth surface S13 may be located at a position of 90% or more of an effective radius of the thirteenth surface S13 on the optical axis OA, for example, in a range of 90% to 99%. The critical point of the fourteenth surface S14 may be located at a position of 90% or more of an effective radius of the fourteenth surface S14 from the optical axis OA, for example, in a range of 90% to 99%. Accordingly, the thirteenth and fourteenth surfaces S13 and S14 may diffuse the light incident through the sixth lens 116.

As shown in FIG. 9, at least one or both of the fifteenth and sixteenth surfaces S15 and S16 of the eighth lens 118 may have a critical point. For example, all of the fifteenth and sixteenth surfaces S15 and S16 may have critical points P4 and P3. The critical point P4 of the fifteenth surface S15 may be located at a distance dP4 of 65% or more of the effective radius of the fifteenth surface S15 from the optical axis OA, for example, in the range of 65% to 80%, or 67% to 78%. The critical point P3 of the sixteenth surface S16 may be located at a distance dP3 of 65% or more of the effective radius r8 of the sixteenth surface S16 from the optical axis OA, for example, in the range of 65% to 80% or 70% to 80%. Accordingly, the fifteenth and sixteenth surfaces S15 and S16 may diffuse the light incident through the seventh lens 117. The positions of the critical points P4 and P3 of the fifteenth and sixteenth surfaces S15 and S16 may be disposed further outside than the positions of the critical points of the thirteenth and fourteenth surfaces S13 and S14 of the seventh lens 117 with respect to the optical axis OA.

At least one or both of the seventeenth and eighteenth surfaces S17 and S18 of the ninth lens 119 may have a critical point. For example, all of the seventeenth and eighteenth surfaces S17 and S18 may have critical points P2 and P1. The critical point P2 of the seventeenth surface S17 may be located at a distance dP2 of 45% or less of the effective radius of the seventeenth surface S17 from the optical axis OA, for example, in the range of 30% to 45% or 23% to 33%. The critical point P1 of the eighteenth surface S18 may be located at a distance dP1 of 55% or less of the effective radius r9 of the eighteenth surface S18 from the optical axis OA, for example, in the range of 45% to 55% or 39% to 55%. Accordingly, the seventeenth and eighteenth surfaces S17 and S18 may diffuse the light refracted through the eighth lens 118 to the periphery portion of the image sensor 300. The positions of the critical points P2 and P1 of the seventeenth and eighteenth surfaces S17 and S18 may be disposed further inside than the positions of the critical pointes P4 and P3 of the fifteenth and sixteenth surfaces S15 and S16 of the eighth lens 118 from the optical axis OA. Here, the critical point may mean a point at which a slope of the normal K2 and the optical axis OA is 0 on the sensor-side eighteenth surface S18. In addition, the critical point may mean a point where the slope between an imaginary line extending in a direction perpendicular to the optical axis OA and the tangent line K1 on the eighteenth surface S18 is 0 degrees.

FIG. 14(A) is a graph showing the height on a direction of the optical axis along the distance in the first direction Y from the optical axis OA with respect to the object-side fifteenth surface S15 and the sensor-side sixteenth surface S16 in the eighth lens 118 of FIG. 9, L8 is the eighth lens, L8S1 is the fifteenth surface, L8S2 is the sixteenth surface, L9 is the ninth lens, L9S1 is the seventeenth surface, and L9S2 is the eighteenth surface.

As shown in FIG. 14(A), it may be seen that the fifteenth surface L8S1 and the sixteenth surface L8S2 of the eighth lens 118 are located on the sensor side based on a straight line orthogonal to the center 0 of each lens surface, and it may be seen that the critical point of L8S1 is closer to the optical axis than the critical point of L8S2. It may be seen that the critical point of L8S1 is located at 1.5 mm+0.1 mm, and the critical point of L8S2 is located at 1.75 mm+0.1 mm. As shown in FIG. 14(B), when the seventeenth surface L9S1 of the ninth lens 119 is viewed on the basis of a straight line orthogonal to the center 0, the region adjacent to the center 0 is located to the sensor-side region, a region adjacent to the end of the effective region is located to the object-side region, and the critical point of L9S1 may be located in the range of 0.9 mm+0.1 mm of the sensor-side region. In addition, in the eighteenth surface L9S2 of the ninth lens 119, when viewed on the basis of a straight line orthogonal to the center 0, a region adjacent to the center 0 is located to the sensor-side region, and a region adjacent to the end of the effective region is located to the object-side region, and the critical point of L9S2 is located more outside than the critical point of L9S1 and may be located at 1.3 mm+0.1 mm of the sensor-side region. In addition, the sensor-side region of L9S2 exists in the range of 80% to 90% based on a straight line perpendicular to the center 0. Here, the sensor-side region is a region up to 0.3 mm above the straight line perpendicular to the center 0, and the object-side region is a region up to −0.5 mm below the straight line orthogonal to the center 0.

The positions of the critical points P1, P2, P3, and P4 of the eighth and ninth lenses 118 and 119 are preferably arranged at positions satisfying the above-described ranges in consideration of the optical characteristics of the optical system 1000. In detail, the position of the critical point preferably satisfies the above-described range for controlling optical characteristics such as chromatic aberration, distortion characteristics, aberration characteristics, and resolution of the optical system 1000. Accordingly, the path of the light emitted to the image sensor 300 through the lens may be effectively controlled. Accordingly, the optical system 1000 according to the embodiment may have improved optical characteristics not only in the central portion of FOV but also in the peripheral portion.

Figure 16:
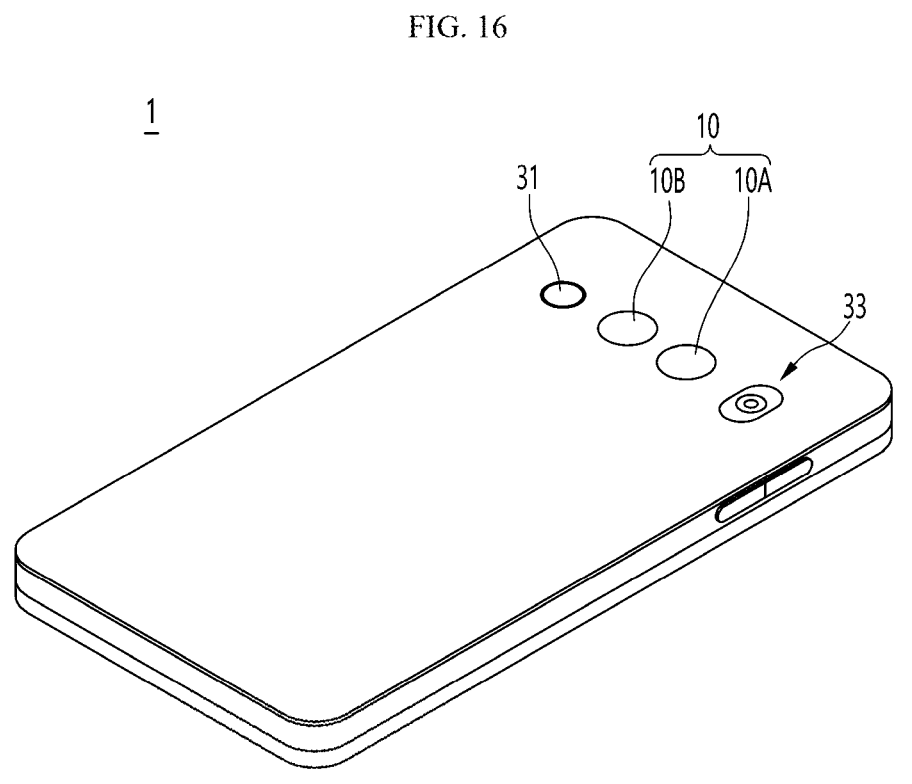

As shown in FIGS. 9 and 16, the normal line K2 passing through any point on the sensor-side eighteenth surface S18 of the ninth lens 109 and 119 which is the last lens, may have a predetermined angle θ1 with the optical axis OA. The angle θ1 may be greater than 5 degrees and less than 45 degrees.

The center thicknesses and the edge thicknesses of the first to ninth lenses 101 to 109, and the center distances between two adjacent lenses and the edge distances may be set. For example, as shown in FIGS. 10 and 17, distances d12, d23, d34, d45, d56, d67, d78, and d89 between adjacent lenses may be provided. 10 and 17, the first direction Y may include a circumferential direction around the optical axis OA or two directions orthogonal to each other, and the distance between two adjacent lenses at the end of the first direction Y may be a reference for an end of the effective region with a smaller effective radius, and the end of the effective radius may include an error of +0.2 mm at the end.

Referring to FIGS. 10 and 8, when the optical axis OA is the starting point and the end of the effective region of the third surface S3 of the second lens 112 is the endpoint, the first distance d12 may gradually increase from the optical axis OA toward the first direction Y. The first distance d12 may be the minimum on the optical axis OA and the maximum on the end of the effective region. The maximum value in the first distance d12 may be 12 times or more, for example, 12 times to 17 times the minimum value. Accordingly, the optical system 1000 may effectively control the incident light, and the light incident through the first and second lenses 111 and 112 may proceed to another lens by the first distance d12 and may be maintained good optical performance.

The second distance d23 may gradually decrease from the optical axis OA toward the end point in the first direction Y. The second distance d23 may be a maximum at the optical axis OA or a start point, and a minimum at an end point. The maximum value of the second distance d23 may be three or more times the minimum value. In detail, the maximum value of the second distance d23 may satisfy three to five times the minimum value. Accordingly, the optical system 1000 may have improved optical characteristics, and the aberration characteristics of the optical system 1000 may be improved by the second distance d23. The maximum value of the second distance d23 is greater than the maximum value of the first distance d12, and the minimum value of the second distance d23 may be a value between the minimum value and the maximum value of the first distance d12.

The first lens group G1 and the second lens group G2 may be spaced apart from each other by the third distance d34. The third distance d34 may be a distance on the optical axis direction Z between the third lens 113 and the fourth lens 114. In the third distance d34, when the optical axis OA is a starting point and the end of the effective region of the sixth surface S6 of the third lens 113 is an endpoint in first direction Y, the third distance d34 decreases and increases from the optical axis OA toward the first direction Y. For example, the third distance d34 gradually decreases from the optical axis OA toward the critical point position of the sixth surface S6 of the third lens 113 in the first direction Y, and may increase again after the position of the critical point. That is, the third distance d34 may have a maximum value on the optical axis OA and a minimum value near the critical point (e.g., 1 mm). The maximum value may be in the range of 1.5 times or more, for example, 1.5 times to 3 times the minimum value. The maximum value of the third distance d34 may be smaller than the maximum value of the second distance d23, and the minimum value of the third distance d34 may be smaller than the minimum value of the second distance d23. Accordingly, by the third distance d34, the optical system 1000 may have improved chromatic aberration characteristics and may control vignetting characteristics.

When the optical axis OA is the starting point and the end of the effective region of the eighth surface S8 of the fourth lens 114 is the end point, the fourth distance d45 may be changed in a form that gradually decreases in the first direction Y toward the end point from the starting point, may have the maximum value less than or equal to 0.15 mm, and greater than the minimum value of the first distance d12, and may have the minimum value smaller than the minimum value of the first distance d12. When the optical axis OA is the starting point and the end of the effective region of the tenth surface S10 of the fifth lens 115 is the endpoint, the fifth distance d56 may increase and decrease from the optical axis OA toward the first direction Y, which is perpendicular to the optical axis OA. The fifth distance d56 may have a maximum value of 65% or more of the distance from the optical axis OA to the end point, for example, in a range of 65% to 72%. The minimum value of the fifth distance d56 is located at the optical axis, and the maximum value is smaller than the maximum value of the fourth distance d45 and may be less than or equal to 0.09 mm or less. The minimum value of the fifth distance d56 may be smaller than the minimum value of the third distance d34, and the maximum value may be smaller than the maximum value of the third distance d34. Accordingly, the optical system 1000 may have improved optical properties, and may have good optical performance in the center and peripheral portions of FOV and may adjust an improved chromatic aberration and distortion aberration by the fourth and fourth distances d45 and d56.

In the sixth distance d67, when the optical axis OA is the starting point and the end of the effective region of the twelfth surface S12 of the sixth lens 116 is the end point, the minimum value of the six distance d67 is located in the range of 60% or more of the effective radius from the optical axis OA, for example, in the range of 60% to 75%, the maximum value is located at the end, and may gradually increase from the minimum value to the maximum value. The maximum value of the sixth distance d67 may be 25 times or more, for example, 25 to 40 times the minimum value. The maximum value of the sixth distance d67 may be 1.2 times or more, for example, 1.2 times to 2 times the maximum value of the third distance d34, and the minimum value may be greater than the minimum value of the third distance d34.

In the seventh distance d78, when the optical axis OA is the starting point and the effective region end of the fourteenth surface S14 of the seventh lens 117 is the end point, the maximum value of the seventh distance d78 is located in a region adjacent to the end of the effective region, for example, 80% or more or 80% to 90% of the effective radius from the optical axis, and the minimum value may be located on the optical axis. The seventh distance d78 may gradually increase from a minimum value to a maximum value. The maximum value of the seventh distance d78 may be 50 times or more, for example, 50 to 60 times the minimum value, and the minimum value may be smaller than the minimum value of the sixth distance d67. Accordingly, the optical system 1000 may have improved optical characteristics on the center and periphery portions of FOV. In addition, the optical system 1000 may have improved aberration control characteristics as the seventh lens 117 and the eighth lens 118 are spaced apart by a seventh distance d78 set according to a position, and may appropriately controlled the effective diameter of the ninth lens 109.

In the eighth distance d89, when the optical axis OA is the starting point and the effective region end of the sixteenth surface S16 of the eighth lens 118 is the endpoint, the maximum value of the eighth distance d89 is located on the optical axis, and the minimum value is located around the end of the effective region, for example, 80% or more, for example, in the range of 80% to 90% of the effective radius from the optical axis, and may gradually increase from the minimum value to the maximum value. The maximum value of the eighth distance d89 may be smaller than the maximum value of the seventh distance d78, and the minimum value may be smaller than the minimum value of the seventh distance d78. The maximum value of the seventh and eighth distances d78 and d89 may be 0.7 mm or more. By the eighth distance d89, distortion characteristics and aberration characteristics may be improved on the center and peripheral portions of the field of view FOV.

The maximum center thickness of the lenses 111-119 may be in the range of 2 times or more, for example, 2 to 4 times the minimum center thickness. The sixth lens 116 having the maximum center thickness may be in the range of 2 times or more, for example, 2 times to 4 times that of the second lens 112 or the fourth lenses 112 and 114. Any one of the center thicknesses of the second lens 112 or the fourth lens 112 and 114 may be the minimum thickness.

The number of lenses having a center thickness of less than 0.5 mm among the plurality of lenses 100A may be greater than the number of lenses of 0.5 mm or more. The number of lenses less than 0.5 mm among the plurality of lenses 100A may be 70% or more of the total number of lenses. Accordingly, the optical system 1000 may be provided in a structure having a slim thickness. Among the plurality of lens surfaces S1-S18, the number of surfaces having an effective radius of less than 1.50 mm may be smaller than the number of surfaces of 1.50 mm or more, for example, 30% or less or 15% to 30% of the total lens surfaces.

When the radius of curvature is described as an absolute value, the radius of curvature of the second surface S2 of the first lens 111 among the plurality of lenses 100A may be the largest among the lens surfaces, and may be in the range of 7 times or more, for example, 7 times to 20 times the radius of curvature of the first surface S1 or the sixth surface S6. When the focal length is described as an absolute value, the focal length of the third lens 113 among the plurality of lenses 100A may be the largest among the lenses, and 5 times or more of the focal length of the first lens 111, for example, in the range of 5 times to 10 times.

Table 2 is an example of lens data of the optical system of FIG. 8.

TABLE 2

| Lens | Surface | Radius (mm) of curvature | Thickness (mm)/ Distance (mm) | Refractive index | Abbe number | Effective diameter (mm) |
|------|---------|------|------|------|------|------|
| Lens 1 | S1 | 3.387 | 0.625 | 1.529 | 45.400 | 3.142 |
|  | S2 | −36.295 | 0.015 |  |  | 3.037 |
| Lens 2 | S3 (Stop) | 1.928 | 0.212 | 1.701 | 15.800 | 2.891 |
|  | S4 | 1.479 | 0.390 |  |  | 2.776 |
| Lens 3 | S5 | 3.113 | 0.235 | 1.701 | 15.800 | 2.772 |
|  | S6 | 2.709 | 0.153 |  |  | 2.765 |
| Lens 4 | S7 | 7.226 | 0.214 | 1.614 | 26.000 | 2.900 |
|  | S8 | 14.936 | 0.100 |  |  | 3.120 |
| Lens 5 | S9 | 25.958 | 0.351 | 1.511 | 56.800 | 3.222 |
|  | S10 | −12.368 | 0.036 |  |  | 3.277 |

TABLE 2-continued

| Lens | Surface | Radius (mm) of curvature | Thickness (mm)/ Distance (mm) | Refractive index | Abbe number | Effective diameter (mm) |
|------|---------|------|------|------|------|------|
| Lens 6 | S11 | −25.789 | 0.712 | 1.493 | 61.200 | 3.318 |
|  | S12 | −5.625 | 0.092 |  |  | 3.314 |
| Lens 7 | S13 | −2.034 | 0.335 | 1.614 | 26.000 | 3.483 |
|  | S14 | −2.648 | 0.015 |  |  | 3.606 |
| Lens 8 | S15 | 1.568 | 0.446 | 1.516 | 48.000 | 3.760 |
|  | S16 | 2.418 | 0.758 |  |  | 4.301 |
| Lens 9 | S17 | 2.038 | 0.372 | 1.516 | 48.000 | 5.106 |
|  | S18 | 1.223 | 0.500 |  |  | 5.548 |
| Filter |  | Infinity | 0.145 |  |  | 5.950 |
|  |  | Infinity | 0.447 |  |  | 6.487 |
| Image sensor |  | Infinity | 0.000 |  |  | 6.570 |

Table 2 shows the radius of curvature, the thickness of the lens, the distance between the lenses on the optical axis OA of the first to ninth lenses 111-119 of FIG. 8, the refractive index at d-line, Abbe number, and the effective diameter (e.g., clear aperture (CA)).

As shown in FIG. 11, in the second embodiment, at least one lens surface of the plurality of lenses 100A may include an aspherical surface having a 30th order aspheric coefficient. For example, the first to tenth lenses 121-129 may include a lens surface having a 30th order aspheric coefficient. As described above, since the aspherical surface having the 30th order aspheric coefficient (a value other than "0") can significantly change the aspherical shape of the peripheral portion, the optical performance of the peripheral portion of FOV may be well corrected.

FIG. 12 is a graph of the diffraction MTF characteristic of the optical system 1000 according to the second embodiment, and FIG. 13 is a graph of the aberration characteristic. In the aberration graph of FIG. 13, longitudinal spherical aberration, astigmatic field curves, and distortion aberration are measured from left to right. In FIG. 13, the X-axis may indicate a focal length (mm) and distortion (%), and the Y-axis may indicate the height of an image. In addition, the graph for spherical aberration is a graph for light in a wavelength band of about 470 nm, about 510 nm, about 555 nm, about 610 nm, and about 660 nm, and the graph for astigmatism and distortion aberration is a graph for light in a wavelength band of about 555 nm.

Figure 15:
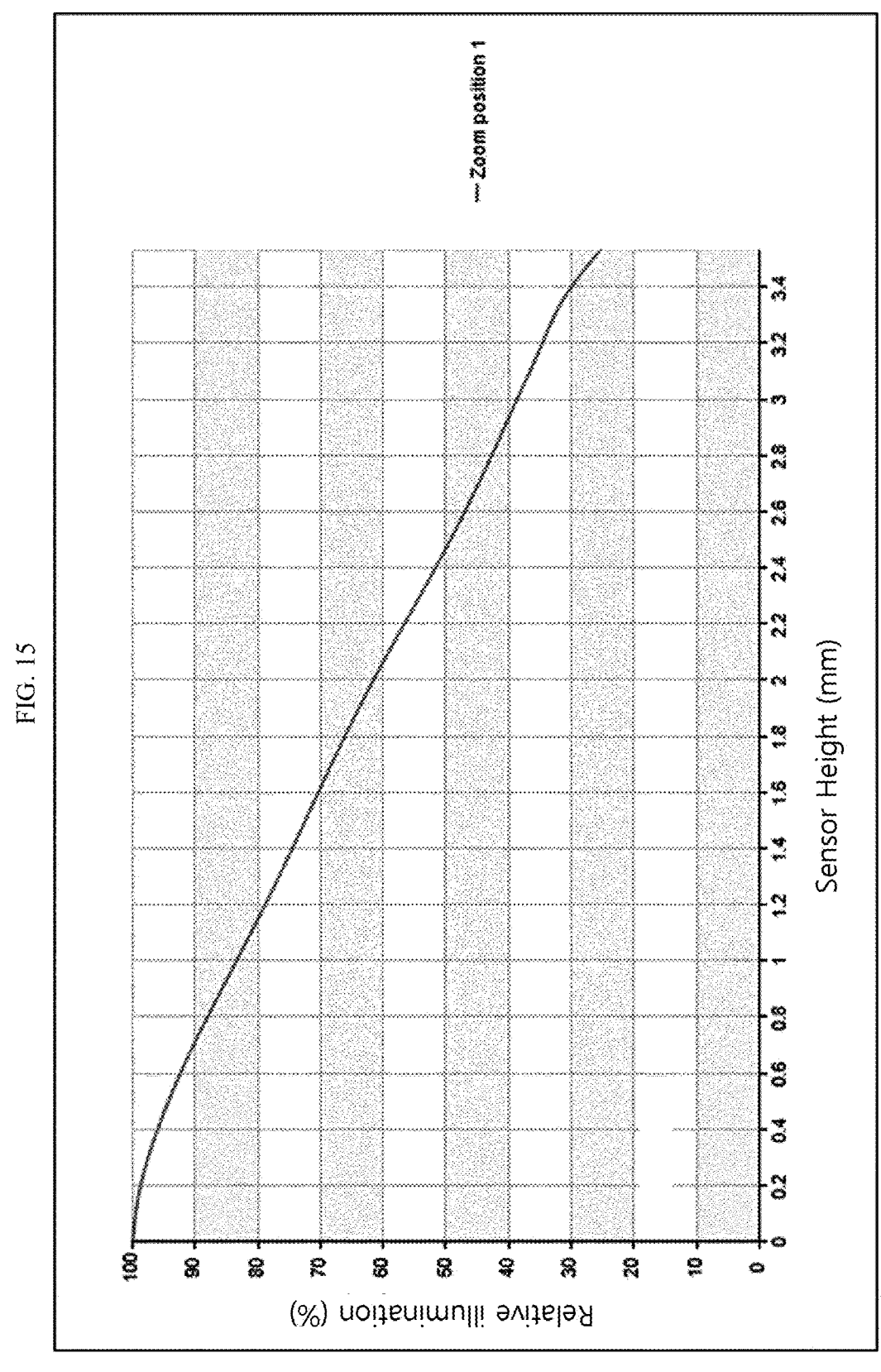
FIG. 15 is a diagram illustrating relative luminous intensity on an image sensor with respect to a chief ray in the optical system according to the first and second embodiments of the invention.

In the aberration diagram of FIG. 13, it may be interpreted that the aberration correction function is better as each curve approaches the Y axis, and referring to FIG. 13, it may be seen that the measured values of the optical system 1000 according to the embodiment are adjacent to the Y-axis. That is, the optical system 1000 according to the embodiment may have improved resolution and good optical performance not only in the center portion of FOV but also in the periphery portion. As shown in FIG. 15, in the optical system 1000 according to the first and second embodiments, when the relative illumination of the chief ray is 100% at the center of the image sensor 300, it may be seen that relative illumination of 25% or more is shown up to a region at the diagonal end (e.g., 3.4 mm or more) of the image sensor 300.

Among the lenses 100 and 100A of the optical system 1000 according to the first and second embodiments, the number of lenses having an Abbe number of 40 or more, for example, in the range of 40 to 70 may be 5, and the number of lenses having a refractive index of 1.6 or more, for example, in the range of 1.6 to 1.7 may be 4. Accordingly, the optical system 1000 may implement good optical performance in the center and periphery portions of FOV and have improved aberration characteristics.

The optical system 1000 according to the first and second embodiments disclosed above may satisfy at least one or two or more of the following equations. Accordingly, the optical system 1000 according to the embodiment may have improved optical properties. For example, when the optical system 1000 satisfies at least one equation, the optical system 1000 can effectively control aberration characteristics such as chromatic aberration and distortion aberration, and may have good optical performance not only in the center portion of FOV but also in the periphery portion. In addition, the optical system 1000 may have improved resolution and may have a slimmer and more compact structure. In addition, the meanings of the thickness on the optical axis OA of the lenses described in the equations, the distance on the optical axis OA of adjacent lenses, and the distances on the edge may be the same as in FIGS. 2 and 9.

$$1 < L1\_CT/L3\_CT < 5 \qquad \text{[Equation 1]}$$

In Equation 1, L1_CT means the thickness (mm) of the first lenses 101 and 111 on the optical axis OA, and L3_CT means the thickness (mm) of the third lenses 103 and 113 on the optical axis OA. When the optical system 1000 according to the embodiment satisfies Equation 1, the optical system 1000 may improve aberration characteristics.

$$0.5 < L3\_CT/L3\_ET < 2 \qquad \text{[Equation 2]}$$

In Equation 2, L3_CT means the thickness (mm) on the optical axis OA of the third lenses 103 and 113, and L3_ET means the thickness (mm) at the end of the effective region of the third lenses 103 and 113 in a direction of the optical axis OA. In detail, L3_ET means the distance on between the end of the effective region of the fifth surface S5 of the third lenses 103 and 113 and the end of the effective region of the sixth surface S6 of the third lenses 103 and 113 in the direction of the optical axis OA. When the optical system 1000 according to the embodiment satisfies Equation 2, the optical system 1000 may have improved chromatic aberration control characteristics.

$$1 < L1\_CT/L1ET < 5 \qquad \text{[Equation 2-1]}$$

In Equation 2-1, L1_ET means a thickness (mm) at the ends of the effective regions of the first lenses 101 and 111 in the direction of the optical axis OA. When the optical system 1000 according to the embodiment satisfies Equation 2-1, the optical system 1000 may have improved chromatic aberration control characteristics.

$$0.5 < SD/TD < 1 \qquad \text{[Equation 2-2]}$$

SD is a distance (mm) on the optical axis distance from the aperture stop to the sensor-side eighteenth surface S18 of the ninth lenses 109 and 119, and TD is a distance (mm) on the optical axis from the object-side first surface S1 of the first lenses 101 and 111 to the sensor-side eighteenth surface S18 of the ninth lenses 109 and 119. When the optical system 1000 according to the embodiment satisfies Equation 2-2, the optical system 1000 may have improved chromatic aberration.

$$-1.5 < f\_G1/f\_G2 < 1.5 \qquad \text{[Equation 2-3]}$$

f_G1 is the focal length of the first lens group G1, and f_G2 is the focal length of the second lens group G2. When the optical system 1000 according to the embodiment satisfies Equation 2-3, chromatic aberration may be improved in the optical system 1000. That is, as the value of Equation 2-3 approaches 1, distortion aberration may be reduced.

$$1 < L9\_ET/L9\_CT < 5 \qquad \text{[Equation 3]}$$

In Equation 3, L9_CT means the thickness (mm) on the optical axis OA of the ninth lenses 109 and 119, and L9_ET is the thickness (mm) at the end of the effective region of the ninth lenses 109 and 119 in the direction of the optical axis OA. In detail, L9_ET means a distance between the end of the effective region of the object-side seventeenth surface S17 of the ninth lens 109 and 119 to the end of the effective region of the sensor-side eighteenth surface S18 of the ninth lens 109 and 119 in the direction of the optical axis. When the optical system 1000 according to the embodiment satisfies Equation 3, the optical system 1000 may reduce distortion and may have improved optical performance.

$$1.6 < n3 \qquad \text{[Equation 4]}$$

In Equation 4, n3 means a refractive index at the d-line of the third lens 103. When the optical system 1000 according to the embodiment satisfies Equation 4, the optical system 1000 may improve chromatic aberration characteristics.

[Equation 4-1]

$$1.50 < n1 < 1.6$$

$$1.50 < n9 < 1.6$$

In Equation 4-1, n1 is the refractive index at the d-line of the first lenses 101 and 111, and n9 is the refractive index at the d-line of the ninth lenses 109 and 119. When the optical system 1000 according to the embodiment satisfies Equation 4-1, the influence on the TTL of the optical system 1000 may be suppressed.

$$0.5 < L9S2\_max\_sag \text{ to } Sensor < 2 \qquad \text{[Equation 5]}$$

In Equation 5, L9S2_max_sag to Sensor means the distance (mm) from the maximum Sag value of the sensor-side fourteenth surface S14 of the ninth lenses 109 and 119 to the image sensor 300 in the direction of the optical axis OA. For example, L9S2_max_sag to Sensor means a distance (mm) from the center of the ninth lenses 109 and 119 to the image sensor 300 in the direction of the optical axis OA. When the optical system 1000 according to the embodiment satisfies Equation 5, the optical system 1000 secures a space in which the filter 500 may be disposed between the plurality of lenses 100 and the image sensor 300. Therefore, it is possible to have an improved assembling property. In addition, when the optical system 1000 satisfies Equation 5, the optical system 1000 may secure an interval for manufacturing the module.

In the lens data for the first and second embodiments, the position of the filter 500, specifically the distance between the last lens and the filter 500, and the distance between the image sensor 300 and the filter 500 are set for the convenience of the optical system 1000, and the filter 500 may be freely disposed within a range that does not come into contact with the last lens and the image sensor 300. Accordingly, the value of the L9S2_max_sag to Sensor in the lens data may be the same as the distance on the optical axis OA between the object-side surface of the filter 500 and the upper surface of the image sensor 300, which may be the same as a back focal length (BFL) of the optical system 1000, and the position of the filter 500 may be moved within a range that does not contact each of the last lens and the image sensor 300 to have good optical performance. That is, the distance between the critical point P1 and the image sensor 300 of the eighteenth surface S18 of the ninth lenses 109 and 119 is the minimum, and may gradually increase toward the end of the effective region.

$$0.5 < BFL/L9S2\_max\_sag \text{ to Sensor} < 2 \qquad \text{[Equation 6]}$$

In Equation 6, the BFL means a distance (mm) from the center of the sensor-side eighteenth surface S18 of the ninth lenses 109 and 119 closest to the image sensor 300 to the upper surface of the image sensor 300 on the optical axis OA.

The L9S2_max_sag to Sensor means the distance (mm) in the direction of the optical axis OA from the maximum Sag (Sagittal) value of the eighteenth surface S18 of the ninth lenses 109 and 119 to the image sensor 300. When the optical system 1000 according to the embodiment satisfies Equation 6, the optical system 1000 may improve distortion aberration characteristics and may have good optical performance in the periphery portion of FOV. Here, the maximum Sag value may be the critical point position.

$$|L9S2\_max \text{ slope}| < 45 \qquad \text{[Equation 7]}$$

In Equation 7, L9S2_max slope means the maximum value (Degree) of the tangent angle measured on the sensor-side eighteenth surface S18 of the ninth lenses 109 and 119. In detail, the L9S2_max slope in the eighteenth surface S18 means an angle value (Degree) of a point having the largest tangential angle with respect to an imaginary line extending in a direction perpendicular to the optical axis OA. When the optical system 1000 according to the embodiment satisfies Equation 7, the optical system 1000 may control the occurrence of a lens flare.

$$0.2 < L9S2 \text{Inflection Point} < 0.6 \qquad \text{[Equation 8]}$$

In Equation 8, L9S2 Inflection Point may mean a position of a critical point located on the sensor-side eighteenth surface S18 of the ninth lenses 109 and 119. In detail, the L9S2 Inflection Point may be a distance from the optical axis OA to the critical point, when the optical axis OA is the starting point and the end of the effective region of the eighteenth surface S18 of the ninth lenses 109 and 119 is the endpoint, and the distance from the optical axis OA to the end of the effective region of the eighteenth surface S18 is 1. When the optical system 1000 according to the embodiment satisfies Equation 8, it is possible to suppress an influence on the slim rate of the optical system 1000.

$$1 < d89\_CT/d89 \text{ min} < 10 \qquad \text{[Equation 9]}$$

In Equation 9, d89_CT means a distance (mm) between the eighth lenses 108 and 118 and the ninth lenses 109 and 119 on the optical axis OA. In detail, the d89_CT denotes a distance (mm) on the optical axis OA between the sixteenth surface S16 of the eighth lenses 108 and 118 and the seventeenth surface S17 of the ninth lenses 109 and 119. The d89_min means a minimum distance (mm) among the distances between the eighth lenses 108 and 118 and the ninth lenses 109 and 119 in the direction of the optical axis OA. When the optical system 1000 according to the embodiment satisfies Equation 9, the optical system 1000 may improve distortion aberration characteristics and may have good optical performance on the periphery portion of FOV.

$$1 < d89\_CT/d89ET < 5 \qquad \text{[Equation 10]}$$

In Equation 10, d89_ET means the distance (mm) between an end of the effective region of the sensor-side sixteenth surface S16 of the eighth lens 108 and 118 and an end of the effective region of the object-side seventeenth surface S17 of the ninth lens 109 and 119 in the direction of the optical axis OA. When the optical system 1000 according to the embodiment satisfies Equation 10, good optical performance may be obtained even on the center and periphery portions of FOV. In addition, the optical system 1000 may reduce the occurrence of distortion, and thus may have improved optical performance.

$$0.01 < d23\_CT/d89CT < 1 \qquad \text{[Equation 11]}$$

In Equation 11, d12_CT means a distance (mm) on an optical axis between the first lens 101 and the second lens 102. In detail, the d12_CT means the distance (mm) between the second surface S2 of the first lens 101 and the third surface S3 of the second lens 102 on the optical axis OA. When the optical system 1000 according to the embodiment satisfies Equation 11, the optical system 1000 may improve aberration characteristics and control the size of the optical system 1000, for example, reduction of the total track length (TTL).

$$1 < d89\_CT/d34CT < 4 \qquad \text{[Equation 11-1]}$$

In Equation 11-1, d34_CT means a distance (mm) between the third lens 103 and the fourth lens 104 on the optical axis. In detail, d34_CT means the distance (mm) from the sixth surface S6 of the third lens 103 to the seventh surface S7 of the fourth lens 104 on the optical axis OA. When the optical system 1000 according to the embodiment satisfies Equation 11-1, the optical system 1000 may improve aberration characteristics and control the size of the optical system 1000, for example, reduction of TTL.

$$1 < G2\_TD/d89\_CT < 15 \qquad \text{[Equation 11-2]}$$

In Equation 11-2, G2_TD means a distance (mm) on the optical axis between the object-side fifth surface S5 of the third lenses 104 and 114 and the sensor-side eighteenth surface S18 of the ninth lenses 109 and 119. Equation 11-2 may set the total distance of the second lens group G2 on the optical axis and the largest distance within the second lens group G2. When the optical system 1000 according to the embodiment satisfies Equation 11-2, the optical system 1000 may improve aberration characteristics and control the size of the optical system 1000, for example, reduction of TTL.

$$0 < G1\_TD/d23CT < 2 \qquad \text{[Equation 11-3]}$$

In Equation 11-3, G1_TD means a distance (mm) on the optical axis between the object-side first surface S1 of the first lenses 101 and 111 and the sensor-side fourth surface S4 of the second lenses 102 and 112. Equation 11-3 may set the total distance of the first lens group G1 on the optical axis and the distance between the first and second lens groups G1 and G2. When the optical system 1000 according to the embodiment satisfies Equation 11-3, the optical system 1000 may improve aberration characteristics and control a reduction in TTL.

$$3 < CA\_L9S2/d89\_CT < 20 \qquad \text{[Equation 11-4]}$$

In Equation 11-4, CA_L9S2 means the largest effective diameter of the lens surface, and means the effective diameter of the sensor-side eighteenth surface S18 of the ninth lenses 109 and 119. When the optical system 1000 according to the embodiment satisfies Equation 11-4, the optical system 1000 may improve aberration characteristics and control a reduction in TTL.

$$1 < L1\_CT/L9\_CT < 5 \qquad \text{[Equation 12]}$$

In Equation 12, L1_CT means the thickness (mm) of the first lenses 101 and 111 on the optical axis OA, and L9_CT means the thickness (mm) of the ninth lenses 109 and 119 on the optical axis OA. When the optical system 1000 according to the embodiment satisfies Equation 12, the optical system 1000 may have improved aberration characteristics.

In addition, the optical system 1000 has good optical performance at a set FOV and may control a TTL.

$$1 < L8\_CT/L9\_CT < 5 \qquad \text{[Equation 13]}$$

In Equation 13, L8_CT means the thickness (mm) of the eighth lenses 108 and 118 on the optical axis OA, and L9_CT means the thickness (mm) of the ninth lenses 109 and 119 on the optical axis OA. When the optical system 1000 according to the embodiment satisfies Equation 13, the optical system 1000 may relax the manufacturing precision of the eighth lenses 108 and 118 and the ninth lenses 109 and 119, and may improve optical performance of the center and periphery portions of FOV.

$$d23\_CT < L1\_CT < L6CT \qquad \text{[Equation 13-1]}$$

In Equation 13-1, L1_CT is the center thickness of the first lenses 101 and 111 having the largest thickness in the first lens group G1, and d23_CT is the center interval between the first and second lens groups G1 and G2 or a distance on the optical axis between the second and third lenses 102 and 103, and L6_CT is the center thickness of the thickest lens in the second lens group G2. When Equation 13-1 is satisfied, optical performance may be improved.

$$1 < L9\_ET/L9CT < 5 \qquad \text{[Equation 13-2]}$$

In Equation 13-2, L9_ET means the edge-side thickness (mm) of the ninth lenses 109 and 119, and when this is satisfied, the effect on reduction of distortion aberration may be improved.

$$1 < L1R1/L9R2 < 5 \qquad \text{[Equation 14]}$$

In Equation 14, L1R1 means the radius (mm) of curvature of the first surface S1 of the first lens 101, and L9R2 means the radius (mm) of curvature of the eighteenth surface S18 of the ninth lenses 109 and 119. When the optical system 1000 according to the embodiment satisfies Equation 14, the aberration characteristic of the optical system 1000 may be improved.

$$0 < (d89\_CT\text{-}d89\_ET)/(d89\_CT) < 5 \qquad \text{[Equation 15]}$$

In Equation 15, d89_CT means the distance (mm) between the eighth lenses 108 and 118 and the ninth lenses 109 and 119 on the optical axis, and d89_ET means the distance between the end of the effective region of the sensor-side sixteenth surface S16 of the eighth lenses 108 and 118 and the end of the effective region of the object-side seventeenth surface S17 of the ninth lens 109 and 119 in the direction of the optical axis. When the optical system 1000 according to the embodiment satisfies Equation 15, the occurrence of distortion may be reduced and optical performance may be improved. When the optical system 1000 according to the embodiment satisfies Equation 15, the optical system 1000 may relax the manufacturing precision of the eighth lenses 108 and 118 and the ninth lenses 109 and 119, and may improve the optical performance of the center and the periphery portions of FOV.

$$1 < CA\_L1S1/CA\_L2S1 < 1.5 \qquad \text{[Equation 16]}$$

In Equation 16, CA_L1S1 means the effective diameter CA (e.g., clear aperture) (mm) of the first surface S1 of the first lenses 101 and 111, and CA_L2S1 means the effective diameter CA (mm) of the third surface S3 of the second lens 102 and 112. When the optical system 1000 according to the embodiment satisfies Equation 16, the optical system 1000 may control the light incident to the first lens group G1 and may have improved aberration control characteristics.

$$1 < CA\_L9S2/CA\_L3S1 < 5 \qquad \text{[Equation 17]}$$

In Equation 17, CA_L3S1 means the effective diameter CA (mm) of the fifth surface S5 of the third lenses 103 and 113, and CA_L9S2 means the effective diameter CA (mm) of the eighteenth surface S18 of the ninth lenses 109 and 119. When the optical system 1000 according to the embodiment satisfies Equation 17, the optical system 1000 may control the light incident to the second lens group G2 and may improve aberration characteristics.

$$0 < CA\_L2S2/CA\_L3S1 < 2 \qquad \text{[Equation 18]}$$

In Equation 18, CA_L2S2 means the effective diameter CA (mm) of the fourth surface S4 of the second lenses 102 and 112, and CA_L3S1 means the effective diameter CA (mm) of the fifth surface S5 of the third lenses 103 and 113. When the optical system 1000 according to the embodiment satisfies Equation 18, the optical system 1000 may improve chromatic aberration and control vignetting for optical performance.

$$0.1 < CA\_L8S2/CA\_L9S2 < 1 \qquad \text{[Equation 19]}$$

In Equation 19, CA_L8S2 means the effective diameter (mm) of the sixteenth surface S16 of the eighth lenses 108 and 118, and CA_L9S2 means the effective diameter (mm) of the eighteenth surface S18 of the ninth lenses 109 and 119. When the optical system 1000 according to the embodiment satisfies Equation 19, the optical system 1000 may improve chromatic aberration.

$$1 < d23\_CT/d23\_ET < 10 \qquad \text{[Equation 20]}$$

In Equation 8, d23_CT means a distance (mm) between the second lenses 102 and 112 and the third lenses 103 and 113 on the optical axis OA. In detail, d23_CT means a distance (mm) from the fourth surface S4 of the second lenses 102 and 112 to the fifth surface S5 of the third lenses 103 and 113 on the optical axis OA. d23_ET means a distance (mm) in direction of the optical axis OA between the end of the effective region of the fourth surface S4 of the second lenses 102 and 112 and the end of the effective region of the fifth surface S5 of the third lenses 103 and 113. When the optical system 1000 according to the embodiment satisfies Equation 20, the optical system 1000 may reduce chromatic aberration, improve aberration characteristics, and control vignetting for optical performance.

$$1 < d78\_CT/d78\_ET < 3 \qquad \text{[Equation 21]}$$

In Equation 21, d78_CT means a distance (mm) between the seventh lenses 107 and 117 and the eighth lenses 108 and 118 on the optical axis OA. d78_ET means a distance (mm) in the direction of the optical axis OA between the end of the effective region of the fourteenth surface S14 of the seventh lenses 107 and 117 and the end of the effective region of the fifteenth surface S15 of the eighth lenses 108 and 118. When the optical system 1000 according to the embodiment satisfies Equation 21, good optical performance may be obtained even on the center and peripheral portions of FOV, and distortion characteristics may be suppressed.

$$0 < d78\_max/d78\_CT < 2 \qquad \text{[Equation 22]}$$

In Equation 22, d78_Max means the maximum distance among the distances (mm) between the seventh lenses 107 and 117 and the eighth lenses 108 and 118. In detail, d78_Max means the maximum distance between the fourteenth surface S14 of the seventh lenses 107 and 118 and the fifteenth surface S15 of the eighth lenses 108 and 118. When the optical system 1000 according to the embodiment satisfies Equation 22, optical performance may be improved on the periphery portion of FOV, and distortion of aberration characteristics may be suppressed.

$$1<L8\_CT/d89\_CT<2 \qquad \text{[Equation 23]}$$

In Equation 23, L8_CT means the thickness (mm) of the eighth lenses 108 and 118 on the optical axis OA, and d89_CT means a distance (mm) between the eighth lenses 108 and 118 and the ninth lenses 109 and 119 on the optical axis OA. When the optical system 1000 according to the embodiment satisfies Equation 23, the optical system 1000 may reduce the effective diameter size of the eighth lenses 108 and 118 and the center distance between adjacent lenses, and the optical performance of the periphery portion of FOV may be improved.

$$0.1<L6\_CT/d89\_CT<3 \qquad \text{[Equation 24]}$$

In Equation 24, L6_CT means the thickness (mm) of the sixth lens 106 and 116 on the optical axis OA, and d89_CT means a distance (mm) between the eighth lenses 108 and 118 and the ninth lenses 109 and 119 on the optical axis OA. When the optical system 1000 according to the embodiment satisfies Equation 24, the optical system 1000 may reduce the effective diameter size of the eighth, ninth, and tenth lenses and distances between the eighth, ninth, and tenth lenses, and the optical performance of the periphery portion of FOV may be improved.

$$0.01<L9\_CT/d89CT<1 \qquad \text{[Equation 24-1]}$$

In Equation 25, L9_CT means the thickness (mm) of the ninth lenses 109 and 119 on the optical axis OA, and d89_CT means a distance (mm) between the eighth lenses 108 and 118 and the ninth lenses 109 and 119 on the optical axis OA. When the optical system 1000 according to the embodiment satisfies Equation 24 and/or Equation 24-1, the optical system 1000 may be reduced the effective diameter of the eighth lenses 108 and 118 and the center distance between the eighth lenses 108 and 118 and the ninth lens 109 and 119, and the optical performance of the periphery portion of FOV may be improved.

$$1<|L9R1/L9\_CT|<50 \qquad \text{[Equation 25]}$$

In Equation 25, L9R1 means the radius (mm) of curvature of the seventeenth surface S17 of the ninth lenses 109 and 119, and L9_CT means the thickness (mm) of the ninth lenses 109 and 119 on the optical axis. When the optical system 1000 according to the embodiment satisfies Equation 25, the optical system 1000 may control the refractive power of the ninth lenses 109 and 119 and improve the optical performance of the light incident to the second lens group G2.

$$1<|L8R1/L9R1|<10 \qquad \text{[Equation 26]}$$

In Equation 26, L8R1 means the radius (mm) of curvature of the fifteenth surface S15 of the eighth lenses 108 and 118, and L9R1 means the radius (mm) of curvature of the seventeenth surface S17 of the ninth lenses 109 and 119. When the optical system 1000 according to the embodiment satisfies Equation 26, a shape and refractive power of the eighth lenses 108 and 118 and the ninth lenses 109 and 119 may be controlled to improve optical performance, and the second lens group G2 may be improved the optical performance.

$$20<L1\_CT/d12\_CT \qquad \text{[Equation 27]}$$

In Equation 27, L1_CT means the thickness of the first lenses 101 and 111 on the optical axis OA, and d12 is the distance between the first lenses 101 and 111 and the second lenses 102 and 112 on the optical axis OA. When the optical system 1000 according to the embodiment satisfies Equation 27, the chromatic aberration of the optical system 1000 may be improved.

$$0<L\_CT\_Max/Air\_CT\,Max<5 \qquad \text{[Equation 28]}$$

In Equation 28, L_CT_max means the thickest thickness (mm) on the optical axis OA of each of the plurality of lenses 100 and 100A, and Air_CT_max means the maximum value of the air gaps or distances (mm) between the plurality of lenses 100 and 100A. When the optical system 1000 according to the embodiment satisfies Equation 28, the optical system 1000 has good optical performance at a set angle of view and focal length, and the optical system 1000 is reduced in size, for example, TTL may be reduced.

$$0.5<\Sigma L\_CT/\Sigma Air\_CT<2 \qquad \text{[Equation 29]}$$

In Equation 29, ΣL_CT means the sum of thicknesses (mm) on the optical axis OA of each of the plurality of lenses 100 and 100A, and ΣAir_CT means the sum of the distances (mm) between two adjacent lenses in the plurality of lenses 100 and 100A on the optical axis OA. When the optical system 1000 according to the embodiment satisfies Equation 29, the optical system 1000 has good optical performance at a set FOV and focal length, and the optical system 1000 is reduced in size, for example, TTL may be reduced.

$$10<\Sigma Index<30 \qquad \text{[Equation 30]}$$

In Equation 30, ΣIndex means the sum of refractive indices in the d-line of each of the plurality of lenses 100 and 100A. When the optical system 1000 according to the embodiment satisfies Equation 30, it is possible to control the TTL of the optical system 1000 and to have improved resolution.

$$10<\Sigma Abbe/\Sigma Index<50 \qquad \text{[Equation 31]}$$

In Equation 31, >Abbe means the sum of Abbe numbers of each of the plurality of lenses 100 and 100A. When the optical system 1000 according to the embodiment satisfies Equation 31, the optical system 1000 may have improved aberration characteristics and resolution.

$$0.8<Air\_CT\_Max/L\_CT\_Min<6.0 \qquad \text{[Equation 32]}$$

In Equation 32, Air_CT_Max means the maximum value of the distance between two adjacent lenses on the optical axis OA, and L_CT_Min means the minimum thickness (mm) on the optical axis OA of each of the plurality of lenses 100 and 100A. When the optical system 1000 according to the embodiment satisfies Equation 32, the optical system 1000 has good optical performance at a set FOV and focal length, and the optical system 1000 is reduced in size, for example, TTL may be reduced.

$$0<Air\_ET\_Max/L\_CT\,Max<2 \qquad \text{[Equation 33]}$$

In Equation 33, L_CT_max means the thickest thickness (mm) among the thicknesses on the optical axis OA of each of the plurality of lenses 100 and 100A, and as shown in FIGS. 2 and 9, Air_CT_Max is a distance in the direction of the optical axis OA between the end of the effective region of the sensor-side surface of the n-th lens and the end of the effective region of the object-side surface of the n-th lens facing each other, and means, for example, the maximum value (Air_Edge_max) among the edge distances between the two lenses. That is, it means the largest value among d (n−1, n)_ET values in lens data to be described later (where n is a natural number greater than 3 and less than or equal to 9). When the optical system 1000 according to the embodiment satisfies Equation 33, the optical system 1000 may have a set FOV and focal length, and may have good optical performance in the periphery portion of FOV.

$$0.5<CA\_L1S1/CA\ min<2 \qquad \text{[Equation 34]}$$

In Equation 34, CA_L1S1 means the effective diameter (mm) of the first surface S1 of the first lenses 101 and 111, and CA_Min means the smallest effective diameter (mm) of the first to eighteenth surfaces S1-S18. When the optical system 1000 according to the embodiment satisfies Equation 34, it is possible to control the light incident through the first lenses 101 and 111 and provide a slim optical system while maintaining optical performance.

$$1<CA\_max/CA\ min<4 \qquad \text{[Equation 35]}$$

In Equation 35, CA_max means the largest effective diameter (mm) among the object-side surfaces and the sensor-side surfaces of the plurality of lenses 100 and 100A, and means the largest effective diameter (mm) of the first to eighteenth surfaces S1-S18. When the optical system 1000 according to the embodiment satisfies Equation 35, the optical system 1000 may provide a slim and compact optical system while maintaining optical performance.

$$1<CA\_L9S2/CA\_L3S1<4 \qquad \text{[Equation 35-1]}$$

In Equation 35-1, CA_L9S2 means the effective diameter (mm) of the eighteenth surface S18 of the ninth lenses 109 and 119, and has the largest effective diameter of the lens surfaces among the lenses. CA_L3S1 is the effective diameter (mm) of the fifth surface S5 of the third lenses 103 and 113 and has the smallest effective diameter of the lens surfaces among the lenses. That is, the difference in effective diameters between the first lens surface of the second lens group G2 and the last lens surface of the second lens group G2 may be the largest. When the optical system 1000 according to the embodiment satisfies Equation 35-1, the optical system 1000 may provide a slim and compact optical system while maintaining optical performance.

$$1.5 \leq AVR\_CA\_L9/AVR\_CA\_L3<4 \qquad \text{[Equation 35-2]}$$

In Equation 35-2, AVR_CA_L9 means the average value of the effective diameters (mm) of the seventeenth and eighteenth surfaces S17 and S18 of the ninth lenses 109 and 119, and is the average of the effective diameters of the two largest lens surfaces among the lenses. AVR_CA_L3 means the average value of the effective diameters (mm) of the fifth and sixth surfaces S5 and S6 of the third lens 103, and means the average of the effective diameters of the two smallest lens surfaces among the lenses. That is, the difference in effective diameters between the average of the effective diameters of the object-side and sensor-side surfaces S5 and S6 of the first lens L3 of the second lens group G2 and the average of the effective diameters of the object side and sensor-side surfaces S17 and S18 of the last lens L9 of the second lens group G2 may be the largest. When the optical system 1000 according to the embodiment satisfies Equation 35-2, the optical system 1000 may provide a slim and compact optical system while maintaining optical performance.

Using Equations 35, 35-1, and 35-2, the effective diameter CA_L9S1 of the seventeenth surface S17 of the ninth lenses 109 and 119 may be 1.5 times or more of the minimum effective diameter CA_min, and the effective diameter CA_L9S2 of the eighteenth surface S18 may be 1.5 times or more of the minimum effective diameter CA_min. That is, the following equation may be satisfied.

$$1.5 \leq CA\_L9S1/CA\ min<4 \qquad \text{[Equation 35-3]}$$

$$1.5 \leq CA\_L9S2/CA\ min<4 \qquad \text{[Equation 35-4]}$$

Using Equations 35 and 35-1 to 35-4, the effective diameter CA_L9S1 of the seventeenth surface S17 of the ninth lenses 109 and 119 may be 1.5 times or more of the average effective diameter of the average effective diameter AVR_CA_L3 of the third lenses 103 and 113, for example, in a range of 1.5 times to 5 times, and the effective diameter CA_L9S2 of the eighteenth surface S18 may be 1.5 times or more of the average effective diameter AVR_CA_L3 of the third lens 103, for example, in the range of 2 times or more and less than 4 times.

That is, the following equation may be satisfied.

$$1.5<CA\_L9S1/AVR\_CA\_L3 \leq 4 \qquad \text{[Equation 35-5]}$$

$$1.5 \leq CA\_L9S2/AVR\_CA\_L3<4 \qquad \text{[Equation 35-6]}$$

$$1<CA\_max/CA\_Aver<3 \qquad \text{[Equation 36]}$$

In Equation 36, CA_max means the largest effective diameter (mm) among the object-side surfaces and the sensor-side surfaces of the plurality of lenses, and CA_Aver means the average of the effective diameters of the object-side surfaces and the sensor-side surfaces of the plurality of lenses. When the optical system 1000 according to the embodiment satisfies Equation 36, a slim and compact optical system may be provided.

$$0.1<CA\_min/CA\_Aver<1 \qquad \text{[Equation 37]}$$

In Equation 37, CA_min means the smallest effective diameter (mm) among the object-side surfaces and the sensor-side surfaces of the plurality of lenses. When the optical system 1000 according to the embodiment satisfies Equation 37, a slim and compact optical system may be provided.

$$0.1<CA\_max/(2 \times ImgH)<1 \qquad \text{[Equation 38]}$$

In Equation 38, CA_max means the largest effective diameter among the object-side surfaces and the sensor-side surfaces of the plurality of lenses 100 and 100A, and ImgH means a distance (mm) from the center (0.0F) of the image sensor 300 overlapping the optical axis OA to the diagonal end (1.0F). That is, ImgH means ½ of the maximum diagonal length (mm) of the effective region of the image sensor 300. When the optical system 1000 according to the embodiment satisfies Equation 38, the optical system 1000 has good optical performance on the center and the periphery portions of FOV, and can provide a slim and compact optical system. Here, the ImgH may be in the range of 2.1 mm to 6 mm.

$$0.5<TD/CA\_max<1.5 \qquad \text{[Equation 39]}$$

In Equation 39, TD is the maximum optical axis distance (mm) from the object-side surface of the first lens group G1 to the sensor-side surface of the second lens group G2. For example, it is the distance from the first surface S1 of the first lens 101 to the eighteenth surface S18 of the ninth lenses 109 and 119 on the optical axis OA. When the optical system 1000 according to the embodiment satisfies Equation 39, it is possible to provide a slim and compact optical system.

$$1< \Sigma CA/\text{lens number}<10 \qquad \text{[Equation 39-1]}$$

In Equation 39-1, 2CA is the sum of all effective diameters, and the lens number is the total number of lenses, for example, nine lenses. When the optical system satisfies Equation 39-1, it is possible to provide a slim and compact optical system. The range of Equation 39-1 may preferably be in the range of 3 to 10.

$$1.5<ESemi\_CA/ST\_Semi\_CA<50 \qquad \text{[Equation 39-2]}$$

In Equation 39-2, >Semi_CA is the sum of all effective radii, and ST_Semi_CA is the effective radius of the aperture stop. When the optical system satisfies Equation 39-2, it is possible to provide a slim and compact optical system. Equation 39-2 may preferably be in the range of 20 to 40.

$$1 < F/L9R2 < 10 \qquad \text{[Equation 40]}$$

In Equation 40, F means the total focal length (mm) of the optical system 1000, and L9R2 means the radius (mm) of curvature of the eighteenth surface S18 of the ninth lenses 109 and 119. When the optical system 1000 according to the embodiment satisfies Equation 40, the optical system 1000 may reduce the size of the optical system 1000, for example, a TTL.

$$1 < F/L1R1 < 10 \qquad \text{[Equation 41]}$$

In Equation 41, L1R1 means a radius (mm) of curvature of the first surface S1 of the first lenses 101 and 111, and F means a total focal length (mm). When the optical system 1000 according to the embodiment satisfies Equation 41, the optical system 1000 may reduce the size of the optical system 1000, for example, reduce a TTL.

$$1 < EPD/L9R2 < 10 \qquad \text{[Equation 42]}$$

In Equation 42, EPD means the size (mm) of the entrance pupil diameter of the optical system 1000, and L9R2 means the radius (mm) of curvature of the eighteenth surface S18 of the ninth lenses 109 and 119. When the optical system 1000 according to the embodiment satisfies Equation 42, the optical system 1000 may control the overall brightness and may have good optical performance on the center and the periphery portions of FOV.

$$0.5 < EPD/L1R1 < 8 \qquad \text{[Equation 43]}$$

Equation 42 shows the relationship between the size of the incident pupil diameter of the optical system and the radius of curvature of the first surface S1 of the first lenses 101 and 111, and the incident light may be controlled.

$$-3 < f1/f3 < 0 \qquad \text{[Equation 44]}$$

In Equation 44, f1 means a focal length (mm) of the first lenses 101 and 111, and f3 means a focal length (mm) of the third lenses 103 and 113. When the optical system 1000 according to the embodiment satisfies Equation 44, the first lenses 101 and 111 and the third lenses 103 and 113 may have an appropriate refractive power for controlling an incident light path, and the resolution may be improved.

$$1 < f12/F < 10 \qquad \text{[Equation 45]}$$

In Equation 45, f12 means a composite focal length (mm) of the first lenses 101 and 111 to second lenses 102 and 112, and F means a total focal length (mm) of the optical system 1000. Equation 45 establishes a relationship between the focal length of the first lens group G1 and the total focal length. When the optical system 1000 according to the embodiment satisfies Equation 45, the optical system 1000 may control TTL of the optical system 1000.

$$-1.5 < f12/f39 < 1.7 \qquad \text{[Equation 46]}$$

In Equation 46, f12 means a composite focal length (mm) of the first to second lenses, and f39 means a composite focal length (mm) of the third to ninth lenses. Equation 46 establishes a relationship between the focal length f_G1 of the first lens group G1 and the focal length f_G2 of the second lens group G2. In an embodiment, the composite focal lengths of the first to second lenses may have a positive (+) value, and the composite focal lengths of the third to ninth lenses may have a positive (+) value. When the optical system 1000 according to the embodiment satisfies Equation 46, the optical system 1000 may improve aberration characteristics such as chromatic aberration and distortion aberration.

$$1.5 < \Sigma|F/fi| < 20 \qquad \text{[Equation 46-1]}$$

In Equation 46-1, F is the total focal length, and fi is the sum of the absolute values of the focal lengths of the first lenses 101 and 111 to the ninth lenses 109 and 119, respectively. That is, Equation 46-1 means a value obtained by dividing the total focal length F by the sum of the absolute values of the focal lengths f1 to f9 of each lens. When the optical system satisfies Equation 46-1, it is possible to improve the resolution by controlling the refractive power. Preferably, Equation 46-1 may range from 2 to 10.

$$2 < TTL < 20 \qquad \text{[Equation 47]}$$

In Equation 47, TTL means a distance (mm) from the apex of the first surface S1 of the first lenses 101 and 111 to the upper surface of the image sensor 300 on the optical axis OA. In Equation 47, by making TTL less than 20, it is possible to provide a slim and compact optical system.

$$2 < ImgH \qquad \text{[Equation 48]}$$

Equation 48 allows the diagonal size (2*ImgH) of the image sensor 300 to exceed 4 mm, thereby providing an optical system having high resolution.

$$BFL < 2.5 \qquad \text{[Equation 49]}$$

Equation 42 makes the BFL (Back focal length) less than 2.5 mm, so that the installation space of the filter 500 may be secured and the assembly of the components is improved through the distance between the image sensor 300 and the last lens, The bonding reliability may be improved.

$$1 < F < 20 \qquad \text{[Equation 50]}$$

In Equation 50, the total focal length F may be set to match the optical system.

$$FOV < 120 \qquad \text{[Equation 51]}$$

In Equation 51, a FOV means an angle (Degree) of field of view of the optical system 1000, and may provide an optical system of less than 120 degrees. FOV may be greater than or equal to 60 degrees.

$$0.5 < TTL/CA\_max < 2 \qquad \text{[Equation 52]}$$

In Equation 52, CA_max means the largest effective diameter (mm) among the object-side surfaces and the sensor-side surfaces of the plurality of lenses, and TTL (Total track length) means a distance (mm) from the apex of the first surface S1 of the first lenses 101 and 111 to the upper surface of the image sensor 300 on the optical axis OA. Equation 52 sets the relationship between a total distance on the optical axis and the maximum effective radius of the optical system, thereby providing a slim and compact optical system.

$$0.6 < TTL/ImgH < 3.2 \qquad \text{[Equation 53]}$$

Equation 53 may set the total length TTL on the optical axis of the optical system and the diagonal length ImgH from the optical axis of the image sensor 300. When the optical system 1000 according to the embodiment satisfies Equation 53, the optical system 1000 may secure a relatively large image sensor 300, for example, BFL for application of the large image sensor 300 of about 1 inch in size, and may have a smaller TTL, thereby implementing high-definition image quality and a slim structure.

$$0.01 < BFL/\text{ImgH} < 0.5 \qquad \text{[Equation 54]}$$

$$2 < \text{ImgH}/BFL < 10 \qquad \text{[Equation 54-1]}$$

Equations 54 and 54-1 may set the distance on the optical axis between the image sensor 300 and the last lens and a length in a diagonal direction from the optical axis of the image sensor 300. When the optical system 1000 according to the embodiment satisfies Equation 54 or 54-1, the optical system 1000 may secure a relatively large image sensor 300, for example, BFL for application of the large image sensor 300 of about 1 inch in size, and the distance between the last lens and the image sensor 300 may be minimized, so that good optical properties may be obtained on the center and periphery portions of FOV.

$$4 < TTL/BFL < 10 \qquad \text{[Equation 55]}$$

Equation 55 may set the total length TTL on the optical axis of the optical system and the distance BFL (unit, mm) on the optical axis between the image sensor 300 and the last lens. When the optical system 1000 according to the embodiment satisfies Equation 55, the optical system 1000 may be provided in a slim and compact manner while securing the BFL.

$$0.1 < F/TTL < 1.5 \qquad \text{[Equation 56]}$$

Equation 56 may set the total focal length F and the total length TTL on the optical axis of the optical system 1000. Accordingly, it is possible to provide a slim and compact optical system.

$$3 < F/BFL < 10 \qquad \text{[Equation 57]}$$

Equation 57 may set the total focal length F of the optical system 1000 and the distance BFL (unit, mm) of the optical axis between the image sensor 300 and the last lens. When the optical system 1000 according to the embodiment satisfies Equation 57, the optical system 1000 may have a set FOV and an appropriate focal length, and a slim and compact optical system may be provided. In addition, the optical system 1000 may minimize the distance between the last lens and the image sensor 300, and thus may have good optical characteristics on the periphery portion of FOV.

$$0.1 < F/\text{ImgH} < 3 \qquad \text{[Equation 58]}$$

Equation 58 may set the total focal length F (mm) of the optical system 1000 and the diagonal length ImgH from the optical axis of the image sensor 300. The optical system 1000 may have improved aberration characteristics by applying a relatively large image sensor 300, for example, a large image sensor 300 of about 1 inch or less.

$$0.7 < F/EPD < 2.6 \qquad \text{[Equation 59]}$$

Equation 59 may set the total focal length F (mm) and the size of the entrance pupil diameter of the optical system 1000. Accordingly, it is possible to control the overall brightness of the optical system.

$$Z = \frac{cY^2}{1 + \sqrt{1 - (1+K)c^2 Y^2}} + \qquad \text{[Equation 60]}$$
$$AY^4 + BY^6 + CY^8 + DY^{10} + EY^{12} + FY^{14} + \ldots$$

In Equation 60, Z is Sag, which may mean a distance on the optical axis direction from an arbitrary position on the aspherical surface to the apex of the aspherical surface. Y may mean a distance in a direction perpendicular to the optical axis from an arbitrary position on the aspherical surface to the optical axis. Wherein c may mean the curvature of the lens, K may mean the conic constant. In addition, A, B, C, D, E, and F may mean an aspheric constant.

The optical system 1000 according to the embodiment may satisfy at least one or two or more of Equations 1 to 59. In this case, the optical system 1000 may have improved optical properties. In detail, when the optical system 1000 satisfies at least one or two or more of Equations 1 to 59, the optical system 1000 has improved resolution and may improve aberration and distortion characteristics. In addition, the optical system 1000 may secure a BFL for applying the large-sized image sensor 300 and minimize the distance between the last lens and the image sensor 300, thereby having good optical performance on the center and periphery portions of FOV. In addition, when the optical system 1000 satisfies at least one of Equations 1 to 59, the optical system 1000 includes the image sensor 300 having a relatively large size and may have a relatively small TTL value, and may provide a slimmer compact optical system and a camera module having the same. The distance between the plurality of lenses 100 in the optical system 1000 according to the embodiment may have a value set according to the regions.

Table 3 shows the items of the above-described equations in the optical system 1000 according to the first and second embodiments, and shows TTL, BFL, total focal length F of the optical system 1000, ImgH, focal length f1, f2, f3, f4, f5, f6, f7, f8, and f9 of each of the first to ninth lenses, composite focal length, edge thickness ET, etc. Here, the edge thickness of the lens means the thickness in the direction Z of the optical axis at the end of the effective region of the lens, and the unit is mm.

TABLE 3

| Items | First embodiment | Second embodiment |
|---|---|---|
| F | 4.370 | 4.310 |
| f1 | 5.290 | 5.864 |
| f2 | −9.110 | −11.147 |
| f3 | −35.590 | −38.827 |
| f4 | 33.890 | 22.404 |
| f5 | 12.800 | 16.392 |
| f6 | 15.210 | 14.381 |
| f7 | −17.520 | −17.942 |
| f8 | 7.400 | 7.306 |
| f9 | −7.420 | −6.988 |
| f_G1 | 10.171 | 10.317 |
| f_G2 | 7.155 | 6.991 |
| L1_ET | 0.165 | 0.182 |
| L2_ET | 0.301 | 0.287 |
| L3_ET | 0.266 | 0.269 |
| L4_ET | 0.284 | 0.250 |
| L5_ET | 0.099 | 0.083 |
| L6_ET | 0.281 | 0.329 |
| L7_ET | 0.363 | 0.411 |
| L8_ET | 0.560 | 0.452 |
| L9_ET | 0.662 | 0.713 |
| d12_ET | 0.211 | 0.199 |
| d23_ET | 0.069 | 0.092 |
| d34_ET | 0.175 | 0.183 |
| d45_ET | 0.032 | 0.065 |
| d56_ET | 0.011 | 0.027 |
| d67_ET | 0.253 | 0.253 |
| d78_ET | 0.390 | 0.362 |
| d89_ET | 0.266 | 0.348 |
| EPD | 3.080 | 3.140 |
| BFL | 1.175 | 1.092 |
| TD | 5.483 | 5.560 |

TABLE 3-continued

| Items | First embodiment | Second embodiment |
|---|---|---|
| Imgh | 3.530 | 3.537 |
| TTL | 5.689 | 5.683 |
| F-number | 1.418 | 1.373 |
| FOV | 78.4 degrees | 77.2 degrees |

Table 4 shows the result values for Equations 1 to 59 described above in the optical system 1000 of FIG. 1. Referring to Table 4, it may be seen that the optical system 1000 satisfies at least one, two or more, or three or more of Equations 1 to 59. In detail, it may be seen that the optical system 1000 according to the embodiment satisfies all of Equations 1 to 59 above. Accordingly, the optical system 1000 may improve optical performance and optical characteristics on the center and periphery portions of FOV.

TABLE 4

| Equations | First embodiment | Second embodiment |
|---|---|---|
| 1 $1 < L1\ CT/L3\_CT < 5$ | 2.660 | 2.660 |
| 2 $0.5 < L3\_CT/L3\_ET < 2$ | 0.883 | 0.873 |
| 3 $1 < L9\_ET/L9\_CT < 5$ | 1.779 | 1.916 |
| 4 $1.60 < n3$ | 1.701 | 1.701 |
| 5 $0.5 < L9S2\_max\_sag\ to\ Sensor < 2$ | 0.920 | 0.848 |
| 6 $0.5 < BFL/L9S2\_max\_sag\ to\ Sensor < 2$ | 1.278 | 1.288 |
| 7 $|L9S2\_max\ slope| < 45$ | 0.346 | 0.378 |
| 8 $0.2 < L9S2\ Inflection\ Point < 0.6$ | 0.500 | 0.490 |
| 9 $100 < d89\_CT/d89\_min$ | 28.784 | 757.750 |
| 10 $0 < d89\_CT/\ d89\_ET < 3$ | 1.675 | 1.282 |
| 11 $0.01 < d23\_CT/d89\_CT < 1$ | 0.537 | 0.514 |
| 12 $1 < L1\_CT/L9\_CT < 5$ | 0.570 | 0.570 |
| 13 $1 < L8\_CT/L9\_CT < 5$ | 1.199 | 1.199 |
| 14 $0 < L1R1/L9R2 < 5$ | 2.654 | 2.770 |
| 15 $0 < (d89\_CT - d89\_ET)/(d89\_CT) < 5$ | 0.637 | 0.541 |
| 16 $1 < CA\_L1S1/CA\_L2S1 < 1.5$ | 1.089 | 1.086 |
| 17 $1 < CA\_L9S2/\ CA\_L3S1 < 5$ | 1.984 | 2.001 |
| 18 $0.2 < CA\_L2S2/CA\_L3S1 < 2$ | 1.005 | 1.001 |
| 19 $0.1 < CA\_L8S2/CA\_L9S2 < 1$ | 0.783 | 0.775 |
| 20 $3 < d23\_CT/\ d23\_ET < 10$ | 6.655 | 5.347 |
| 21 $0 < d78\_CT/\ d78\_ET < 3$ | 0.038 | 0.041 |
| 22 $0 < d78\_max/d89\_CT < 2$ | 1.003 | 1.001 |
| 23 $1 < L8\_CT/d89\_CT < 30$ | 0.608 | 0.589 |
| 24 $0.01 < L6\_CT/d89\_CT < 3$ | 1.914 | 1.914 |
| 25 $1 < |L9R1/\ L9\_CT| < 100$ | 4.964 | 5.478 |
| 26 $1 < |L8R1/L9R1| < 100$ | 0.847 | 0.770 |
| 27 $20 < L1\_CT/d12$ | 41.67 | 41.67 |
| 28 $0 < CT\_Max/Air\_Max < 5$ | 0.97 | 0.94 |
| 29 $0.5 < \Sigma L\_CT/\Sigma Air\_CT < 2$ | 2.267 | 2.112 |
| 30 $10 < \Sigma Index < 30$ | 14.195 | 14.195 |
| 31 $10 < \Sigma Abb/\Sigma Index < 50$ | 24.163 | 24.163 |
| 32 $0.8 < Air\_CT\_\ max/L\_CT\_min < 6.0$ | 3.46 | 3.57 |
| 33 $0 < Air\_ET\_Max/L\_CT\_Max < 2$ | 0.548 | 0.508 |
| 34 $0.5 < CA\_L1S1/CA\_min < 2$ | 1.149 | 1.136 |
| 35 $1 < CA\_max/CA\_min < 5$ | 1.984 | 2.007 |
| 36 $1 < CA\_max/CA\_Aver < 3$ | 1.566 | 1.610 |
| 37 $0.1 < CA\_min/CA\_Aver < 1$ | 0.790 | 0.802 |
| 38 $0.1 < CA\_max/(2 * ImgH) < 1$ | 0.753 | 0.784 |
| 39 $0.5 < TD/CA\_max < 1.5$ | 1.031 | 1.002 |
| 40 $0 < F/L9R2 < 10$ | 3.761 | 3.525 |
| 41 $1 < F/L1R1 < 10$ | 1.417 | 1.273 |
| 42 $0 < EPD/L9R2 < 10$ | 2.651 | 2.568 |
| 43 $0.5 < EPD/L1R1 < 8$ | 0.999 | 0.927 |
| 44 $-3 < f1/\ f3 < 0$ | −0.149 | −0.151 |
| 45 $1 < f13/F < 10$ | 7.173 | 7.516 |
| 46 $-1.5 < f12/f39 < 1.7$ | 1.42 | 1.48 |
| 47 $2 < TTL < 20$ | 5.688 | 5.683 |
| 48 $2 < ImgH$ | 3.530 | 3.537 |
| 49 $BFL < 2.5$ | 1.175 | 1.092 |
| 50 $1 < F < 20$ | 4.370 | 4.310 |
| 51 $FOV < 120$ | 76.400 | 77.200 |
| 52 $0.5 < TTL/CA\ max < 2$ | 1.070 | 1.024 |
| 53 $0.6 < TTL/ImgH < 3.2$ | 1.611 | 1.607 |
| 54 $0.01 < BFL/ImgH < 0.5$ | 0.333 | 0.309 |
| 55 $4 < TTL/BFL < 10$ | 4.840 | 5.202 |

TABLE 4-continued

| Equations | First embodiment | Second embodiment |
|---|---|---|
| 56 $0.1 < F/TTL < 1.5$ | 0.768 | 0.758 |
| 57 $3 < F/BFL < 10$ | 3.718 | 3.945 |
| 58 $0.1 < F/ImgH < 3$ | 1.238 | 1.219 |
| 59 $0.7 < F/EPD < 2.6$ | 1.419 | 1.373 |

FIG. 16 is a diagram illustrating that a camera module according to an embodiment is applied to a mobile terminal. Referring to FIG. 16, the mobile terminal 1 may include a camera module 10 provided at the rear side. The camera module 10 may include an image capturing function. Also, the camera module 10 may include at least one of an auto focus function, a zoom function, and an OIS function.

The camera module 10 may process a still video image or an image frame of a moving image obtained by the image sensor 300 in an imaging mode or a video call mode. The processed image frame may be displayed on a display unit (not shown) of the mobile terminal 1 and may be stored in a memory (not shown). In addition, although not shown in the drawings, the camera module may be further disposed on the front of the mobile terminal 1. For example, the camera module 10 may include a first camera module 10A and a second camera module 10B. In this case, at least one of the first camera module 10A and the second camera module 10B may include the above-described optical system 1000 and the image sensor 300. Accordingly, the camera module 10 may have a slim structure, and may improve distortion and aberration characteristics of a peripheral portion (a region of about 65% or more of an angle of view (FOV)).

In addition, the mobile terminal 1 may further include an autofocus device 31. The auto focus device 31 may include an auto focus function using a laser. The auto focus device 31 may be mainly used in a condition in which the auto focus function using the image of the camera module 10 is deteriorated, for example, in proximity of 10 m or less or in a dark environment. The autofocus device 31 may include a light emitting unit including a vertical cavity surface emission laser (VCSEL) semiconductor device and a light receiving unit that converts light energy such as a photodiode into electrical energy. The mobile terminal 1 may further include a flash module 33. The flash module 33 may include a light emitting device emitting light therein. The flash module 33 may be operated by a camera operation of a mobile terminal or a user's control.

Features, structures, effects, etc. described in the above embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention. In addition, although the embodiment has been described above, it is only an example and does not limit the invention, and those of ordinary skill in the art to which the invention pertains are exemplified above in a range that does not depart from the essential characteristics of the present embodiment. It can be seen that various modifications and applications that have not been made are possible. For example, each component specifically shown in the embodiment can be implemented by modification. And the differences related to these modifications and applications should be construed as being included in the scope of the invention defined in the appended claims.

The invention claimed is:

1. An optical system comprising:
first to ninth lenses disposed along an optical axis in a direction from an object side to a sensor side,
wherein the first lens has a positive (+) refractive power on the optical axis,
wherein the ninth lens has a negative (−) refractive power on the optical axis,
wherein an object-side surface of the first lens has a convex shape on the optical axis,
wherein a sensor-side surface of the ninth lens has a concave shape on the optical axis,
wherein a number of lenses having at least one critical point on object-side surfaces and sensor-side surfaces among the first to ninth lenses is 40% or more of a total number of lenses, and
wherein the optical system satisfies the following equations, Equations:

$$-1.5 < f12/f39 < 1.7$$

$$0.6 < TTL/\text{ImgH} < 3.2$$

(f12 is a composite focal length of the first and second lenses, f39 is a composite focal length of the third to ninth lenses, and TTL (Total track length) is a distance from an apex of the object-side surface of the first lens to an upper surface of an image sensor on the optical axis, and ImgH is ½ of a maximum diagonal length of the image sensor).

2. The optical system of claim 1, wherein the object-side surface of the first lens has a convex shape,
wherein the sensor-side surface of the ninth lens has a concave shape, and
wherein each of object-side surfaces and sensor-side surfaces of the sixth to ninth lenses has at least one critical point.

3. The optical system of claim 2, wherein the sensor-side surface of the first lens and an object-side surface of the fourth lens have at least one critical point, and
wherein an object-side surface and a sensor-side surface of the third lens have at least one critical point.

4. The optical system of claim 1, wherein a relationship between a distance BFL on the optical axis from the upper surface of the image sensor to a sensor-side surface of a last lens and ImgH satisfies the following equation, $$\text{Equation:} 0.01 < BFL/\text{ImgH} < 0.5.$$

5. The optical system of claim 1, wherein a relationship between effective diameters of the first lens and the ninth lens and a total number of lenses satisfies the following equation, $$\text{Equation:} 1 < \Sigma CA/\text{lens number} < 10$$

(ΣCA is a sum of the effective diameters of object-side surfaces and sensor-side surfaces of the first to ninth lenses, and the lens number is the total number of lenses).

6. The optical system of claim 1, wherein a relationship between a total focal length and a focal length of each lens satisfies the following equation, $$\text{Equation:} 1.5 < \Sigma|F/fi| < 20$$

(F is the total focal length, and fi is a sum of focal lengths of the first to ninth lenses).

7. The optical system of claim 1, wherein distances on the optical axis between the first to ninth lenses and center thicknesses of each lens satisfy the following equation, $$\text{Equation:} 0.8 < Air\_CT\_Max/L\_CT\_Min < 6.0$$

(Air_CT_Max is a maximum value among the distances on the optical axis between two adjacent lenses, and L_CT_Min is a minimum value among the thicknesses of each lens on the optical axis).

8. The optical system of claim 1, wherein a relationship between a maximum effective diameter and a minimum effective diameter among the first to ninth lenses satisfies the following equation, $$\text{Equation:} 1 < CA\_Max/CA\_Min < 4$$

(CA_Max is a maximum value among effective diameters of object-side surfaces and sensor-side surfaces of the first to ninth lenses, and CA_Min is a minimum value among the effective diameters of the object-side surfaces and the sensor-side surfaces of the first to ninth lenses).

9. The optical system of claim 8, wherein the sensor-side surface of the second lens has a concave shape on the optical axis,
wherein the object-side surface of the third lens faces the sensor-side surface of the second lens and has a convex shape on the optical axis,
wherein the maximum effective diameter is the sensor-side surface of the ninth lens, and
wherein the minimum effective diameter is the object-side surface of the third lens.

10. The optical system of claim 9, wherein a center thickness of the first lens and the third lens satisfies the following equation, $$\text{Equation:} 1 < L1\_CT/L3\_CT < 5$$

(L1_CT is the thickness on the optical axis of the first lens, and L3_CT is the thickness on the optical axis of the third lens).

11. The optical system of claim 1, comprising an aperture stop disposed on an outer periphery between the second lens and the third lens,
wherein a relationship between effective radii of the first to ninth lenses and an effective radius of the aperture stop satisfies the following equation, $$\text{Equation:} 1.5 < \Sigma\text{Semi}\_CA/ST\_\text{Semi}\_CA < 50$$

(ΣSemi_CA is a sum of all effective radii, and ST_Semi_CA is the effective radius of the aperture stop).

12. The optical system of claim 1, wherein a relationship between effective diameters of the first to ninth lenses and the total number of lenses satisfies the following equation, $$\text{Equation:} 1 < \Sigma CA/\text{lens number} < 10$$

(ΣCA is a sum of the effective diameters of object-side surfaces and sensor-side surfaces of the first to ninth lenses, and the lens number is 9).

13. A camera module comprising:
an optical system according to claim 1;
an image sensor; and
a filter between the image sensor and a last lens of the optical system,
wherein the camera module satisfies the following equation, $$\text{Equation:} 0.7 \leq F/EPD < 2.6$$

(F is a total focal length of the optical system, and EPD is an entrance pupil diameter of the optical system).

14. An optical system comprising:

a first lens group having a plurality of lenses on an object side; and a second lens group having a plurality of lenses on a sensor side of the first lens group, wherein the first lens group has a positive (+) refractive power on an optical axis, wherein the second lens group has a positive (+) refractive power on the optical axis, wherein a number of lenses in the second lens group is three times or more than a number of lenses in the first lens group, wherein an object-side surface closest to the first lens group in the second lens group has a smallest effective diameter, wherein a sensor-side surface closest to an image sensor among lens surfaces of the second lens group has a largest effective diameter, wherein the sensor-side surface closest to the image sensor among the lens surfaces of the second lens group has a minimum distance between a center of the sensor-side surface and the image sensor, and the distance gradually increases toward an end of an effective region of the sensor-side surface, and wherein the optical system satisfies the following equations, Equations:

$$0.6 < TTL/\text{ImgH} < 3.2$$

$$0.7 < F/EPD < 2.6$$

(Total track length (TTL) is a distance on the optical axis from an apex of an object-side surface of the first lens group to an upper surface of the image sensor, ImgH is ½ of a maximum diagonal length of the image sensor, and F is a total focal length of the first and second lens groups, and EPD is a size of an entrance pupil diameter of the optical system).

15. The optical system of claim 14, wherein a focal length of each of the first and second lens groups is greater in the first lens group than in the second lens group.

16. The optical system of claim 14, wherein the first lens group comprises a first lens and a second lens aligned with the optical axis from the object side toward the image sensor, wherein the second lens group includes third to ninth lenses aligned from the first lens group toward the image sensor, wherein an average effective diameter of the third lens is a smallest among that of the first to ninth lenses, and wherein an average effective diameter of the ninth lens is a largest that of the first to ninth lenses.

17. The optical system of claim 16, wherein a sensor-side surface of the ninth lens has a critical point and satisfies the following equation, $$\text{Equation:} 0.5 < L9S2\_max\_sag \text{ to Sensor} < 2$$

(L9S2_max_sag to Sensor is a distance in a direction of the optical axis from a maximum Sag value of the sensor-side surface of the ninth lens to the image sensor).

18. The optical system of claim 16, wherein a number of lenses having critical points on both object-side surfaces and sensor-side surfaces in the second lens group is 50% or more of lenses in the second lens group, and wherein a thickness of the first lens on the optical axis and a distance between the first and second lenses satisfy the following equation, $$\text{Equation:} 20 < L1CT/d12$$

(L1 CT is the thickness on the optical axis of the first lens, and d12 is the distance on the optical axis between the first and second lenses).

19. The optical system of claim 18, wherein a distance between the eighth lens and the ninth lens satisfies the following equation, $$\text{Equation:} 0 < d89\_CT/d89\_ET < 3$$

(d89_CT is a distance on the optical axis between the eighth lens and the ninth lens, and d89_ET is a distance on the optical axis between an end of an effective region of a sensor-side surface of the eighth lens and an end of an effective region of an object-side surface of the ninth lens).

20. The optical system of claim 14, wherein a focal length f_G1 of the first lens group and a focal length f_G2 of the second lens group satisfy the following equation, $$\text{Equation:} -1.5 < f\_G1/f\_G2 < 1.7.$$

* * * * *